United States Patent
Fidler et al.

(10) Patent No.: US 12,482,465 B1
(45) Date of Patent: Nov. 25, 2025

(54) SPEECH PROCESSING UTILIZING CUSTOMIZED EMBEDDINGS

(71) Applicant: Amazon Technologies, Inc., Seattle, WA (US)

(72) Inventors: Eli Joshua Fidler, Toronto (CA); Pavel Kveton, Pittsburgh, PA (US); Markus Mueller, Pittsburgh, PA (US); Benjamin Li, Markham (CA); Pavlo Stelmakh, Toronto (CA); Srikanth Subramaniam, Cupertino, CA (US); Nathan Anthony Susanj, York, PA (US); Grant Strimel, Presto, PA (US); Sunwoo Kim, Pittsburgh, PA (US); Athanasios Mouchtaris, Pittsburgh, PA (US)

(73) Assignee: Amazon Technologies, Inc., Seattle, WA (US)

( * ) Notice: Subject to any disclaimer, the term of this patent is extended or adjusted under 35 U.S.C. 154(b) by 201 days.

(21) Appl. No.: 18/388,426

(22) Filed: Nov. 9, 2023

(51) Int. Cl.
*G10L 15/22* (2006.01)
*G10L 15/16* (2006.01)

(52) U.S. Cl.
CPC .............. *G10L 15/22* (2013.01); *G10L 15/16* (2013.01); *G10L 2015/223* (2013.01)

(58) Field of Classification Search
USPC ..................................................... 704/1–504
See application file for complete search history.

(56) References Cited

U.S. PATENT DOCUMENTS

| | | | |
|---|---|---|---|
| 10,923,111 B1 * | 2/2021 | Fan | G10L 15/16 |
| 11,133,004 B1 * | 9/2021 | Naik | G10L 15/22 |
| 11,373,640 B1 * | 6/2022 | Chen | G06F 3/167 |
| 11,769,496 B1 * | 9/2023 | Prasad | G10L 15/22 704/257 |
| 11,790,902 B2 * | 10/2023 | Whalin | G10L 15/22 704/251 |
| 11,809,151 B1 * | 11/2023 | Brett | G05B 19/042 |
| 11,830,485 B2 * | 11/2023 | Gupta | G10L 15/08 |
| 12,087,270 B1 * | 9/2024 | Cygert | G10L 13/047 |
| 12,181,847 B1 * | 12/2024 | Brett | G06N 20/00 |
| 12,228,900 B1 * | 2/2025 | Brett | G06F 1/3278 |
| 12,327,550 B1 * | 6/2025 | Chen | H04L 41/145 |

(Continued)

FOREIGN PATENT DOCUMENTS

| | | | | |
|---|---|---|---|---|
| KR | 101832693 B1 * | 2/2018 | ............ | G10L 15/22 |
| WO | WO-2021118793 A1 * | 6/2021 | ............ | G10L 17/18 |

(Continued)

*Primary Examiner* — Marcus T Riley
(74) *Attorney, Agent, or Firm* — Eversheds Sutherland (US) LLP

(57) ABSTRACT

Systems and methods for speech processing utilizing customized embeddings include receiving a first textual representation of first audio data and intent data indicating an intent of a first voice command. A first embedding may be generated from the textual representation and stored on the device. Second audio data representing a second voice command may be received and a second embedding may be generated therefrom. The first embedding may be determined to have at least a threshold similarity to the second embedding, and an intent may be determined that is associated with the second voice command. An action may be performed utilizing the intent.

20 Claims, 16 Drawing Sheets

(56) References Cited

U.S. PATENT DOCUMENTS

| | | | |
|---|---|---|---|
| 2019/0340524 A1* | 11/2019 | Kirchhoff | G06N 5/043 |
| 2020/0184967 A1* | 6/2020 | Gupta | B60K 35/10 |
| 2021/0142794 A1* | 5/2021 | Mathias | G10L 15/22 |
| 2021/0241760 A1* | 8/2021 | Whalin | G10L 15/1815 |
| 2024/0029730 A1* | 1/2024 | Prasad | G10L 15/22 |
| 2024/0070251 A1* | 2/2024 | Maizels | G10L 13/02 |
| 2024/0079012 A1* | 3/2024 | Maizels | G06V 40/166 |
| 2024/0331686 A1* | 10/2024 | Wei | G06N 3/0455 |

FOREIGN PATENT DOCUMENTS

| | | | | |
|---|---|---|---|---|
| WO | WO-2023097026 A2 * | 6/2023 | | G06Q 40/04 |
| WO | WO-2024018400 A2 * | 1/2024 | | G10L 13/02 |

* cited by examiner

SPEECH PROCESSING UTILIZING CUSTOMIZED EMBEDDINGS

BACKGROUND

Devices, including voice interface devices, have become available. Some of these devices may be utilized to perform actions in environments.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
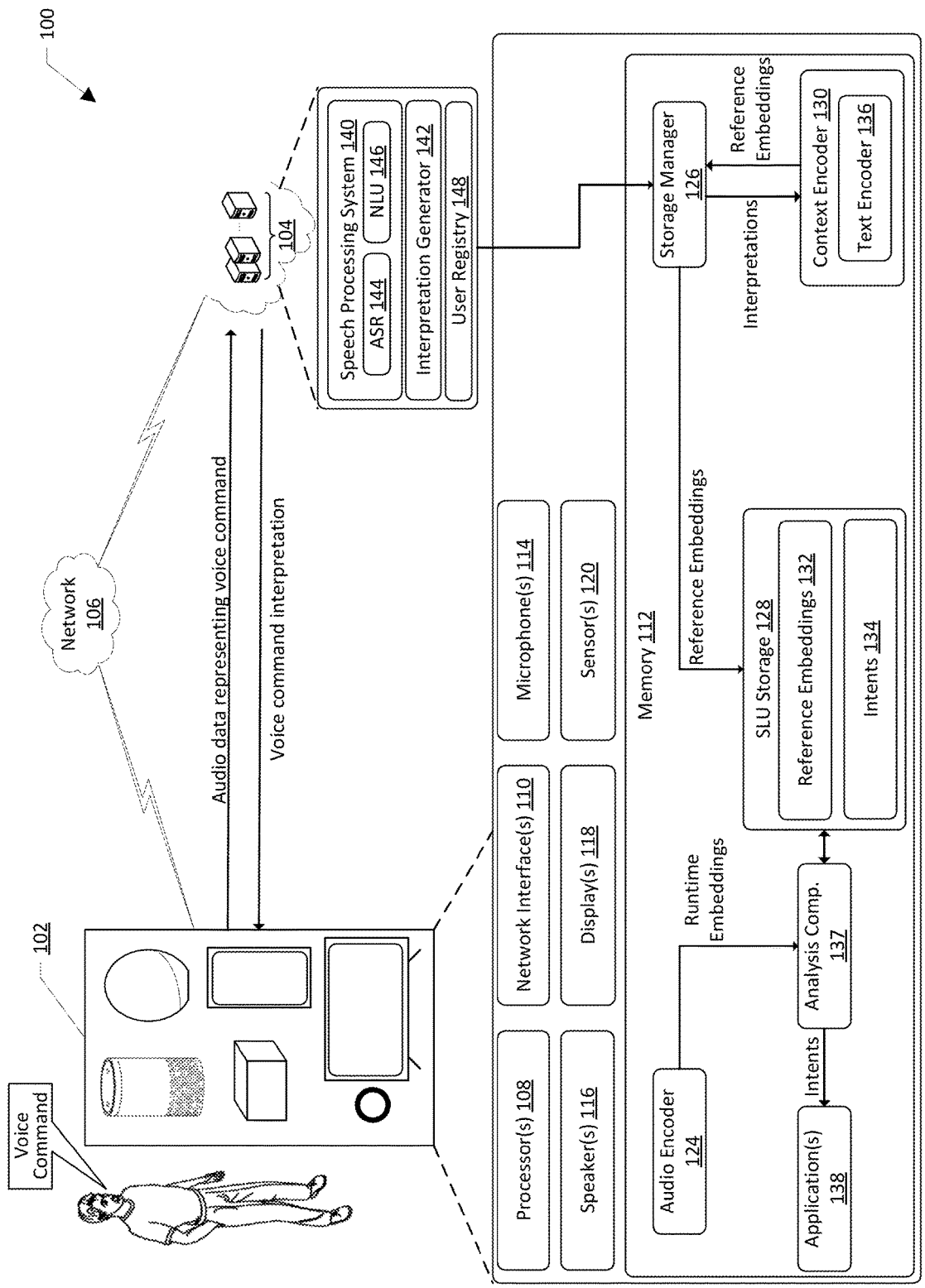
FIG. 1 illustrates a schematic diagram of an example environment for speech processing utilizing customized embeddings.

Systems and methods for speech processing utilizing customized embeddings are disclosed, among other things. Take, for example, an environment (such as a space in and/or around a home, hotel, vehicle, office, store, restaurant, etc.) where one or more devices may be present. The devices may be utilized by one or more users or may otherwise be utilized to detect and/or control conditions associated with the environments. For example, the electronic devices may include voice interface devices (e.g., smart speaker devices, mobile phones, tablets, personal computers, televisions, appliances like refrigerators and microwaves, etc.), graphical interface devices (e.g., televisions, set top boxes, virtual/augmented reality headsets, etc.), wearable devices (e.g., smart watch, earbuds, healthcare devices), transportation devices (e.g., cars, bicycles, scooters, etc.), televisions and/or monitors, smart thermostats, security systems (including motion sensors and open/close sensors, including sensors that indicate whether a security system is armed, disarmed, or in a "home mode"), smart cameras (e.g., home security cameras), and/or touch interface devices (tablets, phones, steering wheels, laptops, kiosks, billboard, other devices with buttons, etc.). Some devices can be multiple types of those noted above.

In these and other scenarios, a given device may be a voice interface device that is configured to receive audio representing a voice command from a user and to generate corresponding audio data representing the voice command. Generally, the audio data may be then sent from the device to other components of a speech processing system for additional speech or other audio processing. Additionally or alternatively, other types of processing from other input components can be shared among the input device and other system components, such as image processing from a camera, presence detection from radio frequency signals, etc. Audio processing is just one example used for illustrative purposes herein, and that audio processing may include speech processing and/or audio processing of non-speech sounds, which may be non-speech human sounds and/or non-human sounds. Such speech processing may generally include the use of automatic speech recognition (ASR) processes and/or natural language understanding (NLU) processes to determine an intent associated with the voice command and then to utilize that intent to determine an action to be performed responsive to the voice command. Alternatively, or additionally, the device itself may have a speech processing system configured to perform ASR and/or NLU. Some devices may not have ample processing capabilities and/or storage abilities to maintain a robust speech processing system on-device or, even if they do, there may be benefits to using less resources for speech processing when more robust system components are available through network communications. In further examples, alternatives to utilizing ASR and/or NLU processes for on-device speech processing may be desirable, even when such devices have ample processing capabilities and/or storage abilities.

As such, in examples, speech processing can be implemented with customized embeddings. Audio data may be input into component(s) and customized embeddings representing the audio data are output. Downstream components (on the device and/or elsewhere) can then perform actions responsive to the embeddings, which in turn represent audio data of voice commands. The embeddings can be generated from speech processing of prior audio data and downloaded onto a device likely to receive a future, similar voice command. In some embodiments, the speech processing components may perform ASR processing on the audio data to generate text or other ASR output data representing a transcription of the spoken words from the audio data. The embedding-generating components of the speech processing system may perform NLU processing on the audio data to generate intent or other NLU output data. The NLU output data may indicate an intent for the voice command. The NLU output data may be sent to one or more speechlets and/or other type of applications that are configured to accept the NLU output data and determine an action to be performed responsive to the voice command. Example actions include, by way of nonlimiting example, controlling smart home devices, controlling output of audio and/or video, retrieving information, etc.

An interpretation generator of the system may receive the NLU output data and/or other data associated with the voice command such as the ASR output data and may generate a reference interpretation of the voice command. The reference interpretation may be generated based at least in part on an execution plan determined by the components of the speech processing system. The execution plan may include the textual representation of the audio data or other ASR output data, the determined intent data or other NLU output data, the determined action to be performed, context data associated with the voice command, which speechlet and/or application was selected, and/or any other data associated with the voice command and/or the response thereto. The interpretation generator may send the reference interpretation to a storage manager of the device.

In other examples, the processes described with respect to the ASR processing and/or NLU processing, and/or the determination of what actions are to be performed or otherwise the processing performed by speechlets and/or other types of applications may be performed by a system that include a large language model (LLM) or otherwise is configured to generate responses and/or content based on inputs such as prompts. In these examples, the LLM may intake a prompt associated with a given user input (such as a voice command) and may determine a response based at least in part on the user input and how the LLM is trained to respond. The output of the LLM and/or the determined action to be taken in examples where the LLM output is not necessarily an action and/or action plan may be utilized to generate a reference interpretation, which may be sent to the storage manager of the device.

The storage manager may be configured to receive the reference interpretation and facilitate the generation and/or storage of a reference embedding that represents the reference interpretation. For example, the storage manager may parse the reference interpretation for the textual representation of the audio data or other ASR output data and, in examples, for the context data associated with the voice command. The textual representation of the audio data or other ASR output data and/or the context data may be sent to a context encoder of the device. The context encoder may include a number of components, including a text encoder, configured to generate a reference embedding that represents that voice command. Additional details on the context encoder and text encoder are provided below, but generally these encoders may include one or more recurrent neural networks (RNNs) and feed forward layers configured to intake the text data or other ASR output data and/or the context data and generate a reference embedding that represents the text data or other ASR output data and/or the context data. The reference embedding may represent a low-dimensional space into which high-dimensional vectors may be translated. Generally, reference embeddings may have less storage requirements than unembedded versions of data utilized to generate the reference embeddings and may be stored, for example, in a cache of the device in question.

Once the reference embedding is generated, the context component may send the reference embedding to the storage manager, which may determine whether and/or how the reference embedding is to be stored in a speech language understanding (SLU) storage of the device. For example, the SLU storage may represent, at least in part, an embedding space to which the reference embeddings may be stored. In examples, individual ones of the reference embeddings may be associated with a vector value in the embedding space indicating a location in the embedding space where the reference embedding is situated. Individual ones of the reference embeddings may be associated with intents determined by the components of the speech processing system. As additional voice commands are received at the device and/or other devices associated with the account data in question, additional reference embeddings may be generated and stored in the SLU storage. The storage manager may be configured to determine how the reference embeddings are to be stored. For example, newly-created reference embeddings that are associated with the same intent as previously-stored reference embeddings may be stored in the embedding space such that the vector values of the two reference embeddings are similar to each other. Additionally, when a newly-created reference embedding conflicts with a previously-stored reference embedding, the storage manager may determine how to arbitrate between the two reference embeddings. Additionally, when a change in the system occurs, which may be described as an invalidation trigger, the storage manager may determine which reference embeddings to invalidate, if appropriate.

Thereafter, the device may receive additional voice commands over time. The device may generate audio data from the received audio and may utilize an audio encoder to generate a runtime embedding of the audio data. As with the context encoder and the text encoder, the audio encoder may be configured to utilize RNNs and feed forward layers to generate a runtime embedding. The runtime embedding may then be analyzed with respect to the reference embeddings stored in the embedding space to determine whether the runtime embedding is similar to one or more of the reference embeddings to at least a threshold degree. For example, the runtime embedding may include a vector value indicating its location in the embedding space. A nearest reference embedding in the embedding space may be determined and a distance between the two locations may be determined. When the distance is within a threshold distance, the device may determine that the runtime embedding is sufficiently similar to the reference embedding. When this occurs, the intent associated with the reference embedding may be determined and corresponding intent data or other NLU output data and/or other data associated with the voice command may be sent to one or more applications to determine an action to be performed responsive to the voice command. By so doing, the device itself may perform speech processing on the voice command and determine the appropriate action to be performed without sending the audio data off-device, without performing ASR processes on the audio data, and without performing NLU processes, in examples.

In examples where a threshold similarity between the runtime embedding and the reference embeddings is not determined, audio data representing the audio may be sent to other components of the speech processing system for speech processing and/or the audio data may be sent to other speech processing components. Intent data or other NLU output data may be generated utilizing this processing and a speechlet may be selected to determine the action to be performed. A command to perform that action may be sent to the device in this example.

Additionally, or alternatively, the device may be configured to send reference embeddings to other devices such that those other devices may utilize the reference embeddings for speech processing. For example, the device may be associated with account data. The account data may indicate one or more other devices that are also associated with the account data. In examples, one or more of those other devices may be selected to receive the reference embeddings. Likewise, the device in question may receive reference embeddings from one or more of the other devices and may store those reference embeddings in the SLU storage for speech processing use. It should be understood that all devices associated with given account data may have the same reference embeddings, some devices may have certain reference embeddings while other devices have different reference embeddings, and/or individual devices may have their own unique reference embeddings with respect to the other devices.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example environment 100 for speech processing utilizing customized embeddings. The environment 100 may include, for example, devices 102. In certain examples, the devices 102 themselves may be any one or more of a voice interface device (e.g., smart speaker devices, mobile phones, tablets, personal computers, etc.), a video interface device (e.g., televisions, set top boxes, virtual/augmented reality headsets, etc.), and/or a touch interface device (tablets, phones, laptops, kiosks, billboard, etc.). In some examples, the devices may be situated in a home, place of business, healthcare facility (e.g., hospital, doctor's office, pharmacy, etc.), in a vehicle (e.g., airplane, truck, car, bus, etc.), and/or in a public forum (e.g., shopping center, store, hotel, etc.), for example. In some nonlimiting examples, at least some of the devices 102 may be multi-modal devices that may be configured to capture audio representing user utterances and/or to capture user input by a display or otherwise.

The devices 102 may be configured to send data to and/or receive data from remote component(s) of a system 104, such as via a network 106. It should be understood that where operations are described herein as being performed by the remote component(s) of the system 104, some or all of those operations may be performed by the devices 102. It should also be understood that anytime the remote component(s) of the system 104 are referenced, that system may include any system and/or device, whether local to an environment of the devices or remote from that environment. Additionally, it should be understood that a given space and/or environment may include numerous devices. It should also be understood that when a "space" or "environment" is used herein, those terms mean an area of any size and delineation and can include but are not necessarily limited to a given room, building, or other structure, unless otherwise specifically described as such.

The devices 102 may include one or more components, such as, for example, one or more processors 108, one or more network interfaces 110, memory 112, one or more microphones 114, one or more speakers 116, one or more displays 118, and/or one or more sensors 120. The microphones 114 may be configured to capture audio, such as user utterances, and generate corresponding audio data. The speakers 116 may be configured to output audio, such as audio corresponding to audio data received from another device. The displays 118 may be configured to display images corresponding to image data, such as image data received from the remote component(s) of the system 104 as well as user interface elements that may be configured to receive user input indicating selection of such user interface elements. The devices 102 may be configured to detect an environmental condition associated with the environment utilizing the sensors 120. Some example sensors 120 that may be utilized to detect conditions may include one or more microphones configured to capture audio associated with the environment in which the device is located, one or more cameras configured to capture images associated with the environment in which the device is located, one or more network interfaces configured to identify network access points associated with the environment, global positioning system components configured to identify a geographic location of the devices, Bluetooth and/or other short-range communication components configured to determine what devices are wirelessly connected to the device, device-connection sensors configured to determine what devices are physically connected to the device, user biometric sensors, and/or one or more other sensors configured to detect a physical condition of the device and/or the environment in which the device is situated. In addition to specific environmental conditions that are detectable by the sensors 120, usage data and/or account data may be utilized to determine if an environmental condition is present. In some examples, the sensors 120 may also include radar and/or ultrasonic sensors. The sensors 120 may be configured to generate context data as utilized herein. The memory 112 may include, for example, an audio encoder 124, a storage manager 126, a SLU storage 128, a context encoder 130, an analysis component 137, and/or one or more applications 138. The context encoder 130 may include a text encoder 136, and the SLU storage 128 may include one or more reference embeddings 132 and one or more intents 134. The components of the memory 112 will be described in more detail below.

It should be understood that while several examples used herein include a voice-enabled device that allows users to interact therewith via user utterances, one or more other devices, which may not include a voice interface, may be utilized instead of or in addition to voice-enabled devices. In these examples, the device 102 may be configured to send and receive data over the network 106 and to communicate with other devices in the environment 100. As such, in each instance where a voice-enabled device is utilized, a computing device that does not include a voice interface may also or alternatively be used. It should be understood that when voice-enabled devices are described herein, those voice-enabled devices may include phones, computers, and/or other computing devices.

The remote component(s) of the system 104 may include components such as, for example, a speech processing system 140, an interpretation generator 142, and/or a user registry 148. It should be understood that while the components of the remote component(s) of the system 104 are depicted and/or described as separate from each other in FIG. 1, some or all of the components may be a part of the same system. The speech processing system 140 may include an automatic speech recognition component (ASR) 144 and/or a natural language understanding component (NLU) 146. Each of the components described herein with respect to the remote component(s) of the system 104 may be associated with their own systems, which collectively may be referred to herein as the remote component(s) of the system 104, and/or some or all of the components may be associated with a single system. Additionally, the remote component(s) of the system 104 may include one or more applications, which may be described as skills. "Skills," as described herein may be applications and/or may be a subset of an application. For example, a skill may receive data representing an intent. For example, an intent may be determined by the NLU component 146 and/or as determined from user input via a computing device. Skills may be configured to utilize the intent to output data for input to a text-to-speech (TTS) component, a link or other resource locator for audio data, and/or a command to a device, such as smart devices. "Skills" may include applications running on devices, such as the smart devices, and/or may include portions that interface with voice user interfaces of smart devices.

In instances where a voice-enabled device is utilized, skills may extend the functionality of smart devices that can be controlled by users utilizing a voice-user interface. In some examples, skills may be a type of application that may be useable in association with target devices and may have been developed specifically to work in connection with given target devices. Additionally, skills may be a type of application that may be useable in association with the voice-enabled device and may have been developed specifically to provide given functionality to the voice-enabled device. In examples, a non-skill application may be an application that does not include the functionality of a skill. Speechlets, as described herein, may be a type of application that may be usable in association with voice-enabled devices and may have been developed specifically to work in connection with voice interfaces of voice-enabled devices. The application(s) may be configured to cause processor(s) to receive information associated with interactions with the voice-enabled device. The application(s) may also be utilized, in examples, to receive input, such as from a user of a personal device and/or the voice-enabled device and send data and/or instructions associated with the input to one or more other devices.

Additionally, the operations and/or functionalities associated with and/or described with respect to the components of the remote component(s) of the system 104 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

With respect to the remote component(s) of the system 104, the user registry 148 may be configured to determine and/or generate associations between users, user accounts, environment identifiers, and/or devices. For example, one or more associations between user accounts may be identified, determined, and/or generated by the user registry 148. The user registry 148 may additionally store information indicating one or more applications and/or resources accessible to and/or enabled for a given user account. Additionally, the user registry 148 may include information indicating device identifiers, such as naming identifiers, associated with a given user account, as well as device types associated with the device identifiers. The user registry 148 may also include information indicating user account identifiers, naming indicators of devices associated with user accounts, and/or associations between devices, such as the smart devices. The user registry 148 may also include information associated with usage of the smart devices. It should also be understood that a user account may be associated with one or more than one user profiles. It should also be understood that the term "user account" may be used to describe a set of data and/or functionalities associated with a given account identifier. For example, data identified, determined, and/or generated while using some or all of the environment 100 may be stored or otherwise associated with an account identifier. Data associated with the user accounts may include, for example, account access information, historical usage data, device-association data, and/or preference data.

The speech-processing system 140 may be configured to receive audio data from the devices 102 and/or other devices and perform speech-processing operations. For example, the ASR component 144 may be configured to generate text data or other ASR output data corresponding to the audio data, and the NLU component 146 may be configured to generate intent data or other NLU output data corresponding to the audio data. In examples, intent data or other NLU output data may be generated that represents the audio data, such as without the generation and/or use of text data or other ASR output data. The intent data or other NLU output data may indicate a determined intent associated with the user utterance as well as a payload and/or value associated with the intent. For example, for a user utterance of "play Video A," the NLU component 146 may identify a "play" intent. In this example where the intent data or other NLU output data indicates an intent to output audio and/or images associated with Video A, the speech processing system 140 may call one or more applications to effectuate the intent. Skills, as described herein may otherwise be described as applications and may include functionality for utilizing intent data or other NLU output data to generate directives and/or instructions.

The components of the environment 100 are described below by way of example. To illustrate, initially in some examples, the device 102 may receive audio representing a given voice command. Audio data corresponding to the voice command may initially be sent to components of the system 104 such as the ASR component 144. The components of the system 104 may perform ASR processes on the audio data (using the ASR component 144) to generate text data or other ASR output data. The text data or other ASR output data may correspond to a textual representation of the voice command from the audio data. The components of the system 104 may also perform NLU processes (using the NLU component 146) to generate intent data or other NLU output data. The intent data or other NLU output data may indicate an intent for the voice command determined by the components of the system 104. The intent data or other NLU output data may be sent to one or more speechlets and/or applications that are configured to accept the intent data or other NLU output data and determine an action to be performed responsive to the voice command. Example actions include, by way of nonlimiting example, controlling smart home devices, controlling output of audio and/or video, retrieving information, etc. Additionally or alternatively, other types of processing from other input components can be shared among the input device and other system components, such as image processing from a camera, presence detection from radio frequency signals, etc. Audio processing is just one example used for illustrative purposes herein, and that audio processing may include speech processing and/or audio processing of non-speech sounds, which may be non-speech human sounds and/or non-human sounds.

At this point, the interpretation generator 142 of the system 104 may receive the intent data or other NLU output data and/or other data associated with the voice command and may generate a reference interpretation of the voice command. The reference interpretation may be generated based at least in part on an execution plan determined by the system 104. The execution plan may include the textual representation of the audio data or other ASR output data, the determined intent data or other NLU output data, the determined action to be performed, context data associated with the voice command, which speechlet and/or application was selected, and/or any other data associated with the voice command and/or the response thereto. The interpretation generator 142 may send the reference interpretation to the storage manager 126 of the device.

The storage manager 126 may be configured to receive the reference interpretation and to facilitate the generation and/or storage of a reference embedding 132 that represents the reference interpretation. For example, the storage manager 126 may parse the reference interpretation for the textual representation of the audio data or other ASR output data and, in examples, for the context data associated with the voice command. The textual representation of the audio data or other ASR output data and/or the context data may be sent to the context encoder 130. The context encoder 130 may include a number of components, including the text encoder 136, configured to generate a reference embedding 132 that represents that voice command. Additional details on the context encoder 130 and text encoder 136 are provided below, but generally these encoders may include one or more RNNs and feed forward layers configured to intake the text data or other ASR output data and/or the context data and generate a reference embedding 132 that represents the text data or other ASR output data and/or the context data. The reference embedding 132 may represent a low-dimensional space into which high-dimensional vectors may be translated. Generally, reference embeddings 132 may have less storage requirements than unembedded versions of data utilized to generate the reference embeddings 132 and may be stored, for example, in a cache of the device in question.

Once the reference embedding 132 is generated, the context encoder 130 may send the reference embedding 132 to the storage manager 126, which may determine whether and/or how the reference embedding 132 is to be stored in the SLU storage 128. For example, the SLU storage 128 may represent, at least in part, an embedding space to which the reference embeddings 132 may be stored. In examples, individual ones of the reference embeddings 132 may be associated with a vector value in the embedding space indicating a location in the embedding space where the reference embedding 132 is situated. Individual ones of the reference embeddings 132 may be associated with the intent determined by the components of the system 104. As additional voice commands are received at the device 102 and/or other devices associated with the account data in question, additional reference embeddings 132 may be generated and stored in the SLU storage 128. The storage manager 126 may be configured to determine how the reference embeddings 132 are to be stored. For example, newly-created reference embeddings 132 that are associated with the same intent as previously-stored reference embeddings 132 may be stored in the embedding space such that the vector values of the two reference embeddings 132 are similar to each other. Additionally, when a newly-created reference embedding 132 conflicts with a previously-stored reference embedding 132, the storage manager 126 may determine how to arbitrate between the two reference embeddings 132. Additionally, when a change in the system 104 occurs, which may be described as an invalidation trigger, the storage manager 126 may determine which reference embeddings 132 to invalidate, if appropriate.

Thereafter, the device 102 may receive additional voice commands over time. The device 102 may generate audio data from the received audio and may utilize the audio encoder 124 to generate a runtime embedding of the audio data. As with the context encoder 130 and the text encoder 136, the audio encoder 124 may be configured to utilize RNNs and feed forward layers to generate a runtime embedding. The runtime embedding may then be sent to the analysis component 137 for analysis with respect to the reference embeddings 132 stored in the embedding space to determine whether the runtime embedding is similar to one or more of the reference embeddings 132 to at least a threshold degree. For example, the runtime embedding may include a vector value indicating its location in the embedding space. A nearest reference embedding 132 in the embedding space may be determined by the analysis component 137 and a distance between the two locations may be determined. When the distance is within a threshold distance, the analysis component 137 may determine that the runtime embedding is sufficiently similar to the reference embedding 132. When this occurs, the intent associated with the reference embedding 132 may be determined and corresponding intent data or other NLU output data and/or other data associated with the voice command may be sent to the application(s) 138 to determine an action to be performed responsive to the voice command. By so doing, the device 102 itself may perform speech processing on the voice command and determine the appropriate action to be performed without sending the audio data off-device, without performing ASR processes on the audio data, and without performing NLU processes, in examples.

In examples where a threshold similarity between the runtime embedding and the reference embeddings 132 is not determined, audio data representing the audio may be sent to other components of the system 104 for speech processing. Intent data or other NLU output data may be generated utilizing this processing and a speechlet may be selected to determine the action to be performed. A command to perform that action may be sent to the device 102 in this example.

Additionally, or alternatively, the device 102 may be configured to send reference embeddings 132 to other devices such that those other devices may utilize the reference embeddings 132 for speech processing. For example, the device 102 may be associated with account data. The account data may indicate one or more other devices that are also associated with the account data. In examples, one or more of those other devices may be selected to receive the reference embeddings 132. Likewise, the device 102 in question may receive reference embeddings 132 from one or more of the other devices and may store those reference embeddings 132 in the SLU storage 128 for speech processing use. It should be understood that all devices 102 associated with given account data may have the same reference embeddings 132, some devices 102 may have certain reference embeddings 132 while other devices 102 have different reference embeddings 132, and/or individual devices 102 may have their own unique reference embeddings 132 with respect to the other devices 102.

As used herein, the one or more processes performed by the device 102 and/or the remote component(s) of the system 104 may include the use of models. These models may be machine learning models. For example, the machine learning models as described herein may include predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases and may be utilized to predict trends and behavior patterns. In examples, the event, otherwise described herein as an outcome, may be an event that will occur in the future, such as whether presence will be detected. The predictive analytic techniques may be utilized to determine associations and/or relationships between explanatory variables and predicted variables from past occurrences and utilizing these variables to predict the unknown outcome.

The predictive analytic techniques may include defining the outcome and data sets used to predict the outcome. Then, data may be collected and/or accessed to be used for analysis.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter, predictive modelling may be performed to generate accurate predictive models for future events. Outcome prediction may be deterministic such that the outcome is determined to occur or not occur. Additionally, or alternatively, the outcome prediction may be probabilistic such that the outcome is determined to occur to a certain probability and/or confidence.

As described herein, the machine learning models may be configured to be trained utilizing a training dataset associated with prior user input data. The models may be trained for multiple user accounts and/or for a specific user account. As such, the machine learning models may be configured to learn, without human intervention, attributes of collected data and/or actions taken associated with device usage cessation.

It should be noted that while text data or other ASR output data is described as a type of data utilized to communicate between various components of the remote component(s) of the system 104 and/or other systems and/or devices, the components of the remote component(s) of the system 104 may use any suitable format of data to communicate. For example, the data may be in a human-readable format, such as text data or other ASR output data formatted as XML, SSML, and/or other markup language, or in a computer-readable format, such as binary, hexadecimal, etc., which may be converted to text data or other ASR output data for display by one or more devices such as the devices.

As shown in FIG. 1, several of the remote component(s) of the system 104 and the associated functionality of those components as described herein may be performed by one or more of the devices 102. Additionally, or alternatively, some or all of the components and/or functionalities associated with the devices 102 may be performed by the remote component(s) of the system 104.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 108 and/or the processor(s) described with respect to the components of the system 104, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 108 and/or the processor(s) described with respect to the components of the system 104 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 108 and/or the processor(s) described with respect to the components of the system 104 may possess its own local memory, which also may store program components, program data, and/or one or more operating systems.

The memory 112 and/or the memory described with respect to the components of the system 104 may include volatile and nonvolatile memory, removable and non-removable media implemented in any method or technology for storage of information, such as non-transitory computer-readable instructions, data structures, program component, or other data. Such memory 112 and/or the memory described with respect to the components of the system 104 may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 112 and/or the memory described with respect to the components of the system 104 may be implemented as computer-readable storage media ("CRSM"), which may be any available physical media accessible by the processor(s) 108 and/or the processor(s) described with respect to the system 104 to execute instructions stored on the memory 112 and/or the memory described with respect to the components of the system 104. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 112 and/or the memory described with respect to the components of the system 104, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 110 and/or the network interface (s) described with respect to the components of the system 104 may enable messages between the components and/or devices shown in environment 100 and/or with one or more other polling systems, as well as other networked devices. Such network interface(s) 110 and/or the network interface (s) described with respect to the components of the system 104 may include one or more network interface controllers (NICs) or other types of transceiver devices to send and receive messages over the network 106.

For instance, each of the network interface(s) 110 and/or the network interface(s) described with respect to the components of the system 104 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 110 and/or the network interface(s) described with respect to the components of the system 104 may include a wide area network (WAN) component to enable message over a wide area network.

In some instances, the remote component(s) of the system 104 may be local to an environment associated the devices. For instance, the remote component(s) of the system 104 may be located within one or more of the first user devices 102 and/or the smart devices. In some instances, some or all of the functionality of the remote component(s) of the system 104 may be performed by one or more of the devices. Also, while various components of the system 104 have been labeled and named in this disclosure and each component has been described as being configured to cause the processor(s) to perform certain operations, it should be understood that the described operations may be performed by some or all of the components and/or other components not specifically illustrated. It should be understood that, in addition to the above, some or all of the operations described herein may be performed on a phone or other mobile device and/or on a device local to the environment, such as, for example, a hub device and/or edge server in a home and/or office environment, a self-driving automobile, a bus, an airplane, a camper, a trailer, and/or other similar object having a computer to perform its own sensor processing, etc.

Figure 2:
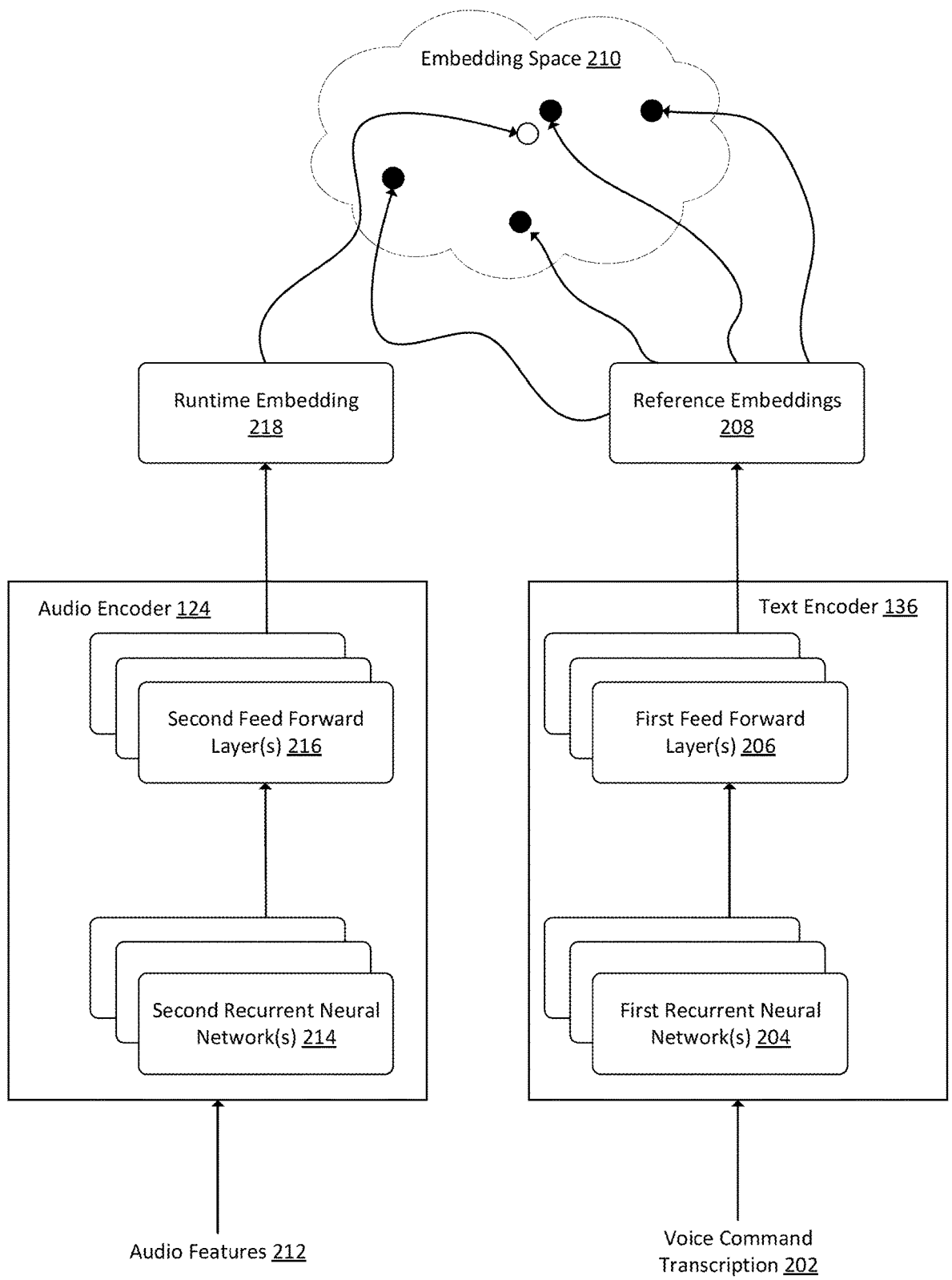
FIG. 2 illustrates a conceptual diagram of components utilized to generate runtime embeddings and reference embeddings.

FIG. 2 illustrates a conceptual diagram of components utilized to generate runtime embeddings and reference embeddings. The reference embeddings may be the same or similar to the reference embeddings described with respect to FIG. 1. Additionally, the runtime embeddings described with respect to FIG. 2 may be the same or similar to the runtime embeddings described with respect to FIG. 1. Additionally, FIG. 2 depicts an audio encoder and a text encoder. The audio encoder may be the same as or similar to the audio encoder 124 described with respect to FIG. 1, and the text encoder may be the same as or similar to the text encoder 136 described with respect to FIG. 1.

To start, a storage manager of the device in question may be configured to receive a reference interpretation from components of a speech processing system and to facilitate the generation and/or storage of a reference embedding 208 that represents the reference interpretation. As described above, the reference interpretation may include speech processing results performed on audio data representing a voice command. Those speech processing results may include, for example, a textual representation of the voice command, intent data or other NLU output data, context data, etc. Additionally or alternatively, other types of processing from other input components can be shared among the input device and other system components, such as image processing from a camera, presence detection from radio frequency signals, etc. Audio processing is just one example used for illustrative purposes herein, and that audio processing may include speech processing and/or audio processing of non-speech sounds, which may be non-speech human sounds and/or non-human sounds. The storage manager may parse the reference interpretation for the textual representation and, in examples, for the context data. The textual representation and/or the context data may be sent to a context encoder. The context encoder may include a number of components, including the text encoder 136, configured to generate a reference embedding 208.

For example, a voice command transcription 202 (which may be the same as or similar to the textual representation of the voice command as described herein) may be received at the text encoder 136. In other examples, a representation of the non-audio input and/or non-speech audio input may be received. One or more first RNNs 204 may receive the voice command transcription 202 and may map input information (e.g., the voice command transcription 202 from a high-dimensional space to a lower-dimensional space. This may allow the RNNs 204 to determine relationships between the inputs it receives to process data more efficiently. By way of example in speech processing, instead of using high-dimensional vectors, the RNNs 204 may map individual words from the voice command transcription 202 to a low-dimensional vector, where each dimension may represent a particular feature of the word in question. From there, the RNNs 204 may send the output from their processes to one or more first feed forward layers 206 of the text encoder 136. The feed forward layers 206 may be configured to intake the output from the RNNs 204 and to generate the reference embedding 208 in question. The result of the text encoder 136 may be a low-dimensional representation of the voice command transcription 202 that has less storage needs and represents a vector value that may be associated with an embedding space 210. Generally, reference embeddings 208 may have less storage requirements than unembedded versions of data utilized to generate the reference embeddings 208 and may be stored, for example, in a cache of the device in question. In examples, context data may also be utilized as input to the RNNs 204 and/or the feed forward layers 206 to generate the reference embeddings 208.

Once the reference embedding 208 is generated, a storage manager of the device may determine whether and/or how the reference embedding 208 is to be stored in a SLU storage. For example, the SLU storage may represent, at least in part, the embedding space 210 to which the reference embeddings 208 may be stored. In examples, individual ones of the reference embeddings 208 may be associated with a vector value in the embedding space 210 indicating a location in the embedding space where the reference embedding 208 is situated. Individual ones of the reference embeddings 208 may be associated with the intent determined by the system. As additional voice commands are received at the device in question and/or other devices associated with the account data in question, additional reference embeddings 208 may be generated and stored in the SLU storage. The storage manager may be configured to determine how the reference embeddings 208 are to be stored. For example, newly-created reference embeddings 208 that are associated with the same intent as previously-stored reference embeddings 208 may be stored in the embedding space 210 such that the vector values of the two reference embeddings 208 are similar to each other. Additionally, when a newly-created reference embedding 208 conflicts with a previously-stored reference embedding 208, the storage manager may determine how to arbitrate between the two reference embeddings 208. Additionally, when a change in the system 104 occurs, which may be described as an invalidation trigger, the storage manager may determine which reference embeddings 208 to invalidate, if appropriate.

Thereafter, the device 102 may receive additional voice commands over time. The device 102 may generate audio data from the received audio, and the audio data may include one or more audio features 212. The audio features 212 may be utilized by the audio encoder 124 to generate a runtime embedding 218 of the audio data. As with the text encoder 136, the audio encoder 124 may be configured to utilize second RNNs 214 and second feed forward layers 216 to generate a runtime embedding 218. The runtime embedding 218 may then be analyzed with respect to the reference embeddings 208 stored in the embedding space 210 to determine whether the runtime embedding 218 is similar to one or more of the reference embeddings 208 to at least a threshold degree. For example, the runtime embedding 218 may include a vector value indicating its location in the embedding space 210. A nearest reference embedding 208 in the embedding space 210 may be determined and a distance between the two locations may be determined. When the distance is within a threshold distance, the device may determine that the runtime embedding 218 is sufficiently similar to the reference embedding 208. It should be understood that distances between embeddings in the embedding space 210 may be mathematical as opposed to physical. For example, another way of describing the similarity determination between a reference embedding 208 and a runtime embedding 218 may be to determine a similarity between the embeddings themselves and/or between vector values associated with the embeddings. A similarity score may be determined and applied to a similarity scale to determine how similar the embeddings are to each other. For example, a similarity scale of −1 to 1 may be employed and a similarity threshold of 0.9 may be applied. It should be understood that any similarity scale may be utilized and any similarity threshold may be utilized and that these scales and/or thresholds may be static or dynamic. When embeddings are determined to be sufficiently similar, the intent associated with the reference embedding 208 may be determined and corresponding intent data or other NLU output data and/or other data associated with the voice command may be sent to one or more applications to determine an action to be performed responsive to the voice command.

In examples where a threshold similarity between the runtime embedding 218 and the reference embeddings 208 is not determined, audio data representing the audio may be sent to other components of the system for speech processing. Intent data or other NLU output data may be generated utilizing this processing and a speechlet may be selected to determine the action to be performed. A command to perform that action may be sent to the device in this example.

Figure 3:
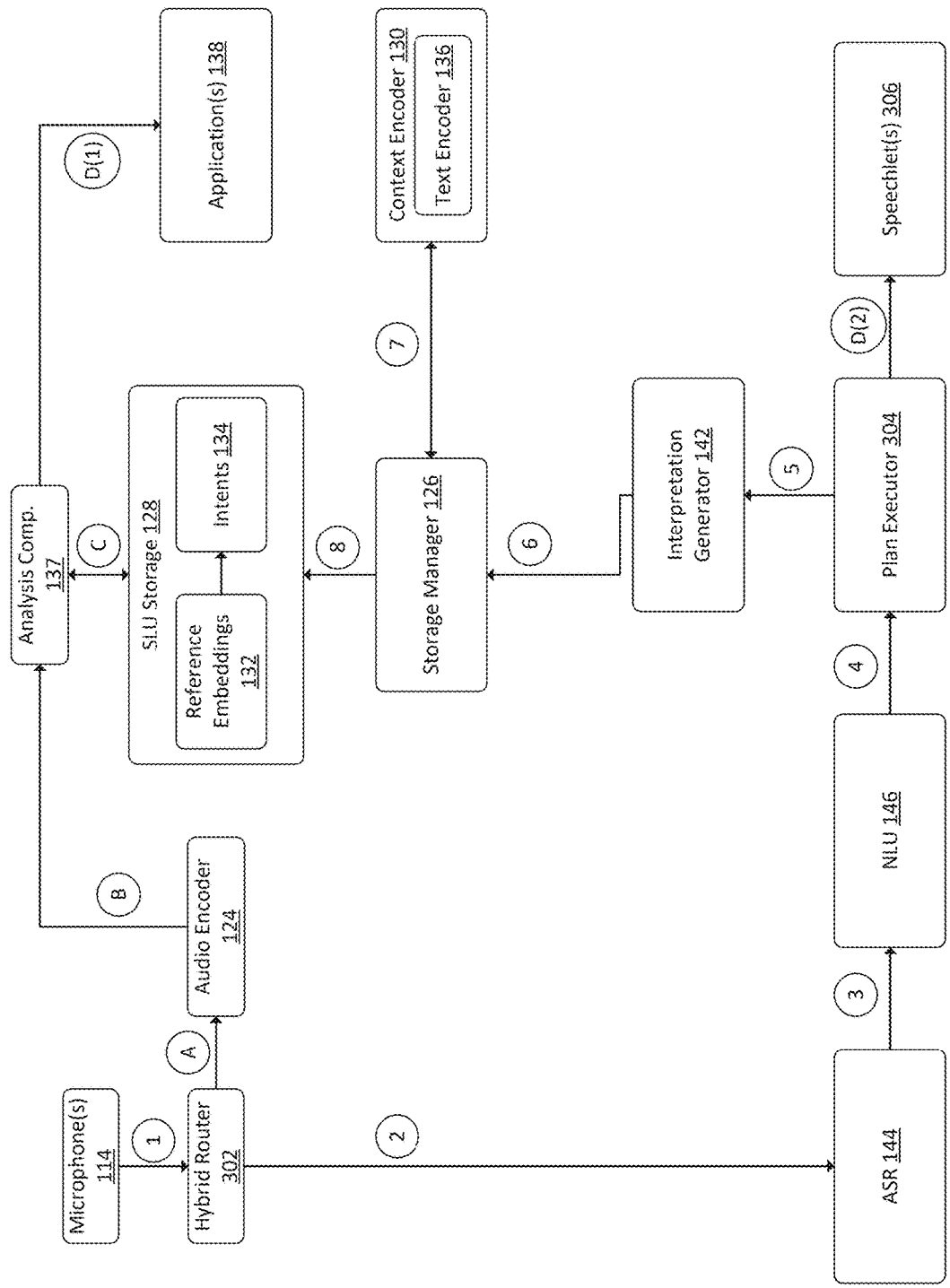
FIG. 3 illustrates a conceptual diagram of example components for speech processing utilizing customized embeddings.

FIG. 3 illustrates a conceptual diagram of example components for speech processing utilizing customized embeddings. FIG. 3 may include some of the components described with respect to FIG. 1, including for example one or more microphones 114, an audio encoder 124, a storage manager 126, a SLU storage 128, a context encoder 130, reference embeddings 132, intents 134, a text encoder 136, an analysis component 137, one or more applications 138, an interpretation generator 142, an ASR component 144, and/or a NLU component 146. Additionally, FIG. 3 may include a hybrid router 302, a plan executor 304, and/or one or more speechlets 306. Each of these components is described below by way of example. As shown in FIG. 3, the depicted components may be associated with processes illustrated as steps 1-8 and steps A-D(2). It should be understood that the processes may include more or fewer steps and that the steps may be performed in an order that differs from the example provided in FIG. 3 and/or may be performed in parallel.

At step 1, initially in some examples, the device may receive audio at the microphones 114 representing a given voice command. The microphones 114 may generate audio data representing the audio, and that audio data may be sent to the hybrid router 302. Additionally or alternatively, other types of processing from other input components can be shared among the input device and other system components, such as image processing from a camera, presence detection from radio frequency signals, etc. Audio processing is just one example used for illustrative purposes herein, and that audio processing may include speech processing and/or audio processing of non-speech sounds, which may be non-speech human sounds and/or non-human sounds.

At step 2, the hybrid router 302 may determine where to send the audio data. In some examples, the hybrid router 302 may send the audio data only to other components of the device in question. In other examples, the hybrid router 302 may send the audio data only to other components of the system. Additional details on the hybrid router 302 and the hybrid engine associated with the device(s) are provided in FIG. 11, below. In the example of FIG. 3, the audio data corresponding to the voice command may initially be sent to the ASR component 144 of the system.

At step 3, the ASR component 144 may perform ASR processes on the audio data to generate text data or other ASR output data. The text data or other ASR output data may correspond to a textual representation of the voice command from the audio data. Additional details on ASR processes are provided below with respect to FIG. 10.

At step 4, the NLU component 146 may perform NLU processes to generate intent data or other NLU output data. The intent data or other NLU output data may indicate an intent for the voice command determined by the system. The intent data or other NLU output data may be sent to the plan executor 304, which may be configured to determine which speechlets 306 and/or applications are configured to accept the intent data or other NLU output data and determine an action to be performed responsive to the voice command. The plan executor 304 may generate an execution plan that indicates the results of the speech processing performed by the system and that includes at least some of the data utilized to generate the execution plan. Example actions include, by way of nonlimiting example, controlling smart home devices, controlling output of audio and/or video, retrieving information, etc. Again, additional details on NLU processes are provided below with respect to FIG. 10.

At step 5, the interpretation generator 142 may receive the intent data or other NLU output data and/or other data associated with the voice command from the plan executor 304 and may generate a reference interpretation of the voice command. The reference interpretation may be generated based at least in part on the execution plan determined by the interpretation generator 142. The execution plan may include the textual representation of the audio data or other ASR output data, the determined intent data or other NLU output data, the determined action to be performed, context data associated with the voice command, which speechlet and/or application was selected, and/or any other data associated with the voice command and/or the response thereto.

At step 6, the interpretation generator 142 may send the reference interpretation to the storage manager 126 of the device. In examples, the reference interpretation may be sent to the storage manager 126 after the action responsive to the voice command has been performed. Doing so may mitigate the introduction of latency into the process of responding to the voice command while also allowing the storage manager 126 to receive the reference interpretation for use in generating reference embeddings.

At step 7, the storage manager 126 may be configured to receive the reference interpretation and to facilitate the generation and/or storage of a reference embedding 132 that represents the reference interpretation. For example, the storage manager 126 may parse the reference interpretation for the textual representation of the audio data or other ASR output data and, in examples, for the context data associated with the voice command. The textual representation of the audio data or other ASR output data and/or the context data may be sent to the context encoder 130. The context encoder 130 may include a number of components, including the text encoder 136, configured to generate a reference embedding 132 that represents that voice command. Additional details on the context encoder 130 and text encoder 136 are provided in FIG. 2, but generally these encoders may include one or more RNNs and feed forward layers configured to intake the text data or other ASR output data and/or the context data and generate a reference embedding 132 that represents the text data or other ASR output data and/or the context data. The reference embedding 132 may represent a low-dimensional space into which high-dimensional vectors may be translated. Generally, reference embeddings 132 may have less storage requirements than unembedded versions of data utilized to generate the reference embeddings 132 and may be stored, for example, in a cache of the device in question. Once the reference embedding 132 is generated, the context encoder 130 may send the reference embedding 132 to the storage manager 126.

At step 8, the storage manager 126 may determine whether and/or how the reference embedding 132 is to be stored in the SLU storage 128. For example, the SLU storage 128 may represent, at least in part, an embedding space to which the reference embeddings 132 may be stored. In examples, individual ones of the reference embeddings 132 may be associated with a vector value in the embedding space indicating a location in the embedding space where the reference embedding 132 is situated. Individual ones of the reference embeddings 132 may be associated with the intent determined by the system 104. As additional voice commands are received at the device and/or other devices associated with the account data in question, additional reference embeddings 132 may be generated and stored in the SLU storage 128. The storage manager 126 may be configured to determine how the reference embeddings 132 are to be stored. For example, newly-created reference embeddings 132 that are associated with the same intent as previously-stored reference embeddings 132 may be stored in the embedding space such that the vector values of the two reference embeddings 132 are similar to each other. Additionally, when a newly-created reference embedding 132 conflicts with a previously-stored reference embedding 132, the storage manager 126 may determine how to arbitrate between the two reference embeddings 132. Additionally, when a change in the system occurs, which may be described as an invalidation trigger, the storage manager 126 may determine which reference embeddings 132 to invalidate, if appropriate.

At step A, which may represent initiation of a runtime process for comparing reference embeddings 132 with runtime embeddings, the microphones 114 may receive additional voice commands over time. The microphones 114 may generate audio data from the received audio and the hybrid router 302 may determine to route the audio data to various components, including for example the audio encoder 124. As with the context encoder 130 and the text encoder 136, the audio encoder 124 may be configured to utilize RNNs and feed forward layers to generate a runtime embedding of the audio data.

At step B, the audio encoder may send the runtime embedding to the analysis component 137. At step C, the analysis component 137 may query the SLU storage 128 for the reference embeddings 132 and the analysis component 137 may analyze the runtime embedding with respect to the reference embeddings 132 stored in the embedding space of the SLU storage 128 to determine whether the runtime embedding is similar to one or more of the reference embeddings 132 to at least a threshold degree. For example, the runtime embedding may include a vector value indicating its location in the embedding space. A nearest reference embedding 132 in the embedding space may be determined and a distance between the two locations may be determined. When the distance is within a threshold distance, the device 102 may determine that the runtime embedding is sufficiently similar to the reference embedding 132.

When this occurs, the intent 134 associated with the reference embedding 132 may be determined and corresponding intent data or other NLU output data and/or other data associated with the voice command may be sent, at step D(1), to the application(s) 138 to determine an action to be performed responsive to the voice command. By so doing, the device itself may perform speech processing on the voice command and determine the appropriate action to be performed without sending the audio data off-device, without performing ASR processes on the audio data, and without performing NLU processes, in examples.

In examples where a threshold similarity between the runtime embedding and the reference embeddings 132 is not determined, at step D(2), audio data representing the audio may be sent to other component of the system for speech processing. Intent data or other NLU output data may be generated utilizing this processing and a speechlet 306 may be selected to determine the action to be performed. A command to perform that action may be sent to the device in this example.

Figure 4:
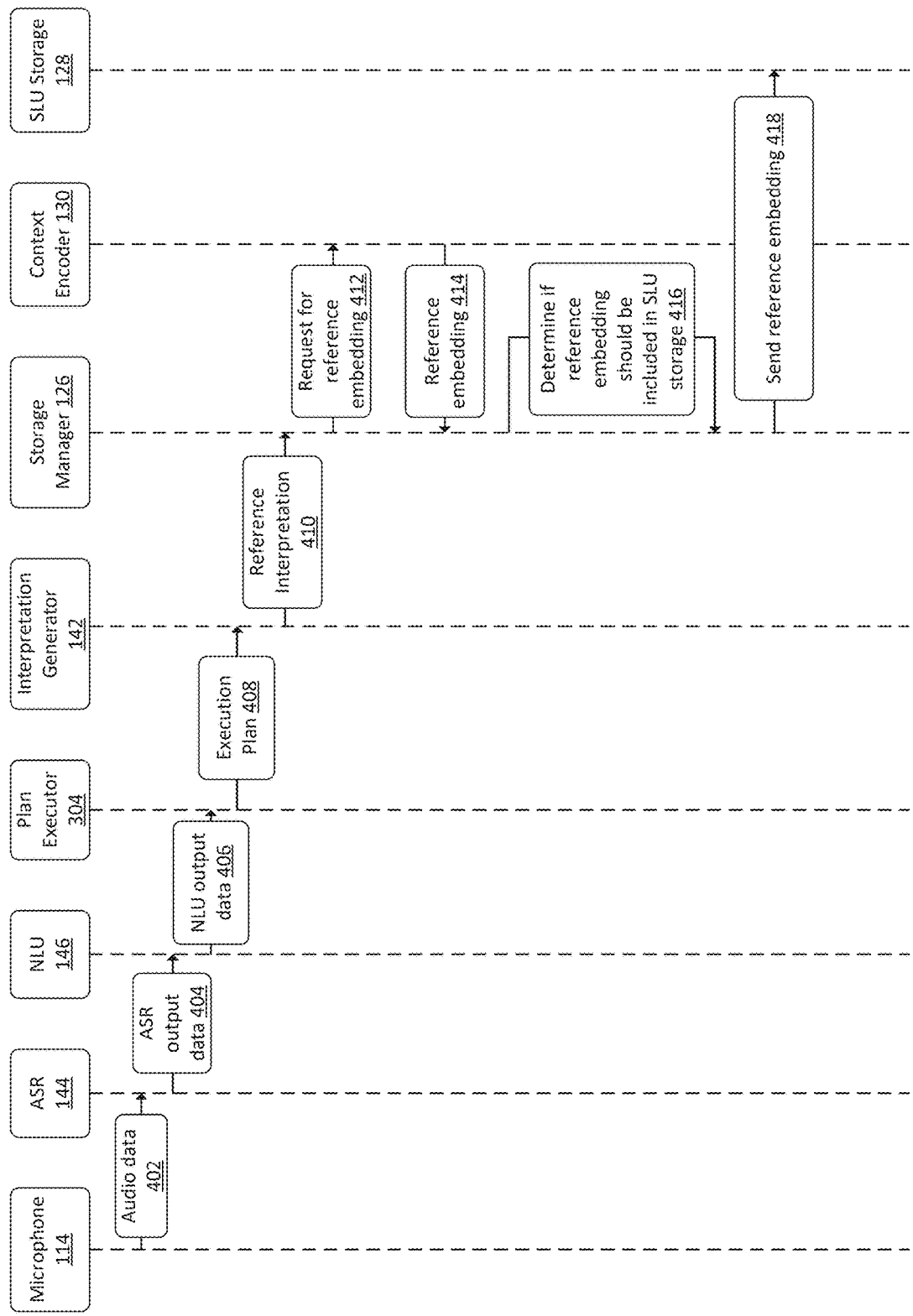
FIG. 4 illustrates a sequence diagram of an example process for generating reference embeddings.
Figure 5:
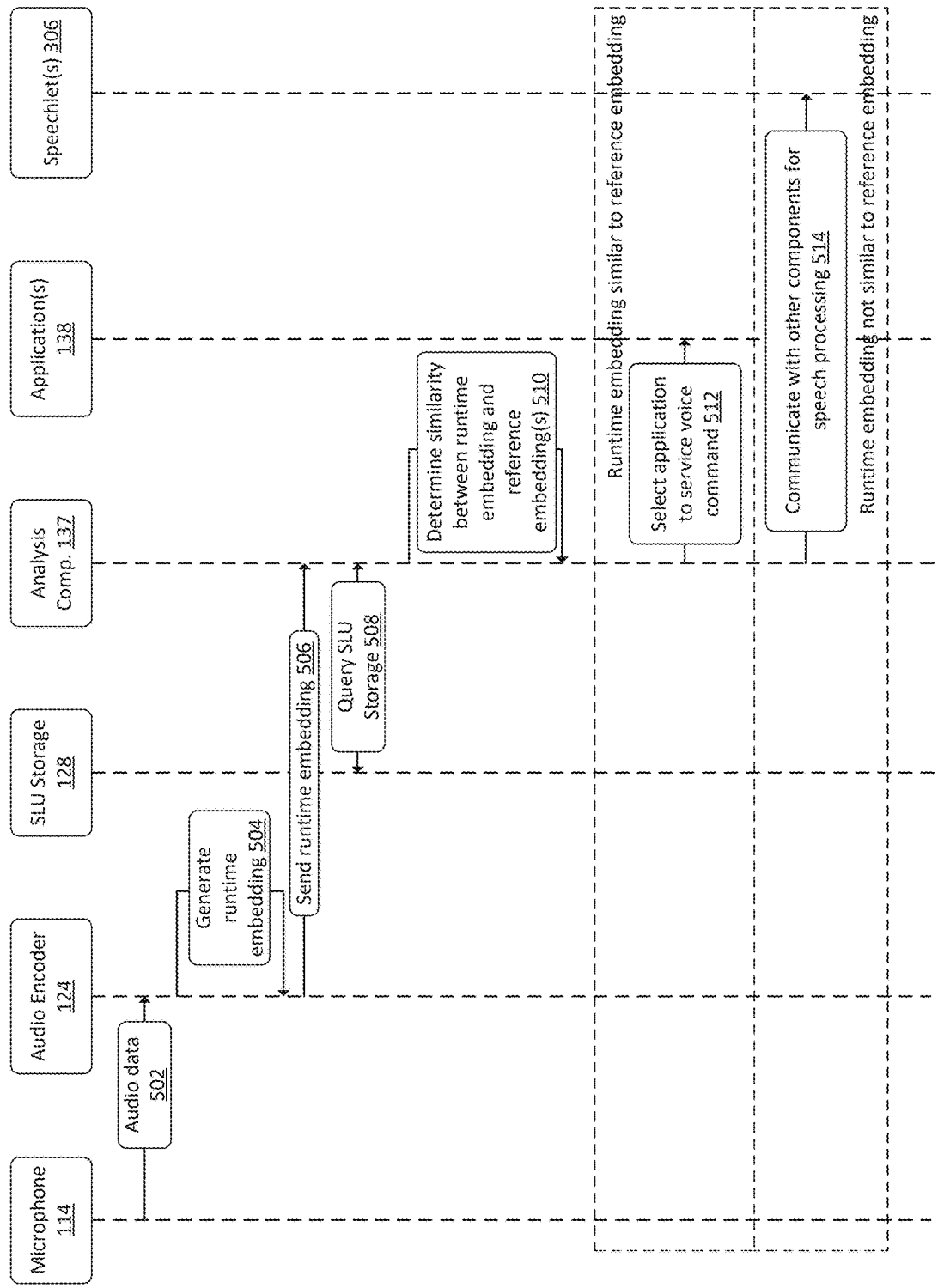
FIG. 5 illustrates a sequence diagram of an example process for analyzing runtime embeddings in association with reference embeddings during speech processing.

FIGS. 4 and 5 illustrate processes for speech processing utilizing customized embeddings. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-3 and 6A-11, although the processes may be implemented in a wide variety of other environments, architectures and systems.

FIG. 4 illustrates a sequence diagram of an example process for generating reference embeddings. The order in which the operations or steps are described is not intended to be construed as a limitation, and any number of the described operations may be combined in any order and/or in parallel to implement process 400.

At block 402, the microphone 114 may send audio data representing a voice command to an ASR component 144. For example, the device may receive audio at the microphones 114 representing a given voice command. The microphones 114 may generate audio data representing the audio. Additionally or alternatively, other types of processing from other input components can be shared among the input device and other system components, such as image processing from a camera, presence detection from radio frequency signals, etc. Audio processing is just one example used for illustrative purposes herein, and that audio processing may include speech processing and/or audio processing of non-speech sounds, which may be non-speech human sounds and/or non-human sounds.

At block 404, the ASR component 144 may perform ASR processing on the audio data to generate text data or other ASR output data. The text data or other ASR output data may be sent from the ASR component 144 to a NLU component 146. For example, the ASR component 144 may perform ASR processes on the audio data to generate text data or other ASR output data. The text data or other ASR output data may correspond to a textual representation of the voice command from the audio data. Additional details on ASR processes are provided below with respect to FIG. 10.

At block 406, the NLU component 146 may generate intent data or other NLU output data associated with the voice command and may send the intent data or other NLU output data and/or the text data or other ASR output data from the ASR component 144 to a plan executor 304. For example, the intent data or other NLU output data may indicate an intent for the voice command determined by the system. The intent data or other NLU output data may be sent to the plan executor 304, which may be configured to determine which speechlets and/or applications are configured to accept the intent data or other NLU output data and determine an action to be performed responsive to the voice command.

At block 408, the plan executor 304 may generate an execution plan that indicates the results of the speech processing performed by the system and that includes at least some of the data utilized to generate the execution plan. Example actions include, by way of nonlimiting example, controlling smart home devices, controlling output of audio and/or video, retrieving information, etc. Again, additional details on NLU processes are provided below with respect to FIG. 10. The execution plan may be sent to the interpretation generator 142.

At block 410, the interpretation generator 142 may generate a reference interpretation from the text data or other ASR output data and/or the intent data or other NLU output data and may send the reference interpretation to the storage manager 126. For example, the interpretation generator 142 may receive the intent data or other NLU output data and/or other data associated with the voice command from the plan executor and may generate a reference interpretation of the voice command. The reference interpretation may be generated based at least in part on the execution plan determined by the system. The execution plan may include the textual representation of the audio data or other ASR output data, the determined intent data or other NLU output data, the determined action to be performed, context data associated with the voice command, which speechlet and/or application was selected, and/or any other data associated with the voice command and/or the response thereto. The interpretation generator 142 may send the reference interpretation to the storage manager 126 of the device. In examples, the reference interpretation may be sent to the storage manager 125 after the action responsive to the voice command has been performed. Doing so may mitigate the introduction of latency into the process of responding to the voice command while also allowing the storage manager 126 to receive the reference interpretation for use in generating reference embeddings.

At block 412, the storage manager 126 may send a request for a reference embedding to the context encoder 130. The storage manager 126 may be configured to receive the reference interpretation and to facilitate the generation and/or storage of a reference embedding that represents the reference interpretation. For example, the storage manager 126 may parse the reference interpretation for the textual representation of the audio data or other ASR output data and, in examples, for the context data associated with the voice command. The textual representation of the audio data or other ASR output data and/or the context data may be sent to the context encoder 130. The context encoder 130 may include a number of components, including a text encoder, configured to generate a reference embedding that represents that voice command. Additional details on the context encoder 130 and text encoder are provided in FIG. 2, but generally these encoders may include one or more RNNs and feed forward layers configured to intake the text data or other ASR output data and/or the context data.

At block 414, the context encoder may send the reference embedding to the storage manager 126 in response to the request for the reference embedding. For example, the reference embedding may be sent back to the storage manager 126 along with information about the reference embedding, if present, such as the inputs associated with generating the reference embedding.

At block 416, the storage manager 126 may determine if the reference embedding should be included in a SLU storage 128. For example, the storage manager 126 may determine whether and/or how the reference embedding is to be stored in the SLU storage 128. For example, the SLU storage 128 may represent, at least in part, an embedding space to which the reference embeddings may be stored. In examples, individual ones of the reference embeddings may be associated with a vector value in the embedding space indicating a location in the embedding space where the reference embedding is situated. Individual ones of the reference embeddings may be associated with the intent determined by the system. As additional voice commands are received at the device and/or other devices associated with the account data in question, additional reference embeddings may be generated and stored in the SLU storage 128. The storage manager 126 may be configured to determine how the reference embeddings are to be stored. For example, newly-created reference embeddings that are associated with the same intent as previously-stored reference embeddings may be stored in the embedding space such that the vector values of the two reference embeddings are similar to each other. Additionally, when a newly-created reference embedding conflicts with a previously-stored reference embedding, the storage manager 126 may determine how to arbitrate between the two reference embeddings. Additionally, when a change in the system occurs, which may be described as an invalidation trigger, the storage manager 126 may determine which reference embeddings to invalidate, if appropriate.

At block 418, when the storage manager 126 determines that the reference embedding should be included in the SLU storage 128, the storage manager 126 may send the reference embedding to the SLU storage 128 for inclusion in the SLU storage 128. The SLU storage 128 may receive the reference embedding and store the reference embedding in the embedding space.

FIG. 5 illustrates a sequence diagram of an example process for analyzing runtime embeddings in association with reference embeddings during speech processing. The order in which the operations or steps are described is not intended to be construed as a limitation, and any number of the described operations may be combined in any order and/or in parallel to implement process 500.

At block 502, a microphone 114 may send audio data representing a voice command to an audio encoder 124. For example, at initiation of a runtime process for comparing reference embeddings with runtime embeddings, the microphone 114 may receive voice commands over time. The microphone 114 may generate audio data from the received audio. Additionally or alternatively, other types of processing from other input components can be shared among the input device and other system components, such as image processing from a camera, presence detection from radio frequency signals, etc. Audio processing is just one example used for illustrative purposes herein, and that audio processing may include speech processing and/or audio processing of non-speech sounds, which may be non-speech human sounds and/or non-human sounds.

At block 504, the audio encoder may generate a runtime embedding of the audio data. For example, as with the context encoder and the text encoder described above, the audio encoder 124 may be configured to utilize RNNs and feed forward layers to generate a runtime embedding of the audio data.

At block 506, the audio encoder may send the runtime embedding to an analysis component 137. For example, the runtime embedding may be received at the analysis component 137 and a vector value associated with the runtime embedding may be determined and may be associated with the embedding space to determine a location in the embedding space where the runtime embedding is associated.

At block 508, the analysis component 137 may query the SLU storage 128 for data associated with the reference embeddings such that the runtime embedding and the reference embeddings may be analyzed. The values associated with the reference embeddings in the embedding space may be provided to the analysis component 137 in response to the query.

At block 510, the analysis component 137 may determine a similarity between the runtime embedding and one or more reference embeddings stored in the SLU storage. For example, the runtime embedding may include a vector value indicating its location in the embedding space. A nearest reference embedding in the embedding space may be determined and a distance between the two locations may be determined. When the distance is within a threshold distance, the device may determine that the runtime embedding is sufficiently similar to the reference embedding. It should be understood that distances between embeddings in the embedding space may be mathematical as opposed to physical. For example, another way of describing the similarity determination between a reference embedding and a runtime embedding may be to determine a similarity between the embeddings themselves and/or between vector values associated with the embeddings. A similarity score may be determined and applied to a similarity scale to determine how similar the embeddings are to each other. For example, a similarity scale of −1 to 1 may be employed and a similarity threshold of 0.9 may be applied. It should be understood that any similarity scale may be utilized and any similarity threshold may be utilized and that these scales and/or thresholds may be static or dynamic.

At block 512, in an example where the runtime embedding has at least a threshold degree of similarity to at least one of the reference embeddings, the analysis component 137 may select an application to service the voice command. Selection of the application may be based at least in part on an intent associated with the reference embedding that was most similar to the runtime embedding. The application may receive the intent data or other NLU output data from the analysis component 137 as stored in the SLU storage 128 and may determine an action to be performed responsive to the voice command.

At block 514, in an example where the runtime embedding does not have at least a threshold degree of similarity to at least one of the reference embeddings, the analysis component 137 may communicate with other components of the speech processing system for those other components to determine an action to be performed responsive to the voice command. For example, ASR and NLU processing may be performed and a speechlet for responding to the voice command may be determined based at least in part on the intent data or other NLU output data.

Figure 6A:
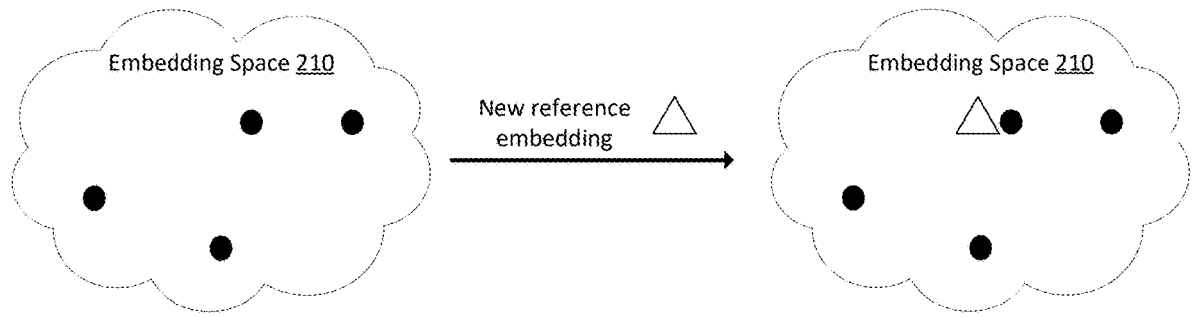
FIG. 6A illustrates a conceptual diagram of example changes to an embedding space when a new reference embedding is determined.

FIG. 6A illustrates a conceptual diagram of example changes to an embedding space when a new reference embedding is determined. FIG. 6A may include a SLU storage that may be the same as or similar to the SLU storage described with respect to FIG. 1. FIG. 6A illustrates changes to the SLU storage 128 when a newly-created reference embedding is generated.

To start, the processes described above with respect to FIGS. 1-5 may be utilized to generate reference embeddings that are associated with the SLU storage 128. In the example of FIG. 6A, the SLU storage 128 may include four reference embeddings illustrated as black circles in the SLU storage 128. At some point thereafter, a new reference embedding may be generated by the context encoder and/or text encoder described above. In some examples, the newly-created reference embedding may have a similar textual representation of the voice command in question as a textual representation associated with an already-generated reference embedding. In this example, given the similarities between the newly-created reference embedding and the already-generated reference embedding, the embeddings may have similar vector values in the SLU storage 128. This may be indicated in FIG. 6A as black circles that are near each other. Given that the textual features of the already-generated reference embedding are similar to the textual features of the newly-created reference embedding, a vector value associated with the newly-created reference embedding may be associated with a location similar to the location of the already-generated reference embedding in the SLU storage 128.

Figure 6B:
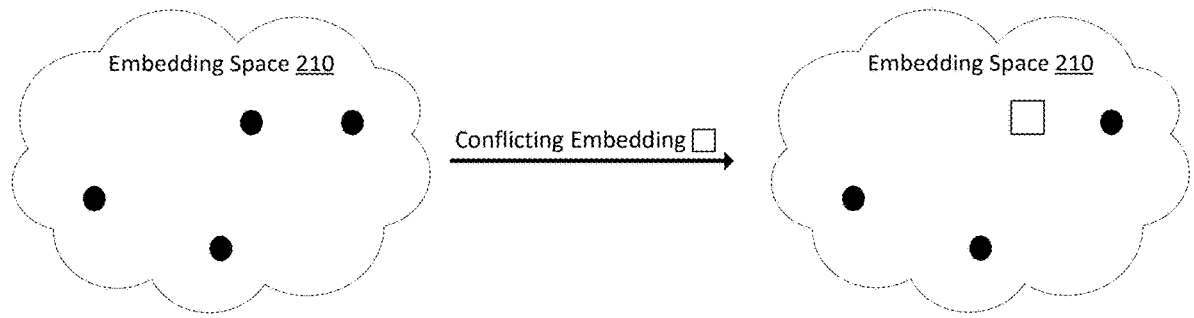
FIG. 6B illustrates a conceptual diagram of example changes to an embedding space when a conflicting embedding is determined.

FIG. 6B illustrates a conceptual diagram of example changes to an embedding space when a conflicting embedding is determined. FIG. 6B may include a SLU storage that may be the same as or similar to the SLU storage 128 described with respect to FIG. 1. FIG. 6B illustrates changes to the SLU storage 128 when a newly-created reference embedding is generated that conflicts with an already-generated reference embedding.

To start, the processes described above with respect to FIGS. 1-5 may be utilized to generate reference embeddings that are associated with the SLU storage 128. In the example of FIG. 6B, the SLU storage 128 may include four reference embeddings illustrated as black circles in the SLU storage 128. At some point thereafter, a new reference embedding may be generated by the context encoder and/or text encoder described above. In some examples, the newly-created reference embedding may have a similar textual representation of the voice command in question as a textual representation associated with an already-generated reference embedding.

In this example, a storage manager associated with the device may determine that either the newly-created reference embedding or the already-generated reference embedding should be maintained in the SLU storage 128 and remove the unselected embedding. In examples, the newly-created reference embedding may be maintained in the SLU storage 128 and the already-generated reference embedding may be removed. In other examples, confidence values associated with the speech processing performed by the system may be utilized to determine which reference embedding should be maintained in the SLU storage 128.

Figure 6C:
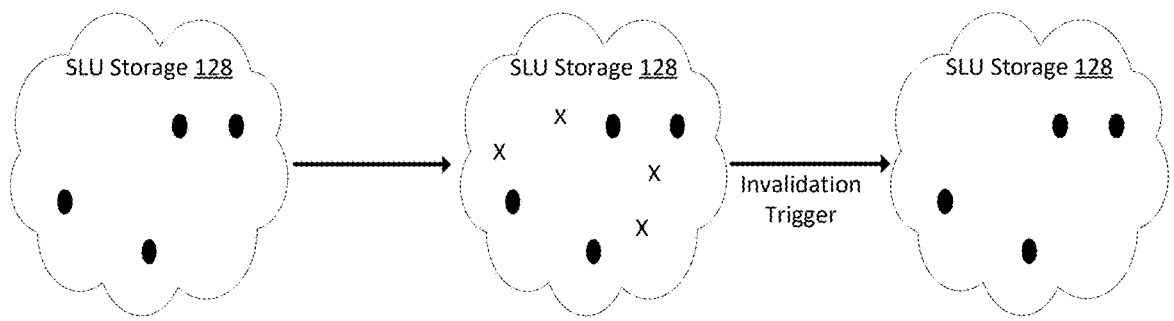
FIG. 6C illustrates a conceptual diagram of example changes to an embedding space when an invalidation trigger is determined.

FIG. 6C illustrates a conceptual diagram of example changes to an embedding space when an invalidation trigger is determined. FIG. 6C may include a SLU storage 128 that may be the same as or similar to the SLU storage 128 described with respect to FIG. 1. FIG. 6C illustrates changes to the SLU storage 128 when an invalidation trigger is detected.

To start, the processes described above with respect to FIGS. 1-5 may be utilized to generate reference embeddings that are associated with the SLU storage 128. In the example of FIG. 6C, the SLU storage 128 may include four reference embeddings associated with a first domain (illustrated as black circles in the SLU storage 128), and then four reference embeddings associated with a second domain (illustrated as "x"s) may be added to the SLU storage 128. In examples, the domains may be associated with different applications utilized to service intents associated with the reference embeddings, different speechlets that are utilized, the intents themselves, categories of intents such as a smart home domain, an audio-playback domain, a video domain, a shopping domain, an information domain, etc.

At some point thereafter, an invalidation trigger may occur that is associated with a given domain. Example invalidation triggers may include, by way of nonlimiting example, the addition of a smart home device to account data, the removal of a smart home device, changes to applications and/or speechlets associated with the account data, the addition or removal of user profiles from the account data, and/or any other changes to the system that may impact how speech processing may be performed to determine how to respond to voice commands. By way of non-limiting example, an invalidation trigger may be that a smart home device has been added to given account data. Some of the entries in the SLU storage 128 (denoted in FIG. 6C as "x"s) may be associated with the smart home domain. As such, the storage manager of the device may determine that the invalidation trigger has occurred, may determine that the invalidation trigger is associated with the smart home domain, and may determine which of the entries are also associated with the smart home domain. Those identified entries may thereafter be invalidated by the storage manager. Invalidation of entries may include at least temporarily not utilizing those entries for performing speech processing. If the reference embeddings are determined to be accurate after the invalidation trigger, then the entries may be enabled again for use by the device. If the reference embeddings are determined to be inaccurate, the entries may be removed from the SLU storage 128.

Figure 7:
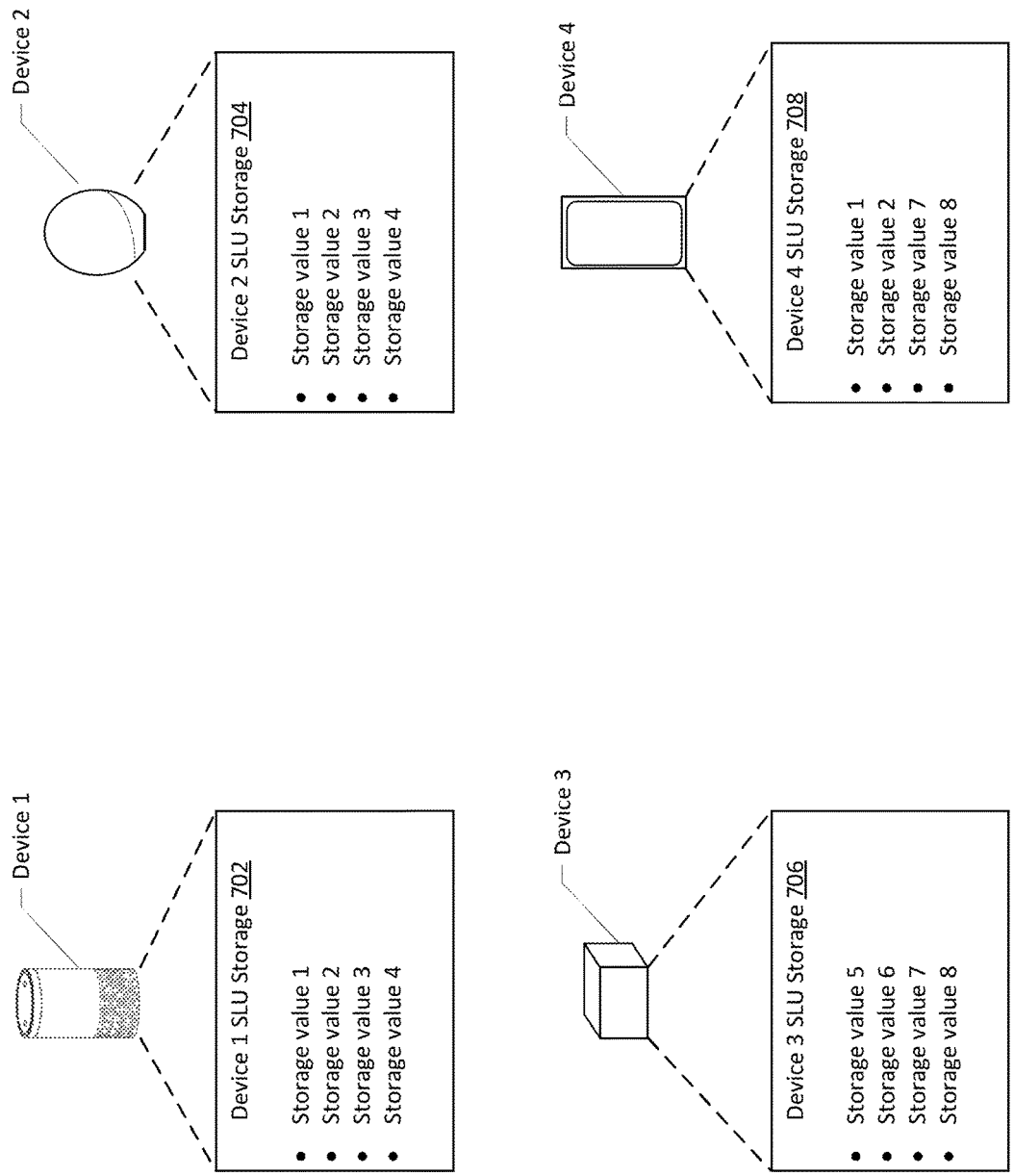
FIG. 7 illustrates a conceptual diagram of example devices and corresponding reference embeddings stored thereon.

FIG. 7 illustrates a conceptual diagram of example devices and corresponding storage values associated with reference embeddings stored thereon. The devices depicted in FIG. 7 may be the same as or similar to the devices 102 described with respect to FIG. 1. Those devices may also perform the same or similar processes as the processors described with respect to FIG. 1.

As shown in FIG. 7, four devices 102 may be associated with each other. By way of example, the four devices 102 may all be associated with the same account data. Device 1 may include memory with components such as Device 1 SLU storage 702. Device 2 may include memory with components such as Device 2 SLU storage 704. Device 3 may include memory with components such as Device 3 SLU storage 706. Device 4 may include memory with components such as Device 4 SLU storage 708. The SLU storages may be the same or similar to the SLU storage 128 described with respect to FIG. 1.

As for the Device 1 SLU storage 702, it may include several storage values associated with reference embeddings, including Storage value 1, Storage value 2, Storage value 3, and Storage value 4. In some examples, at least one other device associated with the account data may have the same reference embeddings as Device 1. This is illustrated in FIG. 7 as Device 2, which also includes Storage value 1, Storage value 2, Storage value 3, and Storage value 4. In this example, Device 1 may have sent its reference embeddings to Device 2, or Device 2 may have sent its reference embeddings to Device 1, and/or Device 1 created and sent some of its reference embeddings to Device 2 and Device 2 created and sent some of its reference embeddings to Device 1.

In other examples, the reference embeddings for one device may differ completely from reference embeddings of another device. This is illustrated in FIG. 7 as between Device 1 and Device 3. As shown, Device 1 may include Storage value 1, Storage value 2, Storage value 3, and Storage value 4. Device 3 may include, to the contrary, Storage value 5, Storage value 6, Storage value 7, and Storage value 8. In this example, the devices may not share reference embeddings with each other.

In still other examples, a given device may have some shared reference embeddings with one device and some shared reference embeddings with another device. This is illustrated in FIG. 7 at Device 4, which may include Storage value 1 and Storage value 2 from Device 1, and Storage value 7 and Storage value 8 from Device 3.

Figure 8:
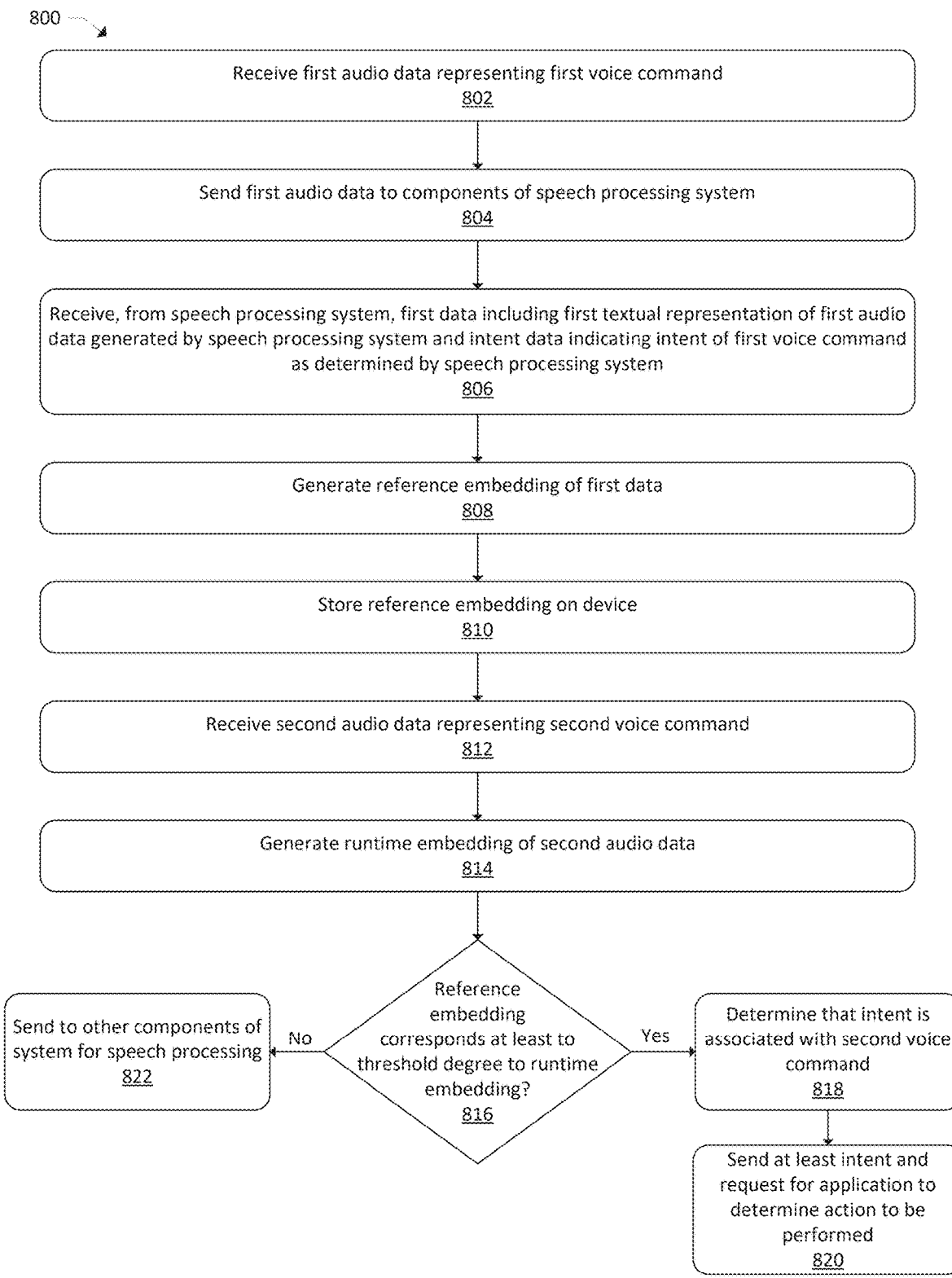
FIG. 8 illustrates a flow diagram of an example process for speech processing utilizing customized embeddings.
Figure 9:
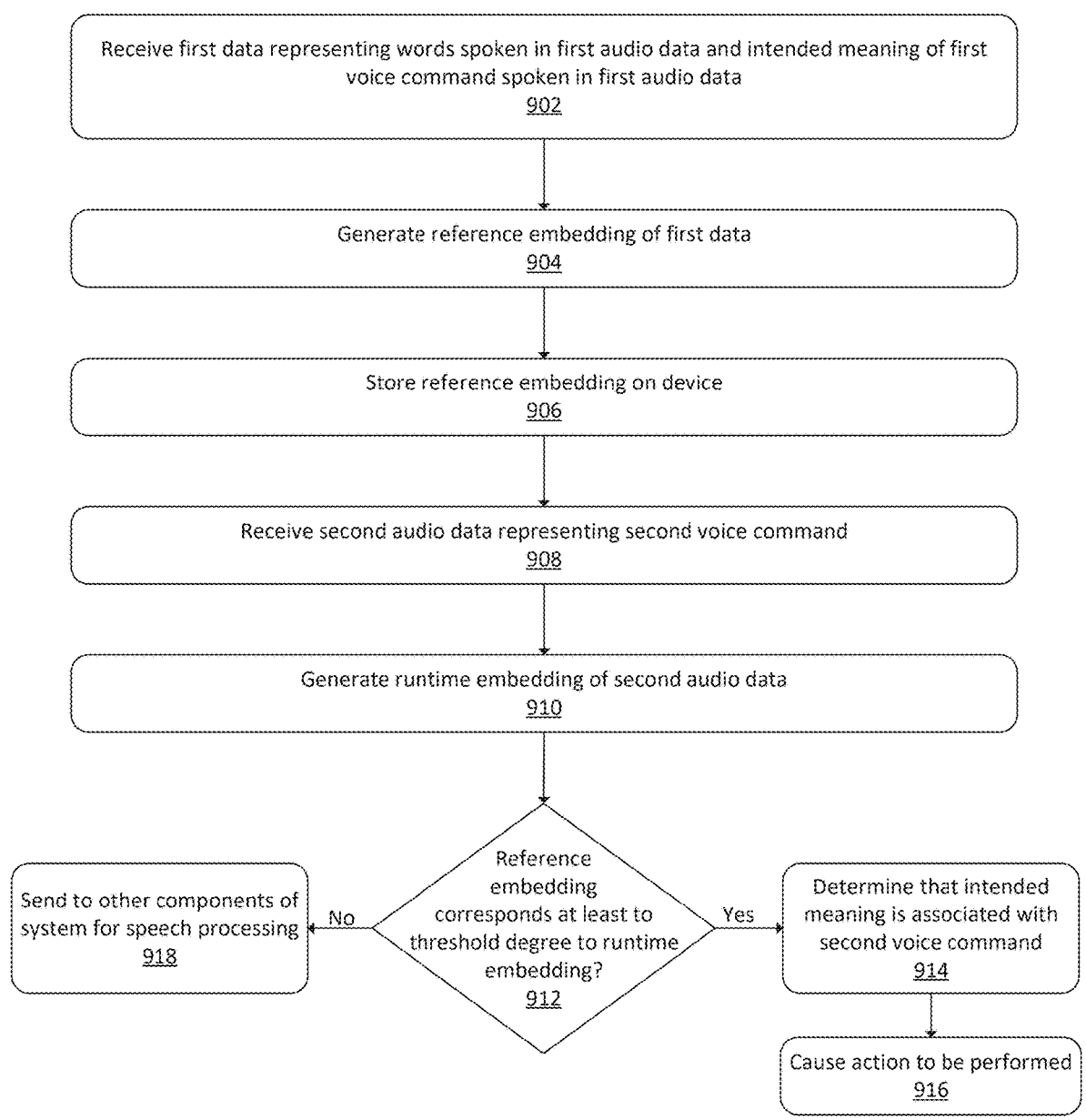
FIG. 9 illustrates a flow diagram of another example process for speech processing utilizing customized embeddings.

FIGS. 8 and 9 illustrate processes for speech processing utilizing customized embeddings. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-7, 10, and 11, although the processes may be implemented in a wide variety of other environments, architectures and systems.

FIG. 8 illustrates a flow diagram of an example process for speech processing utilizing customized embeddings. The order in which the operations or steps are described is not intended to be construed as a limitation, and any number of the described operations may be combined in any order and/or in parallel to implement process 800.

At block 802, the process 800 may include receiving first audio data representing a first voice command. For example, the device may receive audio representing a given voice command at microphones of the device. The microphones may generate audio data representing the audio.

At block 804, the process 800 may include sending the first audio data to other components of a speech processing system. For example, a hybrid router may determine where to send the audio data. In other examples, the hybrid router may send the audio data only to an ASR component of the system. Additional details on the hybrid router and the hybrid engine associated with the device(s) are provided in FIG. 11, below.

At block 806, the process 800 may include receiving, from the speech processing system, first data including a first textual representation of the first audio data generated by the speech processing system and intent data or other NLU output data indicating an intent of the first voice command as determined by the speech processing system. For example, an ASR component may perform ASR processing on the audio data to generate text data or other ASR output data. The text data or other ASR output data may be sent from the ASR component to a NLU component. For example, the ASR component may perform ASR processes on the audio data to generate text data or other ASR output data. The text data or other ASR output data may correspond to a textual representation of the voice command from the audio data. Additional details on ASR processes are provided below with respect to FIG. 10.

The NLU component may generate intent data or other NLU output data associated with the voice command and may send the intent data or other NLU output data and/or the text data or other ASR output data from the ASR component to an interpretation generator. For example, the intent data or other NLU output data may indicate an intent for the voice command determined by the system. The intent data or other NLU output data may be sent to the plan executor, which may be configured to determine which speechlets and/or applications are configured to accept the intent data or other NLU output data and determine an action to be performed responsive to the voice command. The plan executor may generate an execution plan that indicates the results of the speech processing performed by the system and that includes at least some of the data utilized to generate the execution plan. Example actions include, by way of non-limiting example, controlling smart home devices, controlling output of audio and/or video, retrieving information, etc. Again, additional details on NLU processes are provided below with respect to FIG. 10.

The interpretation generator may generate a reference interpretation from the text data or other ASR output data and/or the intent data or other NLU output data and may send the reference interpretation to a storage manager of the device. For example, the interpretation generator may receive the intent data or other NLU output data and/or other data associated with the voice command from the plan executor and may generate a reference interpretation of the voice command. The reference interpretation may be generated based at least in part on the execution plan determined by the system. The execution plan may include the textual representation of the audio data or other ASR output data, the determined intent data or other NLU output data, the determined action to be performed, context data associated with the voice command, which speechlet and/or application was selected, and/or any other data associated with the voice command and/or the response thereto. The interpretation generator may send the reference interpretation to the storage manager of the device. In examples, the reference interpretation may be sent to the storage manager after the action responsive to the voice command has been performed. Doing so may mitigate the introduction of latency into the process of responding to the voice command while also allowing the storage manager to receive the reference interpretation for use in generating reference embeddings.

At block 808, the process 800 may include generating a reference embedding (which may also be described as a first embedding in this example) of the first data. For example, the storage manager may be configured to receive the reference interpretation and to facilitate the generation and/or storage of a reference embedding that represents the reference interpretation. For example, the storage manager may parse the reference interpretation for the textual representation of the audio data or other ASR output data and, in examples, for the context data associated with the voice command. The textual representation of the audio data or other ASR output data and/or the context data may be sent to a context encoder. The context encoder may include a number of components, including a text encoder, configured to generate a reference embedding that represents that voice command. Additional details on the context encoder and text encoder are provided in FIG. 2, but generally these encoders may include one or more RNNs and feed forward layers configured to intake the text data or other ASR output data and/or the context data and to generate the reference embedding.

At block 810, the process 800 may include storing the reference embedding on the device. For example, the SLU storage may receive the reference embedding and store the reference embedding in an embedding space as described above. Additional details on the storage of the reference embeddings on the device are provided above with respect to FIGS. 6A-6C. In examples, a new reference embedding may be generated by the context encoder and/or text encoder described above. In some examples, the newly-created reference embedding may have a similar textual representation of the voice command in question as a textual representation associated with an already-generated reference embedding. In this example, given the similarities between the newly-created reference embedding and the already-generated reference embedding, the embeddings may have similar vector values in the SLU storage. Given that the textual features of the already-generated reference embedding are similar to the textual features of the newly-created reference embedding, a vector value associated with the newly-created reference embedding may be associated with a location similar to the location of the already-generated reference embedding in the SLU storage. In another example, the storage manager associated with the device may determine that either the newly-created reference embedding or the already-generated reference embedding should be maintained in the SLU storage and remove the unselected embedding. In examples, the newly-created reference embedding may be maintained in the SLU storage and the already-generated reference embedding may be removed. In other examples, confidence values associated with the speech processing performed by the system may be utilized to determine which reference embedding should be maintained in the SLU storage. In still another example, the SLU storage may include reference embeddings associated with a first domain and then reference embeddings associated with a second domain or otherwise other domains. In examples, the domains may be associated with different applications utilized to service intents associated with the reference embeddings, different speechlets that are utilized, the intents themselves, categories of intents such as a smart home domain, an audio-playback domain, a video domain, a shopping domain, an information domain, etc. At some point, an invalidation trigger may occur that is associated with a given domain. Example invalidation triggers may include, by way of non-limiting example, the addition of a smart home device to account data, the removal of a smart home device, changes to applications and/or speechlets associated with the account data, the addition or removal of user profiles from the account data, and/or any other changes to the system that may impact how speech processing may be performed to determine how to respond to voice commands. By way of non-limiting example, an invalidation trigger may be that a smart home device has been added to given account data. Some of the entries in the SLU storage may be associated with the smart home domain. As such, the storage manager of the device may determine that the invalidation trigger has occurred, may determine that the invalidation trigger is associated with the smart home domain, and may determine which of the entries are also associated with the smart home domain. Those identified entries may thereafter be invalidated by the storage manager. Invalidation of entries may include at least temporarily not utilizing those entries for performing speech processing. If the reference embeddings are determined to be accurate after the invalidation trigger, then the entries may be enabled again for use by the device. If the reference embeddings are determined to be inaccurate, the entries may be removed from the SLU storage.

At block 812, the process 800 may include receiving second audio data representing a second voice command. This process may be the same as or similar to the processes performed at block 802.

At block 814, the process 800 may include generating a runtime embedding (which may be described as a second embedding in this example) of the second audio data. For example, as with the context encoder and the text encoder described above, an audio encoder may be configured to utilize RNNs and feed forward layers to generate a runtime embedding of the audio data.

At block 816, the process 800 may include determining whether the reference embedding corresponds at least to a threshold degree to the runtime embedding. For example, the runtime embedding may include a vector value indicating its location in the embedding space. A nearest reference embedding in the embedding space may be determined and a distance between the two locations may be determined. For example, individual ones of the reference embeddings may be associated with a value representing the vector for that given reference embedding. The vector may be two or more dimensional value that indicates the vectors location within the embedding space. When the runtime embedding is generated, it may also be associated a value representing a vector in the vector space. The system described herein may determine which of the reference embeddings is closest in distance to the runtime vector and utilize that distance to determine whether the reference embedding is sufficiently similar to the runtime embedding. One nonlimiting methodology for determining similarities between two vectors (e.g., a runtime embedding vector and a reference embedding vector) is to utilize a cosine similarity calculation. When this technique is utilized, the distance between vectors in the vector space may be described as a cosine distance. A threshold distance may be established, and when the distance between vectors satisfies the threshold distance, the runtime embedding and the reference embedding may be determined to correspond at least to the threshold degree. When the distance is within a threshold distance, the device may determine that the runtime embedding is sufficiently similar to the reference embedding. It should be understood that distances between embeddings in the embedding space may be mathematical as opposed to physical. For example, another way of describing the similarity determination between a reference embedding and a runtime embedding may be to determine a similarity between the embeddings themselves and/or between vector values associated with the embeddings. Additional details on determining similarities between vector values is provided above. When vectors are not utilized, the embeddings themselves may be utilized for comparison. For example, when an embedding is created, the data upon which the embedding was created may result in a specific embedding being created. Variances in the user input, such as variances in words utilized, tone, inflection, etc. may result in different data characteristics being utilized to generate the embedding and thus the embedding itself may differ. However, as the data characteristics of two given user inputs become more similar, the embeddings themselves may also be more similar than two divergent user inputs. As such, the embeddings themselves (e.g., the low-dimensional representations of the user inputs) may be compared. A similarity score may be determined and applied to a similarity scale to determine how similar the embeddings are to each other. For example, a similarity scale of −1 to 1 may be employed and a similarity threshold of 0.9 may be applied. It should be understood that any similarity scale may be utilized and any similarity threshold may be utilized and that these scales and/or thresholds may be static or dynamic.

In examples where the reference embedding corresponds at least to the threshold degree to the runtime embedding, the process 800 may include, at block 818, determining that the intent is associated with the second voice command. For example, the reference embedding may be associated with an intent, and thus that intent may be selected as corresponding to the voice command in question. An application may be selected based at least in part on an intent associated with the reference embedding that was most similar to the runtime embedding.

At block 820, the process 800 may include sending, to an application on the device, at least the intent and a request for the application to determine an action to be performed responsive to the second voice command. The application may receive the intent data or other NLU output data from the SLU storage and may determine an action to be performed responsive to the voice command.

In examples where the reference embedding does not correspond at least to the threshold degree to the runtime embedding, the process 800 may include, at block 822, sending data associated with the voice command (which may include the audio data corresponding to the voice command) to other components of the system for speech processing. Additional details on the speech processing performed by other components of the system are provided by way of example with respect to block 514 of FIG. 5.

Additionally, or alternatively, the process 800 may include determining first context data associated with the first voice command, the first context data including at least an interaction history associated with the device indicating prior voice commands provided to the device, wherein the first embedding is generated from the first context data and the first data. The process 800 may also include determining second context data associated with receiving the second audio data, wherein the second embedding is generated from the second context data and the second audio data. In these examples, determining that the first embedding corresponds at least to the threshold degree to the second embedding may be from the first context data corresponding to the second context data.

Additionally, or alternatively, the process 800 may include generating second data representing an embedding space configured to associate embeddings. The process 800 may also include determining a first vector value associated with the first embedding as stored in association with the embedding space. The process 800 may also include determining a second vector value associated with the second embedding. In these examples, determining that the first embedding corresponds at least to the threshold degree to the second embedding may be in response to the first vector value having a threshold similarity to the second vector value in the embedding space.

Additionally, or alternatively, the process 800 may include receiving, from the speech processing system, second data including a second textual representation of third audio data generated by the speech processing system and the intent data or other NLU output data indicating the intent. The process 800 may also include generating a third embedding of the second data. The process 800 may also include, in response to the first data and the second data being associated with the intent, causing the first embedding and the third embedding to be associated with each other.

Additionally, or alternatively, the process 800 may include receiving third audio data from an audio-input device. The process 800 may also include determining that the device is to perform speech processing on the third audio data in response to a predefined association between the device and the audio-input device. The process 800 may also include, in response to determining that the device is to perform the speech processing on the second audio data, generating a third embedding of the third audio data, and wherein performing the speech processing on the third audio data comprises determining that the third embedding corresponds at least to the threshold degree of similarity to the second embedding.

FIG. 9 illustrates a flow diagram of another example process for speech processing utilizing customized embeddings. The order in which the operations or steps are described is not intended to be construed as a limitation, and any number of the described operations may be combined in any order and/or in parallel to implement process 900.

At block 902, the process 900 may include receiving first data representing words spoken in first audio data and an intended meaning of a first voice command spoken in the first audio data. For example, an ASR component may perform ASR processing on the audio data to generate text data or other ASR output data. The text data or other ASR output data may be sent from the ASR component to a NLU component. For example, the ASR component may perform ASR processes on the audio data to generate text data or other ASR output data. The text data or other ASR output data may correspond to a textual representation of the voice command from the audio data. Additional details on ASR processes are provided below with respect to FIG. 10.

The NLU component may generate intent data or other NLU output data associated with the voice command and may send the intent data or other NLU output data and/or the text data or other ASR output data from the ASR component to an interpretation generator. For example, the intent data or other NLU output data may indicate an intent for the voice command determined by the system. The intent data or other NLU output data may be sent to the plan executor, which may be configured to determine which speechlets and/or applications are configured to accept the intent data or other NLU output data and determine an action to be performed responsive to the voice command. The plan executor may generate an execution plan that indicates the results of the speech processing performed by the system and that includes at least some of the data utilized to generate the execution plan. Example actions include, by way of non-limiting example, controlling smart home devices, controlling output of audio and/or video, retrieving information, etc. Again, additional details on NLU processes are provided below with respect to FIG. 10.

The interpretation generator may generate a reference interpretation from the text data or other ASR output data and/or the intent data or other NLU output data and may send the reference interpretation to a storage manager of the device. For example, the interpretation generator may receive the intent data or other NLU output data and/or other data associated with the voice command from the plan executor and may generate a reference interpretation of the voice command. The reference interpretation may be generated based at least in part on the execution plan determined by the system. The execution plan may include the textual representation of the audio data or other ASR output data, the determined intent data or other NLU output data, the determined action to be performed, context data associated with the voice command, which speechlet and/or application was selected, and/or any other data associated with the voice command and/or the response thereto. The interpretation generator may send the reference interpretation to the storage manager of the device. In examples, the reference interpretation may be sent to the storage manager after the action responsive to the voice command has been performed. Doing so may mitigate the introduction of latency into the process of responding to the voice command while also allowing the storage manager to receive the reference interpretation for use in generating reference embeddings.

At block 904, the process 900 may include generating a reference embedding (which may be described as a first embedding in this example) of the first data. For example, the storage manager may be configured to receive the reference interpretation and to facilitate the generation and/or storage of a reference embedding that represents the reference interpretation. For example, the storage manager may parse the reference interpretation for the textual representation of the audio data or other ASR output data and, in examples, for the context data associated with the voice command. The textual representation of the audio data or other ASR output data and/or the context data may be sent to a context encoder. The context encoder may include a number of components, including a text encoder, configured to generate a reference embedding that represents that voice command. Additional details on the context encoder and text encoder are provided in FIG. 2, but generally these encoders may include one or more RNNs and feed forward layers configured to intake the text data or other ASR output data and/or the context data and to generate the reference embedding.

At block 906, the process 900 may include storing the reference embedding on a device. For example, the SLU storage may receive the reference embedding and store the reference embedding in an embedding space as described above. Additional details on the storage of the reference embeddings on the device are provided above with respect to FIGS. 6A-6C. In examples, a new reference embedding may be generated by the context encoder and/or text encoder described above. In some examples, the newly-created reference embedding may have a similar textual representation of the voice command in question as a textual representation associated with an already-generated reference embedding. In this example, given the similarities between the newly-created reference embedding and the already-generated reference embedding, the embeddings may have similar vector values in the SLU storage. Given that the textual features of the already-generated reference embedding are similar to the textual features of the newly-created reference embedding, a vector value associated with the newly-created reference embedding may be associated with a location similar to the location of the already-generated reference embedding in the SLU storage. In another example, the storage manager associated with the device may determine that either the newly-created reference embedding or the already-generated reference embedding should be maintained in the SLU storage and remove the unselected embedding. In examples, the newly-created reference embedding may be maintained in the SLU storage and the already-generated reference embedding may be removed. In other examples, confidence values associated with the speech processing performed by the system may be utilized to determine which reference embedding should be maintained in the SLU storage. In still another example, the SLU storage may include reference embeddings associated with a first domain and then reference embeddings associated with a second domain or otherwise other domains. In examples, the domains may be associated with different applications utilized to service intents associated with the reference embeddings, different speechlets that are utilized, the intents themselves, categories of intents such as a smart home domain, an audio-playback domain, a video domain, a shopping domain, an information domain, etc. At some point, an invalidation trigger may occur that is associated with a given domain. Example invalidation triggers may include, by way of non-limiting example, the addition of a smart home device to account data, the removal of a smart home device, changes to applications and/or speechlets associated with the account data, the addition or removal of user profiles from the account data, and/or any other changes to the system that may impact how speech processing may be performed to determine how to respond to voice commands. By way of non-limiting example, an invalidation trigger may be that a smart home device has been added to given account data. Some of the entries in the SLU storage may be associated with the smart home domain. As such, the storage manager of the device may determine that the invalidation trigger has occurred, may determine that the invalidation trigger is associated with the smart home domain, and may determine which of the entries are also associated with the smart home domain. Those identified entries may thereafter be invalidated by the storage manager. Invalidation of entries may include at least temporarily not utilizing those entries for performing speech processing. If the reference embeddings are determined to be accurate after the invalidation trigger, then the entries may be enabled again for use by the device. If the reference embeddings are determined to be inaccurate, the entries may be removed from the SLU storage.

At block 908, the process 900 may include receiving, at the device, second audio data representing a second voice command. This process may be the same as or similar to the processes performed at block 802.

At block 910, the process 900 may include generating a runtime embedding (which may be described as a second embedding in this example) of the second audio data. For example, as with the context encoder and the text encoder described above, an audio encoder may be configured to utilize RNNs and feed forward layers to generate a runtime embedding of the audio data.

At block 912, the process 900 may include determining whether the reference embedding corresponds at least to a threshold degree to the runtime embedding. For example, the runtime embedding may include a vector value indicating its location in the embedding space. A nearest reference embedding in the embedding space may be determined and a distance between the two locations may be determined. For example, individual ones of the reference embeddings may be associated with a value representing the vector for that given reference embedding. The vector may be two or more dimensional value that indicates the vectors location within the embedding space. When the runtime embedding is generated, it may also be associated a value representing a vector in the vector space. The system described herein may determine which of the reference embeddings is closest in distance to the runtime vector and utilize that distance to determine whether the reference embedding is sufficiently similar to the runtime embedding. One nonlimiting methodology for determining similarities between two vectors (e.g., a runtime embedding vector and a reference embedding vector) is to utilize a cosine similarity calculation. When this technique is utilized, the distance between vectors in the vector space may be described as a cosine distance. A threshold distance may be established, and when the distance between vectors satisfies the threshold distance, the runtime embedding and the reference embedding may be determined to correspond at least to the threshold degree. When the distance is within a threshold distance, the device may determine that the runtime embedding is sufficiently similar to the reference embedding. It should be understood that distances between embeddings in the embedding space may be mathematical as opposed to physical. For example, another way of describing the similarity determination between a reference embedding and a runtime embedding may be to determine a similarity between the embeddings themselves and/or between vector values associated with the embeddings. Additional details on determining similarities between vector values is provided above. When vectors are not utilized, the embeddings themselves may be utilized for comparison. For example, when an embedding is created, the data upon which the embedding was created may result in a specific embedding being created. Variances in the user input, such as variances in words utilized, tone, inflection, etc. may result in different data characteristics being utilized to generate the embedding and thus the embedding itself may differ. However, as the data characteristics of two given user inputs become more similar, the embeddings themselves may also be more similar than two divergent user inputs. As such, the embeddings themselves (e.g., the low-dimensional representations of the user inputs) may be compared. A similarity score may be determined and applied to a similarity scale to determine how similar the embeddings are to each other. For example, a similarity scale of $-1$ to 1 may be employed and a similarity threshold of 0.9 may be applied. It should be understood that any similarity scale may be utilized and any similarity threshold may be utilized and that these scales and/or thresholds may be static or dynamic.

In examples where the reference embedding corresponds at least to the threshold degree to the runtime embedding, the process 900 may include, at block 914, determining that the intended meaning is associated with the second voice command. For example, the reference embedding may be associated with an intent, and thus that intent may be selected as corresponding to the voice command in question. An application may be selected based at least in part on an intent associated with the reference embedding that was most similar to the runtime embedding.

At block 916, the process 900 may include causing an action to be performed utilizing the intent. The application may receive the intent data or other NLU output data from the SLU storage and may determine an action to be performed responsive to the voice command.

In examples where the reference embedding does not correspond at least to the threshold degree to the runtime embedding, the process 900 may include, at block 918, sending data associated with the voice command (which may include the audio data corresponding to the voice command) to other components of the system for speech processing. Additional details on the speech processing performed by other components of the system are provided by way of example with respect to block 514 of FIG. 5.

Additionally, or alternatively, the process 900 may include determining first context data associated with the first voice command, wherein the first embedding is generated based at least in part on the first context data and the first data. The process 900 may also include determining second context data associated with receiving the second audio data, wherein the second embedding is generated based at least in part on the second context data and the second audio data. In these examples, determining that the first embedding has at least the threshold similarity to the second embedding may be based at least in part on the first context data corresponding to the second context data.

Additionally, or alternatively, the process 900 may include generating second data representing an embedding space configured to associate embeddings. The process 900 may also include determining a first vector value associated with the first embedding. The process 900 may also include determining a second vector value associated with the second embedding. In these examples, determining that the first embedding has at least the threshold similarity to the second embedding may be based at least in part on the first vector value having the threshold similar to the second vector value in the embedding space.

Additionally, or alternatively, the process 900 may include receiving second data including a second textual representation of third audio data and the intent data or other NLU output data indicating the intent. The process 900 may also include generating a third embedding of the second data. The process 900 may also include causing, based at least in part on the first data and the second data being associated with the intent, the first embedding to be associated with the third embedding.

Additionally, or alternatively, the process 900 may include identifying, utilizing an audio encoder, audio features of the first audio data. The process 900 may also include identifying, utilizing a text encoder, text features associated with the first textual representation of the first audio data. In these examples, generating the first embedding of the first data may be based at least in part on the audio features and the text features.

Additionally, or alternatively, the process 900 may include determining account data associated with the device that stores the first embedding. The process 900 may also include determining other devices associated with the account data. The process 900 may also include determining, based at least in part on historical usage data of the other devices, a subset of the other devices that have been associated with the intent. The process 900 may also include sending the first embedding to the subset of the other devices such that the first embedding is stored on the subset of the other devices.

Additionally, or alternatively, the process 900 may include generating a third embedding from second data including a second textual representation of third audio data and an additional intent associated with a third voice command. The process 900 may also include determining that the second textual representation corresponds to the first textual representation. The process 900 may also include removing, based at least in part on the second textual representation corresponding to the first textual representation, the first embedding from the device. The process 900 may also include storing the third embedding on the device instead of the first embedding.

Additionally, or alternatively, the process 900 may include associating a domain with the first embedding. The process 900 may also include determining that account data associated with the device indicates an aspect of the domain has changed from when the first embedding was generated. The process 900 may also include causing the first embedding to be invalidated based at least in part on the aspect of the domain changing.

Figure 10:
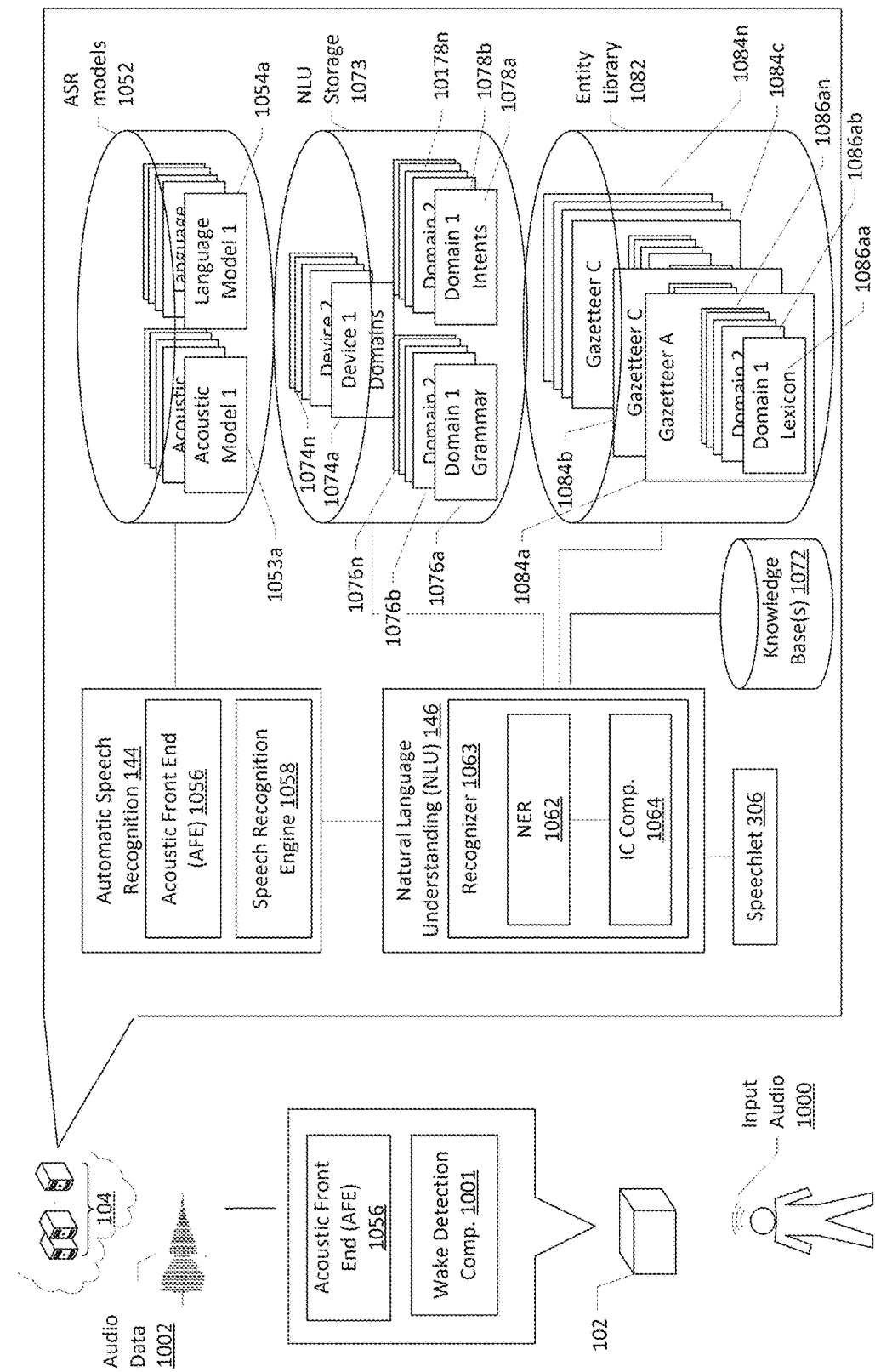
FIG. 10 illustrates a conceptual diagram of components of a speech-processing system for processing audio data provided by one or more devices.

FIG. 10 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin processing audio data). The various components illustrated may be located on a same device or different physical devices. Message between various components illustrated in FIG. 10 may occur directly or across a network 106. An audio capture component, such as a microphone 114 of the device 102, or another device, captures audio 1000 corresponding to a spoken utterance. The device 102, using a wake word engine 1001, then processes audio data corresponding to the audio 1000 to determine if a keyword (such as a wakeword) is detected in the audio data. Following detection of a wakeword, the device 102 processes audio data 1002 corresponding to the utterance utilizing an ASR component 144. The audio data 1002 may be output from an optional acoustic front end (AFE) 1056 located on the device prior to transmission. In other instances, the audio data 1002 may be in a different form for processing by a remote AFE 1056, such as the AFE 1056 located with the ASR component 144.

The wake word engine 1001 works in conjunction with other components of the user device, for example a microphone to detect keywords in audio 1000. For example, the device may convert audio 1000 into audio data, and process the audio data with the wake word engine 1001 to determine whether human sound is detected, and if so, if the audio data comprising human sound matches an audio fingerprint and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word engine 1001 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword.

Thus, the wake word engine 1001 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/RNN structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake." The audio data 1002 may include data corresponding to the wakeword. Further, a local device may "wake" upon detection of speech/spoken audio above a threshold, as described herein. An ASR component 144 may convert the audio data 1002 into text. The ASR transcribes audio data into text data or other ASR output data representing the words of the speech contained in the audio data 1002. The text data or other ASR output data may then be used by other components for various purposes, such as executing system commands, inputting data, etc. A spoken utterance in the audio data is input to a processor configured to perform ASR which then interprets the utterance based on the similarity between the utterance and pre-established language models 1054 stored in an ASR model knowledge base (ASR Models Storage 1052). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 1053 stored in an ASR Models Storage 1052), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 144 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 1056 and a speech recognition engine 1058. The acoustic front end (AFE) 1056 transforms the audio data from the microphone into data for processing by the speech recognition engine 1058. The speech recognition engine 1058 compares the speech recognition data with acoustic models 1053, language models 1054, and other data models and information for recognizing the speech conveyed in the audio data. The AFE 1056 may reduce noise in the audio data and divide the digitized audio data into frames representing time intervals for which the AFE 1056 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1058 may process the output from the AFE 1056 with reference to information stored in speech/model storage (1052). Alternatively, post front-end processed data (such as feature vectors) may be received by the device executing ASR processing from another source besides the internal AFE. For example, the user device may process audio data into feature vectors (for example using an on-device AFE 1056).

The speech recognition engine 1058 attempts to match received feature vectors to language phonemes and words as known in the stored acoustic models 1053 and language models 1054. The speech recognition engine 1058 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, what time is the pool open until?" The wake detection component may identify the wake word, otherwise described as a trigger expression, "Alexa," in the user utterance and may "wake" based on identifying the wake word. The speech recognition engine 1058 may identify, determine, and/or generate text data or other ASR output data corresponding to the user utterance, here "what time is the pool open until."

The speech recognition engine 1058 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 1058 to other processing components, which may be local to the device performing ASR and/or distributed across the network(s). For example, ASR results in the form of a single textual representation of the speech, an N-best list including multiple hypotheses and respective scores, lattice, etc. may be utilized, for natural language understanding (NLU) processing, such as conversion of the text into commands for execution, by the user device and/or by another device (such as a server running a specific application like a search engine, etc.).

The device performing NLU processing 146 may include various components, including potentially dedicated processor(s), memory, storage, etc. As shown in FIG. 10, an NLU component 146 may include a recognizer 1063 that includes a named entity recognition (NER) component 1062 which is used to identify portions of query text that correspond to a named entity that may be recognizable by the system. A downstream process called named entity resolution links a text portion to a specific entity known to the system. To perform named entity resolution, the system may utilize gazetteer information (1084a-1084n) stored in entity library storage 1082. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 144 based on the utterance input audio 1000) and attempts to make a semantic interpretation of the text. That is, the NLU process determines the meaning behind the text based on the individual words and then implements that meaning. NLU processing 146 interprets a text string to derive an intent or a desired action from the user as well as the pertinent pieces of information in the text that allow a device (e.g., device 102) to complete that action.

For example, if a spoken utterance is processed using ASR 144 and outputs the text "what time is the pool open until" the NLU process may determine that the user intended to receive a response to the voice command indicating a time when the pool of the enterprise entity closes.

The NLU 146 may process several textual inputs related to the same utterance. For example, if the ASR 144 outputs N text segments (as part of an N-best list), the NLU may process all N outputs to obtain NLU results.

As will be discussed further below, the NLU process may be configured to parse and tag to annotate text as part of NLU processing. For example, for the text "what time is the pool open until," "what time" may be tagged as a command (to determine a time to respond to the user with).

To correctly perform NLU processing of speech input, an NLU process 146 may be configured to determine a "domain" of the utterance so as to determine and narrow down which services offered by the endpoint device may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 1062 receives a query in the form of ASR results and attempts to identify relevant grammars and lexical information that may be used to construe meaning. To do so, the NLU component 146 may begin by identifying potential domains that may relate to the received query. The NLU storage 1073 includes a database of devices (1074*a*-1074*n*) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," "health care," "smart home," "communications," "shopping," "music," "calendaring," etc. As such, each domain may be associated with a particular recognizer 1063, language model and/or grammar database (1076*a*-1076*n*), a particular set of intents/actions (1078*a*-1078*n*), and a particular personalized lexicon (1086). Each gazetteer (1084*a*-1084*n*) may include domain-indexed lexical information associated with a particular user and/or device. For example, the Gazetteer A (1084*a*) includes domain-index lexical information 1086*aa* to 1086*an*. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 1064 parses the query to determine an intent or intents for each identified domain, where the intent corresponds to the action to be performed that is responsive to the query. Each domain is associated with a database (1078*a*-1078*n*) of words linked to intents. For example, a communications intent database may link words and phrases such as "identify song," "song title," "determine song," to a "song title" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 1064 identifies potential intents for each identified domain by comparing words in the query to the words and phrases in the intents database 1078. In some instances, the determination of an intent by the IC component 1064 is performed using a set of rules or templates that are processed against the incoming text to identify a matching intent.

In order to generate a particular interpreted response, the NER 1062 applies the grammar models and lexical information associated with the respective domain to actually recognize a mention of one or more entities in the text of the query. In this manner, the NER 1062 identifies "slots" or values (i.e., particular words in query text) that may be needed for later command processing. Depending on the complexity of the NER 1062, it may also label each slot with a type of varying levels of specificity (such as noun, place, device name, device location, city, artist name, song name, amount of time, timer number, or the like). Each grammar model 1076 includes the names of entities (i.e., nouns) commonly found in speech about the particular domain (i.e., generic terms), whereas the lexical information 1086 from the gazetteer 1084 is personalized to the user(s) and/or the device. For instance, a grammar model associated with the shopping domain may include a database of words commonly used when people discuss shopping.

The intents identified by the IC component 1064 are linked to domain-specific grammar frameworks (included in 1076) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "purchase" is an identified intent, a grammar (1076) framework or frameworks may correspond to sentence structures such as "purchase item called 'Item A' from Marketplace A."

For example, the NER component 1062 may parse the query to identify words as subject, object, verb, preposition, etc., based on grammar rules and/or models, prior to recognizing named entities. The identified verb may be used by the IC component 1064 to identify intent, which is then used by the NER component 1062 to identify frameworks. A framework for the intent of "play a song," meanwhile, may specify a list of slots/fields applicable to play the identified "song" and any object modifier (e.g., specifying a music collection from which the song should be accessed) or the like. The NER component 1062 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 1062 may search the database of generic words associated with the domain (in the knowledge base 1072). So, for instance, if the query was "identify this song," after failing to determine which song is currently being output, the NER component 1062 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to a speechlet 306. The speechlet 306 may be determined based on the NLU output. For example, if the NLU output includes a command to send a message, the destination speechlet 306 may be a message sending application, such as one located on the user device or in a message sending appliance, configured to execute a message sending command. If the NLU output includes a search request, the destination application may include a search engine processor, such as one located on a search server, configured to execute a search command. After the appropriate command is generated based on the intent of the user, the destination speechlet 306 may provide some or all of this information to a text-to-speech (TTS) engine. The TTS engine may then generate an actual audio file for outputting the audio data determined by the application (e.g., "okay," or "the pool closes at 10:00 pm").

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 146 during runtime operations where NLU operations are performed on text (such as text output from an ASR component 144). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 1063. Each recognizer may include various NLU components such as an NER component 1062, IC component 1064 and other components such as an entity resolver, or other components.

For example, a messaging domain recognizer 1063-A (Domain A) may have an NER component 1062-A that identifies what slots (i.e., portions of input text) may correspond to particular words relevant to that domain. The words may correspond to entities such as (for the messaging domain) a recipient. An NER component 1062 may use a machine learning model, such as a domain specific conditional random field (CRF) to both identify the portions corresponding to an entity as well as identify what type of entity corresponds to the text portion. The messaging domain recognizer 1063-A may also have its own intent classification (IC) component 1064-A that determines the intent of the text assuming that the text is within the proscribed domain. An IC component may use a model, such as a domain specific maximum entropy classifier to identify the intent of the text, where the intent is the action the user desires the system to perform. For this purpose, device 102 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the system 104, as illustrated herein are exemplary, and may be located in a stand-alone device or may be included, in whole or in part, as a component of a larger device or system, may be distributed across a network or multiple devices connected by a network, etc.

Figure 11:
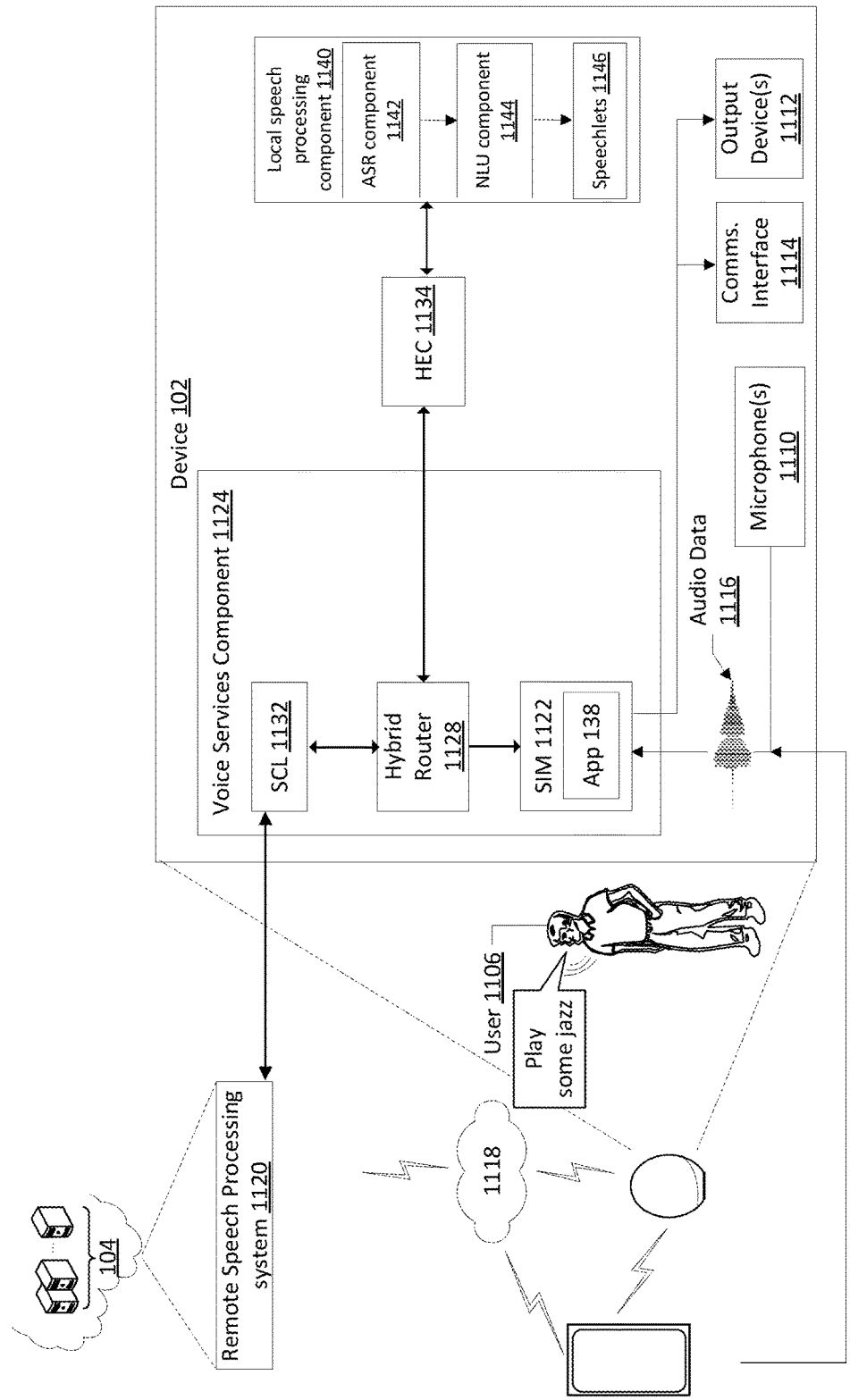
FIG. 11 illustrates a block diagram illustrating a system including a hybrid speech interface device that is capable of responding to user speech, regardless of whether a remote system is available to the hybrid speech interface device.

FIG. 11 is a block diagram illustrating a system including a hybrid speech interface device 102 (often shortened herein to "speech interface device 102" and/or "device 102"). The speech interface device 102, having "hybrid" capabilities, is capable of responding to user speech, regardless of whether a system 104 is available to the speech interface device 102. The speech interface device 102 may be located within an environment to provide various capabilities to a user 1106, when the user 1106 is also in the environment. The environment in which the speech interface device 102 is located may be a home or other premises, an automobile, or any similar environment. Such an environment may include other devices including additional speech interface devices and/or second devices (e.g., Internet of Things (IoT) devices and/or smart home devices like thermostats, lights, refrigerators, ovens, etc.) that may be controllable by speech interface devices, such as the speech interface device 102. When acting as a hub, the speech interface device 102 may be configured to connect a plurality of devices in an environment and control communications among them, thereby serving as a place of convergence where data arrives from one or more devices, and from which data is sent to one or more devices.

In general, the speech interface device 102 may be capable of capturing utterances with a microphone(s) 1110, and responding in various ways, such as by outputting content via an output device(s) 1112, which may be a speaker(s), a display(s), or any other suitable output device 1112. In addition, the speech interface device 102 may be configured to respond to user speech by controlling second devices that are collocated in the environment with the speech interface device 102, such as by sending a command to a second device via a communications interface 1114 (e.g., a short range radio), the command instructing an operation to be performed at the second device (e.g., to turn on a light in the environment). FIG. 11 also shows that, in addition to using the microphone(s) 1110 to capture utterances as audio data 1116, the speech interface device 102 may additionally, or alternatively, receive audio data 1116 (e.g., via the communications interface 1114) from another device 103 in the environment, such as when the other device captures an utterance from the user 1106 and sends the audio data 1116 to the speech interface device 102. This may occur in situations where the other device would like to leverage the "hybrid" capabilities of the speech interface device 102.

As mentioned, under normal conditions, the speech interface device 102 may operate in conjunction with and/or under the control of a remote, network-based or network-accessible control system 104 (abbreviated to "system" 104 in FIG. 1). The system 104 may, in some instances be part of a network-accessible computing platform that is maintained and accessible via a wide area network 1118. Network-accessible computing platforms such as this may be referred to using terms such as "on-demand computing", "software as a service (SaaS)", "platform computing", "network-accessible platform", "cloud services", "data centers", and so forth. The system 104 may be configured to provide particular functionality to large numbers of local (e.g., in-home, in-car, etc.) devices of different users.

In some embodiments, the system 104 may be configured to receive audio data 1116 from the speech interface device 102, to recognize speech in the received audio data 1116 using a remote speech processing system 1120, and to perform functions in response to the recognized speech. In some embodiments, these functions involve sending directives, from the system 104, to the speech interface device 102 to cause the speech interface device 102 to perform an action, such as output an audible response to the user speech via a speaker(s) (i.e., an output device(s) 1112), and/or control second devices in the environment by sending a control command via the communications interface 1114. Thus, under normal conditions, when the speech interface device 102 is able to communicate with the system 104 over a wide area network 1118 (e.g., the Internet), some or all of the functions capable of being performed by the system 104 may be performed by sending a directive(s) over the wide area network 1118 to the speech interface device 102, which, in turn, may process the directive(s) for performing an action(s). For example, the system 104 may instruct the speech interface device 102 to output an audible response (e.g., using text-to-speech (TTS)) to a user's question, to output content (e.g., music) via a speaker of the speech interface device 102, and/or to turn on a light in the environment. It is to be appreciated that the system 104 may be configured to provide other functions in addition to those discussed herein, such as, without limitation, conducting an electronic commerce transaction on behalf of the user 1106 as part of a shopping function, establishing a communication session between the user 1106 and another user, and so on.

In the example of FIG. 1, the user 1106 is shown as uttering the expression "Play some jazz." Whether this utterance is captured by the microphone(s) 1110 of the speech interface device 102 or captured by the other device in the environment, the audio data 1116 representing this user's speech is ultimately received by a speech interaction manager (SIM) 1122 of a voice services component 1124 executing on the speech interface device 102. The SIM 1122 may manage received audio data 1116 by processing utterances as events, and the SIM 1122 may also manage the processing of directives that are used to respond to the user speech (e.g., by controlling the action(s) of the speech interface device 102). The SIM 1122 may include one or more client applications 1126 or skills for performing various functions at the speech interface device 102.

A hybrid router 1128 of the speech interface device 102 is shown and may include a hybrid proxy (HP), among other components. The HP can be implemented as a layer within the voice services component 1124 that is located between the SIM 1122 and a speech communication library (SCL) 1132, and may be configured to proxy traffic to/from the system 104. For example, the HP may be configured to pass messages between the SIM 1122 and the SCL 1132 (such as by passing events and directives there between), and to send messages to/from a hybrid execution controller (HEC) 1134 via a second SCL. By "hooking into" the HP, the HEC 1134 is given the ability to "snoop" on communication between the SIM 1122 and the system 104 via the SCL 1132. For instance, directive data received from the system 104 can be sent to the HEC 1134 using the HP, which sits in the path between the SCL 1132 and the SIM 1122. The HP may also be configured to allow audio data 1116 received from the SIM 1122 to pass through to the remote speech processing system 1120 (via the SCL 1132) while receiving this audio data 1116 and sending the received audio data 1116 to the HEC 1134 via the SCL. It is to be appreciated that, in order to minimize any latency introduced by the implementation of the hybrid router 1128—which "snoops" on communications with the system 104 and implements selection logic for choosing which response to use for responding to user speech—the HP may be limited in its functionality to merely passing/sending messages with relatively simple filtering tools.

As shown in FIG. 11, the HEC 1134 may implement an abstraction layer, which allows the HEC 1134 to handle different transports and protocols when messages and data are received from other devices in the environment. That is, in order to operate in conjunction with various other types of devices in the environment, which may implement various different protocols (e.g., v1, v2, v20160207, Locutus, etc.) over various transport mechanisms (Hypertext Transfer Protocol (HTTP) 1.1, HTTP/2, SPDY, etc.), the abstraction layer can be used to accept these various types of protocols and converge them to a common protocol, such as by using a protocol translator. This can allow the speech interface device 102 to receive traffic from third party devices that do not conform to the protocol used by the speech interface device 102, and/or to receive traffic from legacy devices that use out-of-date protocols, which can be up-converted to a protocol used by the speech interface device 102 using the abstraction layer.

The HEC 1134 may act as a local endpoint, allowing other components to reach a local speech processing component 1140 that is configured to process audio data 1116 representing user speech. The HEC 1134 may further control the execution of the local speech processing component 1140, such as by sending "execute" and "terminate" events/instructions to the local speech processing component 1140. An "execute" event may instruct the local speech processing component 1140 to continue its execution based on audio data 1116 (e.g., by instructing the local speech processing component 1140 to execute on a previously-determined intent in order to generate a directive). Meanwhile, a "terminate" event may instruct the local speech processing component 1140 to terminate further execution based on the audio data 1116, such as when the speech interface device 102 receives directive data from the system 104 and chooses to use that remotely-generated directive data.

The components of the hybrid request selector 1128 may communicate with other components, and/or between themselves, using an application programming interface(s) (API(s)). For instance, the HEC 1134 may communicate with the local speech processing component 1140 using a suitable API, such as, without limitation, a C++ API. The API used by the HEC 1134 to communicate with the local speech processing component 1140 may be capable of passing messages (e.g., events and directives) as JavaScript Object Notation (JSON) objects, and these messages can have binary data attachments.

In the example of FIG. 11, where the user 1106 utters the expression "Play some jazz," the audio data 1116 is received by the SIM 1122 of the voice services component 1124. The SIM 1122 may send the audio data 1116 through the HP 1130 of the hybrid request selector 1128, which allows the audio data 1116 to pass through to the SCL 1132, and the SCL 1132, in turn, sends the audio data 1116 over the wide area network 1118 to the system 104 for processing speech remotely. The wide area network 1118 is representative of any type of public or private, wide-area network, such as the Internet, which extends beyond the environment of the speech interface device 102. Thus, the wide area network 1118 may represent and/or include, without limitation, data and/or voice networks, a wired infrastructure (e.g., coaxial cable, fiber optic cable, etc.), a wireless infrastructure (e.g., radio frequencies (RF), cellular, satellite, etc.), and/or other connection technologies.

The HP 1130 may also receive the audio data 1116 and send the received audio data 1116 to the HEC 1134 via the second SCL 1136. The HEC 1134 may then input the audio data 1116 to the local speech processing component 1140. At this point, the hybrid request selector 1128 may wait for a response from either or both of the system 104 or the local speech processing component 1140.

The local speech processing component 1140 is configured to receive the audio data 1116 from the HEC 1134 of the hybrid request selector 1128 as input, to recognize speech in the audio data 1116, to determine user intent from the recognized speech, and to determine how to act on the user intent by generating a directive (or directive data). In some cases, a directive may include a description of the intent (e.g., an intent to play jazz music). In some cases, a directive may include (e.g., encode) an identifier of a second device, and an operation to be performed at the second device.

In some embodiments, the speech interface device 102 may be configured to compare the audio data 1116 to stored models used to detect a wakeword that indicates to the speech interface device 102 that the audio data 1116 is to be processed for determining an intent. In some embodiments, the hybrid request selector 1128 may send the audio data 1116 to the local speech processing component 1140 to have the local speech processing component 1140 determine whether a wakeword is detected in the audio data 1116, and, if a wakeword is detected, this indication may be provided to the hybrid request selector 1128 so that the hybrid request selector 1128 can proceed with sending the audio data 1116 to the remote speech processing system 1120 while the local speech processing component 1140 continues processing the audio data 1116 in parallel. If the local speech processing component 1140 does not detect a wakeword in the audio data 1116, this indication may be provided to the hybrid request selector 1128 so that the hybrid request selector 1128 can refrain from sending the audio data 1116 to the remote speech processing system 1120, and the local speech processing component 1140 may halt further operations after determining that audio data 1116 does not include the wakeword. The audio data 1116 can be discarded in this situation.

Among other logical and physical components, the local speech processing component 1140 may include an ASR component 1142 (which may be similar to the ASR component 144 from FIG. 1) that is configured to perform ASR on the audio data 1116 to convert the audio data 1116 into ASR text data or other ASR output data. ASR transcribes audio data into text data or other ASR output data representing the words of the user speech contained in the audio data 1116. A spoken utterance in the audio data can be input to the ASR component 1142, which then interprets the utterance based on the similarity between the utterance and pre-established language models available to the local speech processing component 1140. For example, the ASR component 1142 may compare the input audio data 1116 with models for sounds (e.g., subword units or phonemes) and sequences of sounds to identify words that match the sequence of sounds spoken in the utterance of the audio data 1116. In some embodiments, the ASR component 1142 outputs the most likely text recognized in the audio data 1116, or multiple hypotheses in the form of a lattice or an N-best list with individual hypotheses corresponding to confidence scores or other scores (such as probability scores, etc.). In some embodiments, the ASR component 1142 is customized to the user 1106 (or multiple users) who created a user account to which the speech interface device 102 is registered. For instance, the language models (and other data) used by the ASR component 1142 may be based on known information (e.g., preferences) of the user 1106, and/or on a history of previous interactions with the user 1106.

The local speech processing component 1140 may also include a NLU component 1144 (which may be similar to the NLU component 146 from FIG. 1) that performs NLU on the generated ASR text data or other ASR output data to determine an intent so that directives may be determined based on the intent. Generally, the NLU component 1144 takes textual input (such as processed from the ASR component 1142) and attempts to make a semantic interpretation of the ASR text data or other ASR output data. That is, the NLU component 1144 determines the meaning behind the ASR text data or other ASR output data based on the individual words, and then the NLU component 1144 can implement that meaning. The NLU component 1144 interprets a text string to derive an intent or a desired action or operation from the user 1106. This may include deriving pertinent pieces of information in the text that allow the NLU component 1144 to identifying a second device in the environment, if the user, for example, intends to control a second device (e.g., a light in the user's 1106 house). In the example of FIG. 11, the ASR component 1142 may outputs the ASR text "Play some jazz," and the NLU component 1144 may determine that the user intended to play jazz music. The local speech processing component 1140 may also provide a dialog management function to engage in speech dialogue with the user 1106 to determine (e.g., clarify) user intents by asking the user 1106 for information using speech prompts. In some embodiments, the NLU component 1144 is customized to the user 1106 (or multiple users) who created a user account to which the speech interface device 102 is registered. For instance, data used by the NLU component 1144 to understand the meaning of ASR text may be based on known information (e.g., preferences) of the user 1106, and/or on a history of previous interactions with the user 1106.

The local speech processing component 1140 may also include, or be configured to use, one or more installed speechlets 1146. Speechlets 1146 may represent domains that are used in order to determine how to act on an utterance in a particular way, such as by outputting a directive that corresponds to the determined intent, and which can be processed to implement the desired operation. Accordingly, the term "speechlet" may be used interchangeably with the term "domain" or "domain implementation." The speechlets 1146 installed on the speech interface device 102 may include, without limitation, a music speechlet 1146 (or music domain) to act an utterances with intents to play music on a device, such as via a speaker(s) of the speech interface device 102, a shopping speechlet 1146 (or shopping domain) to act on utterances with intents to buy an item from an electronic marketplace, and/or a device control speechlet 1146 (or device control domain) to act on utterances with intents to control a second device(s) in the environment.

Upon determining an intent based on the audio data 1116, the local speech processing component 1140 may send first data to the HEC 1134 of the hybrid request selector 1128. This first data from the local speech processing component 1140 may indicate that the local speech processing component 1140 has started execution based on the audio data 1116 (e.g., by determining intent data or other NLU output data) and subsequently suspended the execution until further instruction from the HEC 1134. For example, the HEC 1134 may receive first data from the local speech processing component 1140 in the form of a "ReadyToExecute" directive (or signal), which indicates that the local speech processing component 1140 has recognized an intent, or is ready to communicate failure (if the local speech processing component 1140 could not recognize an intent via the NLU component 1144).

The first data from the local speech processing component 1140 that is received by the HEC 1134 may also include additional bits of information, such as preference data (e.g., a "preferLocal" bit or Boolean value) to indicate a preference for responding to the user speech with locally-generated directive data. An intent registry available to the NLU component 1144 and/or a pre-execution response from a speechlet 1146 or from a skill may be used to determine whether to execute an intent locally using the local speech processing component 1140. For example, a "preferLocal" bit can be set to a Boolean value of "true" if there is a preference for executing the intent by the local speech processing component 1140, or to a Boolean value of "false" if there is no preferences for executing the intent locally. Examples where the "preferLocal" bit may be set to a Boolean value of "true" include playing a local media file (from local storage), controlling a home appliance registered exclusively on a local network, vehicle telematics, etc. In one illustrative example, a user 1106 may have been playing music from a local source, and the user 1106 utters an expression "Play some jazz" without specifying a different source. The preference data, in this illustrative example, may be indicate a preference for responding to the user speech with locally-generated directive data, and by playing music from the local source (e.g., a local music library), without reliance on the system 104. In other scenarios, some skills (or client applications 1126) may be exclusively available on the speech interface device 102, and the system 104 may not have access to the skill that is available on the speech interface device 102, such as a skill that provides functionality in an automobile, without reliance on the system 104 to implement that functionality. In these scenarios, the HEC 1134 can be made aware of exclusively local skills through the preference data (e.g., the "preferLocal" bit or Boolean value), which means that the HEC 1134 may not wait for a response from the system 104 if, for example, the "preferLocal" bit is set to a value of "true" to indicate that the skill is exclusively available on the speech interface device 102, and is not available on the system 104. In yet another example, the speech interface device 102 may have access second devices in the environment that may allow the speech interface device 102 to determine an intent with high confidence, as compared to a remote speech processing components 1120 ability to recognize the intent with the same, high confidence. In an illustrative example, the user 1106 may utter the expression "Call Mom," and because the speech interface device 102 can access a contact list from the user's 1106 smart phone that is located in the vicinity of the speech interface device 102, the speech interface device 102 can determine a favorite contact with the name "Mom," and determine that the user's 1106 intent is to call that particular phone number that is saved as a favorite in the user's 1106 smart phone. In this illustrative example, preference data in the local response may be used to indicate, to the HEC 1134, a preference for using the locally-recognized intent in lieu of using a remotely-recognized intent. Accordingly, if such preference data indicates a preference for responding to the user speech with locally-generated directive data, the HEC 1134 may instruct the local speech processing component 1140 to continue its execution based on the audio data to generate directive data, and may instruct the HP 1130 to ignore (or refrain from sending to the SIM 1122 of the voice services component 1124) second directive data from the system 104, if remotely-generated directive data is received at all.

Additionally, or alternatively, the first data from the local speech processing component 140 that is received by the HEC 1134 may include capability data (e.g., an "isCapabilityPresent" bit or Boolean value) to indicate the availability, or an unavailability, of a local speechlet 1146 for responding to the user speech. An intent registry available to the NLU component 1144 and/or a pre-execution response from a speechlet 1146 may be used to determine whether a local speechlet 1146 is available or unavailable for responding to the user speech. For example, an "isCapabilityPresent" bit can be set to a Boolean value of "true" if there is a local speechlet 1146 that is capable of handling an event corresponding to the user speech (or the audio data 1116 representing the user speech), or to a Boolean value of "false" if none of the local speechlets 1146 are capable of handling the event.

Additionally, or alternatively, the first data from the local speech processing component 1140 that is received by the HEC 1134 may include a confidence score (e.g., 0 to 100%) associated with an intent determined by the local speech processing component 1140 based on the audio data 1116, indicating the NLU component's 1144 confidence of intent recognition.

Upon the HEC 1134 receiving first data in the form of a "ReadyToExecute" response from the local speech processing component 1140, further execution by the local speech processing component 1140 may be suspended until further instruction from the HEC 1134, where, depending on data available to the HEC 1134, the HEC 1134 is configured to instruct the local speech processing component 1140 to either (a) continue the execution (e.g., by continuing execution of the intent to generate directive data), or (b) terminate the execution (e.g., by refraining from generating directive data).

Depending on the availability of the system 104, a response from the system 104 may or may not be received, and the timing of the receipt of such a response may vary (e.g., a response from the system 104 may be received before or after a response from the local speech processing component 1140). In any scenario, the HEC 1134 of the hybrid request selector 1128 is configured to determine whether to respond to the user speech with directive data generated by the local speech processing component 1140, or, if a response from the system 104 is received, whether to respond to the user speech with second directive data received from the system 104. When a response (second data) from the system 104 is received by the SCL 1132 for example, the HP 1130 may send this second data, including remotely-generated directive data, to the HEC 1134 via the SCL 1136. The HEC 1134 can then implement selection logic to choose which response to utilize in responding to the user speech.

If the HEC 1134 determines to respond to the user speech with directive data generated by the local speech processing component 1140, the HEC 1134 may instruct the local speech processing component 1140 to continue its execution based on the audio data 1116. For example, the HEC 1134 may send an "Execute" event to the local speech processing component 1140 instructing the local speech processing component 140 to execute on the determined intent, and continue handling the suspending event by generating directive data. Upon the HEC 1134 receiving this locally-generated directive data, the HEC 1134 may forward the locally-generated directive data to the HP 1130, which sends the locally-generated directive data to the SIM 1122 of the voice services component 1124. The voice services component 1124 (possibly with the use of a client application 1126) may process the locally-generated directive data to cause the speech interface device to perform an action, such as outputting content via an output device 1112; in this case, outputting jazz music via one or more speakers of the speech interface device 102.

If, on the other hand, the HEC 1134 determines to respond to the user speech with directive data received from the system 104 (assuming a response from the system 104 was received and sent via the HP 1130 to the HEC 1134), the HEC 1134 may instruct the local speech processing component 1140 to terminate its execution based on the audio data 1116. For example, the HEC 1134 may send a "Terminate" event to the local speech processing component 1140 instructing the local speech processing component 1140 to abandon the previously-suspended event by refraining from generating directive data. Not only does this help avoid a double intent execution issue, but it conserves compute resources on the speech interface device 102 by avoiding operations required to generate directive data locally.

The HEC 1134 can also instruct the HP 1130 to perform directive arbitration in a particular manner, depending on the decision of the HEC 1134 in terms of which response to use for responding to the user speech. That is, if the HEC 1134 determines to respond to the user speech with directive data generated by the local speech processing component 1140 (in lieu of directive data that may be received from the system 104), the HEC 1134 can send a "Choose" directive (or signal) to the HP 1130 instructing the HP 1130 to send locally-generated directive data to the SIM 1122 of the voice services component 1124, and to ignore, or refrain from sending, remotely-generated directive data (if any is received) to the SIM 1122. If the HEC 1134 determines instead to respond to the user speech with directive data received from the system 104 (in lieu of directive data generated by the local speech processing component 1140), the HEC 1134 can send a "Choose" directive (or signal) to the HP 1130 instructing the HP 1130 to send remotely-generated directive data to the SIM 1122, and to ignore, or refrain from sending, locally-generated directive data to the SIM 1122. This filtering (or directive arbitration) performed by the HP 1130 (based on an instruction from the HEC 1134) also avoids a double intent execution issue, such as the speech interface device 102 performing two actions, which, in some cases, may be identical actions.

Accordingly, under normal conditions—when a wide area network connection is available to the speech interface device 102—the hybrid request selector 1128 of the speech interface device 102 may receive a directive from the system 104 and may end up using that directive in lieu of using a locally-generated directive. Assuming the remote speech processing system 1120 recognizes an intent and is capable of responding (e.g., a remote speechlet is available), there may be a preference for using the directive received from the system 104. This preference for remotely-generated directives, when available, may be based on the notion that local ASR and NLU may match the level of performance achievable by remote ASR and NLU components, which are often less-resource-constrained at the system 104. For example, the speech interface device 102 is likely to have constrained resources (e.g., processing resources, memory resources, etc.) as compared to the computing resources available to the system 104. Thus, the level of quality provided by local speech processing may be lower than the quality level achievable by remote speech processing systems. However, in some cases, such as when connectivity to the wide area network 1118 is down, and/or when the local speech processing component 1140 may be faster or better at responding to a particular utterance, the locally-generated directive may be used to provide a better user experience (e.g., a faster or better response). In any case, the hybrid request selector 1128 may use a response (second data) from the system 104 without waiting for first data to be received from the local speech processing component 1140, and vice versa, regardless of the availability status of the system 104.

It is to be appreciated that the local speech processing component 1140 may be configured to generate, as output, directive data that is formatted in a same, or a similar, format used by the remote speech processing system 1120 of the system 104. Thus, when a directive is generated by the local speech processing component 1140, the directive can be processed by downstream components of the speech interface device 102 in the same way that a directive received from the system 104 would be processed. Thus, the downstream components of the speech interface device 102 (e.g., the SIM 1122 of the voice services component 1124) may be unaware of the fact that the speech interface device 102 may be processing speech locally (e.g., when the Internet is down) because directives generated by the local speech processing component 1140 may be formatted in the same or similar way that remotely-generated directives are formatted, which makes the local speech processing "transparent" to the downstream components of the speech interface device 102 that process directives.

In an example, directive data that is generated by a domain/speechlet of the remote speech processing system 1120 and/or the local speech processing component 1140 may be formatted using Java, such as JavaScript syntax, or JavaScript-based syntax. This may include formatting the directive using JSON. In some embodiments, such a locally-generated directive may be serialized, much like how remotely-generated directives are serialized for transmission in data packets over the wide area network 1118. In other embodiments, a locally-generated directive is formatted as a programmatic application programming interface (API) call with a same logical operation as a remotely-generated directive. In other words, a locally-generated directive may mimic remotely-generated directives by using a same, or a similar, format as the remotely-generated directive.

An example structure of a locally-generated directive may include a header object, an endpoint object, and a payload object. The header object may include a set of fields that provide different types of identifying information (sometimes called "properties"). Header properties may include, without limitation, a namespace (e.g., for specifying a category for the message payload, e.g., "SpeechSynthesizer,"), a name (e.g., "Speak"), a message identifier (ID) (e.g., a unique identifier for a single request or response), a correlation token (e.g., to identify a directive, and possibly events associated therewith), a payload version (e.g., version of the capability interface applied to the message), a "keys" section, etc., A "ReadyToExecute" response (first data) received by the HEC 1134 from the local speech processing component 1140 may have a similar data structure with similar header properties. The aforementioned "data", such as the "preference data" (e.g., "preferLocal" bit), the "capability data" (e.g., "isCapabilityPresent" bit, and the like, may be included as header extensions, such as by adding values in the "keys" subsection of the header. An endpoint object may identify a target for a directive, and possibly an origin of an event. An endpoint, in this context, can represent a physical device, a virtual device, a group of devices, a software component. The endpoint may include an authentication token to enable communication with a device(s) or component represented by the endpoint. Endpoint properties may include, without limitation, a scope (e.g., a polymorphic object that provides authorization and identifying information for a message, and may include a token that identifies a user), an endpoint ID (e.g., a unique identifier corresponding to the endpoint), and a cookie (e.g., a list of key/value pairs associated with the endpoint).

Figure 12:
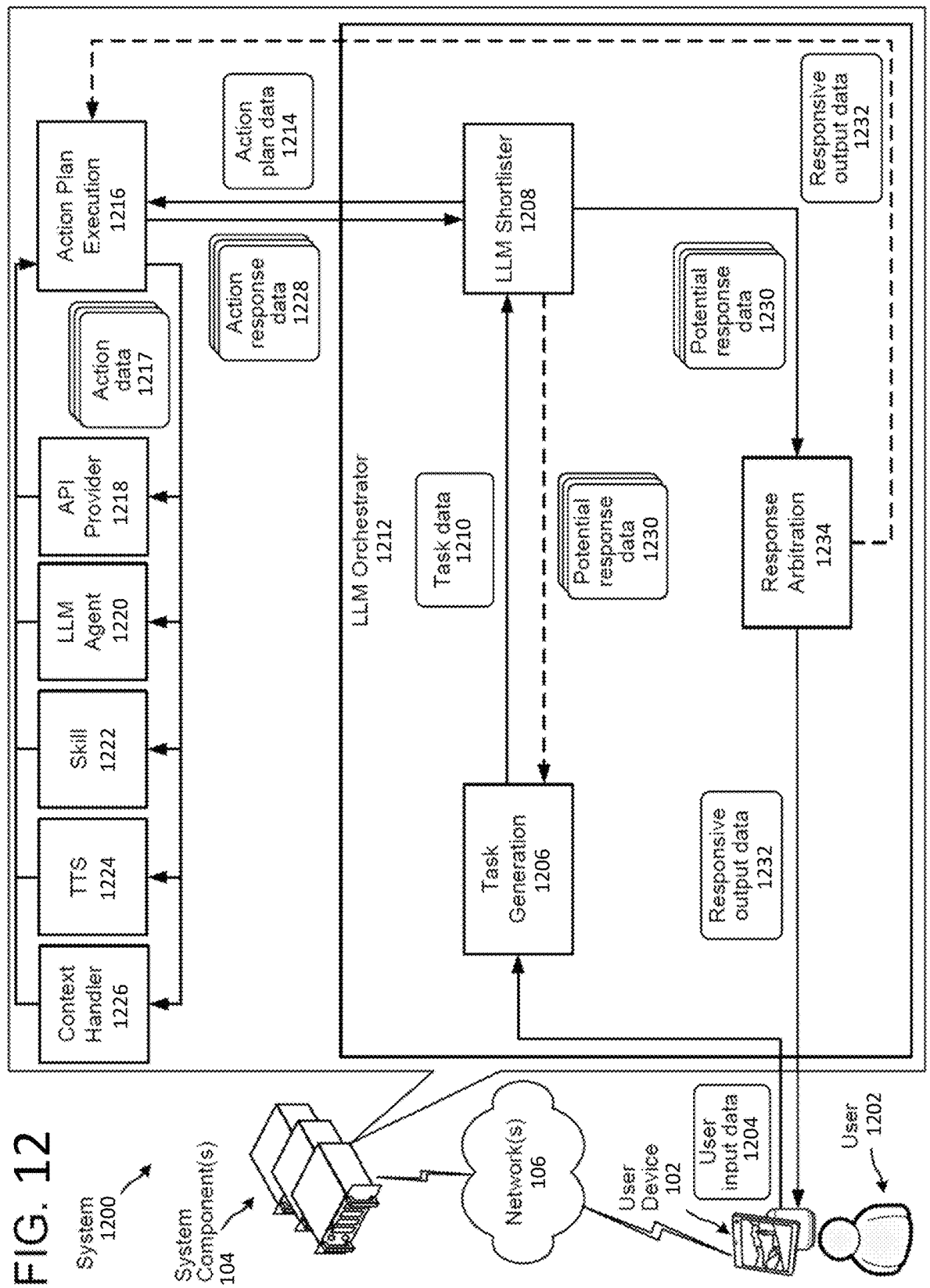
FIG. 12 is a conceptual diagram illustrating example components and processing of a system configured to determine a response to a user input, according to embodiments of the present disclosure.

FIG. 12 illustrates further example components included in the system 1200 configured to determine an action responsive to a user input and in which the context handler component 1226 may be implemented. As shown in FIG. 12, the system may include a user device 102, local to a user 1202, in communication with a system component(s) 104 via a networks(s) 106. The networks(s) 106 may include the Internet and/or any other wide- or local-area network, and may include wired, wireless, and/or cellular network hardware.

The system component(s) 104 may include various components, such as a large language model (LLM) orchestrator component 1212, and an action plan execution component 1216. The LLM orchestrator component 1212 may include a task generation component 1206, an LLM shortlister component 1208, and a response arbitration component 1234.

In some embodiments, the LLM orchestrator component 1212 may generate prompt data representing a prompt for input to one or more language models. As shown in FIG. 12, the system component(s) 104 receive the user input data 1204, which may be provided to the LLM orchestrator component 1212. In some instances, the user input data 1204 may correspond to various data types, such as text (e.g., a text or tokenized representation of a user input), audio, image, video, etc. For example, the user input data may include input text (or tokenized) data when the user input is a typed natural language user input. For further example, prior to the LLM orchestrator component 1212 receiving the user input data 1204, another component (e.g., an automatic speech recognition (ASR) component 144) of the system 1200 may receive audio data representing the user input. The ASR component 144 may perform ASR processing on the audio data to determine ASR data corresponding to the user input, which may correspond to a transcript of the user input. As described below, with respect to FIG. 16, the ASR component 144 may determine ASR data that includes an ASR N-best list including multiple ASR hypotheses and corresponding confidence scores representing what the user may have said. The ASR hypotheses may include text data, token data, ASR confidence score, etc. as representing the input utterance. The confidence score of each ASR hypothesis may indicate the ASR component's 144 level of confidence that the corresponding hypothesis represents what the user said. The ASR component 144 may also determine token scores corresponding to each token/word of the ASR hypothesis, where the token score indicates the ASR component's 144 level of confidence that the respective token/word was spoken by the user. The token scores may be identified as an entity score when the corresponding token relates to an entity. In some instances, the user input data 1204 may include a top scoring ASR hypothesis of the ASR data. As an even further example, in some embodiments, the user input may correspond to an actuation of a physical button, data representing selection of a button displayed on a graphical user interface (GUI), image data of a gesture user input, combination of different types of user inputs (e.g., gesture and button actuation), etc. In such embodiments, the system 1200 may include one or more components configured to process such user inputs to generate the text or tokenized representation of the user input (e.g., the user input data 1204).

In some embodiments, the LLM orchestrator component 1212 may receive input data, which may be processed in a similar manner as the user input data 1204 as described herein. The input data may be received in response to detection of an event such as change in device state (e.g., front door opening, garage door opening, TV turned off, etc.), occurrence of an acoustic event (e.g., baby crying, appliance beeping, etc.), presence of a user (e.g., a user approaching the device 102, a user entering the home, etc.). In some embodiments, the system 1200 may process the input data and generate a response/output. For example, the input data may be received in response to detection of a user generally or a particular user, an expiration of a timer, a time of day, detection of a change in the weather, a device state change, etc. In some embodiments, the input data may include data corresponding to the event, such as sensor data (e.g., image data, audio data, proximity sensor data, short-range wireless signal data, etc.), a description associated with the timer, the time of day, a description of the change in weather, an indication of the device state that changed, etc. The system 1200 may include one or more components configured to process the input data to generate a natural language representation of the input data. The system 1200 may process the input data and may perform an action. For example, in response to detecting a garage door opening, the system 1200 may cause garage lights to turn on, living room lights to turn on, etc. As another example, in response to detecting an oven beeping, the system 1200 may cause a device 102 (e.g., a smartphone, a smart speaker, etc.) to present an alert to the user. The LLM orchestrator component 1212 may process the input data to generate tasks that may cause the foregoing example actions to be performed.

In some embodiments, the LLM orchestrator component 1212 may generate prompt data representing a prompt for input to the language models. As shown in FIG. 12, the user input data 1204 may be received at the task generation component 1206 of the LLM orchestrator component 1212, which may be configured to generate a list (e.g., one or more) of tasks (e.g., steps/actions) that are to be completed in order to perform an action responsive to the user input and select a task of the list of the tasks that is to be completed first (e.g., in a current iteration of processing by the system 1200), as described in detail herein below with respect to FIG. 13. For example, for a user input of "What is the weather for today," the task generation component 1206 may generate a list of tasks of "(1) determine current outside temperature from thermostat; and (2) determine weather forecast for today" and select the task of "determine weather forecast for today" to be completed first. For further example, for a user input of "I am back, please continue outputting the recipe instructions," the task generation component 1206 may generate a list of tasks of "(1) determine context for outputting the recipe instructions; and (2) resume output of the recipe instructions" and select the task of "determine context for outputting the recipe instructions" to be completed first.

In instances where the task generation component 1206 generates more than one task to be completed in order to perform the action responsive to the user input, the task generation component 1206 may further maintain and prioritize the list of tasks as the processing of the system 1200 with respect to the user input is performed. In other words, as the system 1200 processes to complete the list of tasks, the task generation component 1206 may (1) incorporate the potential responses associated with completed tasks into data provided to other components of the system 1200; (2) update the list of tasks to indicate completed (or attempted, in-progress, etc.) tasks; (3) generate an updated prioritization of the tasks remaining to be completed (or tasks to be attempted again); and/or (4) determine an updated current task to be completed. The task generation component 1206 may generate and send task data 1210 representing the selected task to be completed and various other information needed to perform further processing with respect to the task (e.g., the user input data 1204, an indication of the selected task, potential responses associated with previous tasks, the remaining task(s), and context data associated with the user input data 1204, as described in detail herein below with respect to FIG. 13) to the LLM shortlister component 1208.

The LLM shortlister component 1208 may be configured to determine one or more components (e.g., an API provider component 1218, skill component(s) 1222, LLM agent component(s) 1220, a TTS component 1224, the context handler component 1226, etc.) configured to perform an action related to the user input or the current task. The LLM shortlister component 1208 may further be configured to generate and cause the execution of a request(s) (e.g., an API call(s), an incomplete API call/API call format, an indication of an action to be performed by a component, etc.) for the one or more components to provide a potential response(s) to the user input or current task (e.g., a response to a user-provided question, a paragraph from a website, etc.), which may further include a potential action (e.g., a description of a potential action, such as turning on a light, booking a flight ticket, ordering a pizza, etc.) the components are configured to/will perform with respect to the user input or the current task). For example, for a current task of "determine weather forecast for today," the LLM shortlister component 1208 may generate requests of "determine user's preferred weather application," "use Weather Application A to determine weather forecast for today," "use Weather Application B to determine weather forecast for today," or the like. Such requests may be represented in the action plan data 1214 sent to the action plan execution component 1216. The action plan execution component 1216 may identify the request(s) in the action plan data 1214, generate executable API calls corresponding to the request(s), and cause the corresponding components (e.g., the API provider component 1218, the LLM agent component 1220, the skill component 1222, the TTS component 1224, and/or the context handler component 1226) to generate action response data 1228 representing the requested potential response(s), where individual action response data 1228 may be provided by/correspond to a particular component-one of the API provider component 1218, the LLM agent component 1220, the skill component 1222, the TTS component 1224, and/or the context handler component 1226. In some embodiments, the action response data 1228 may include an identifier (e.g., a component name, an alphanumerical value associated with the component, etc.) for the component providing the data. The LLM shortlister component 1208 receives and processes the action response data 1228 and generates potential response data 1230 representing the potential response(s) (e.g., relevant potential responses, selected potential responses, ranked potential responses, etc.) for further processing (e.g., as described in detail herein below with respect to FIG. 6). If the LLM shortlister component 1208 determines that there are no remaining tasks to generate potential responses for, the LLM shortlister component 1208 may send the potential response data 1230 to the response arbitration component 1234.

The potential response data 1230, in some embodiments, may be determined based on receiving potential responses from various different components that may be relevant in responding to the user input data 1204. For example, the potential response data 1230 may include a first potential response from a first component configured to perform a first task determined by the task generation component 1206, a second potential response from a second component configured to perform a second task determined by the task generation component 1206, etc. The potential response data 1230 can include more than one potential response relating to an individual task. In some embodiments, the potential response data 1230 may be natural language data.

The response arbitration component 1234 processes the potential response data 1230 to determine whether the potential responses generated for the one or more tasks are responsive to the user input. The response arbitration component 1234 processes the potential response data 1230 (representing at least the generated potential responses) and selects one or more of the potential responses that are determined to be responsive to the user input and/or determines that none of the actions are responsive to the user input. For example, the response arbitration component 1234 may process the potential response data 1230 to determine if one or more of the potential responses performable by the API(s) (e.g., the potential responses and/or potential actions) are responsive to the current task. In some embodiments, the response arbitration component 1234 may generate a natural language summary of one or more of the selected responses and output the natural language summary. For example, for a user input of "what is the weather for today" and potential responses of "The weather for today is a high of 75 and a low of 68" and "The weather for today is mostly sunny with a slight chance of rain in the evening," the response arbitration component 1234 may generate a natural language summary of "The weather for today is expected to be mostly sunny with a high of 75 and a low of 68 and a slight chance of rain in the evening," or the like.

Figure 13:
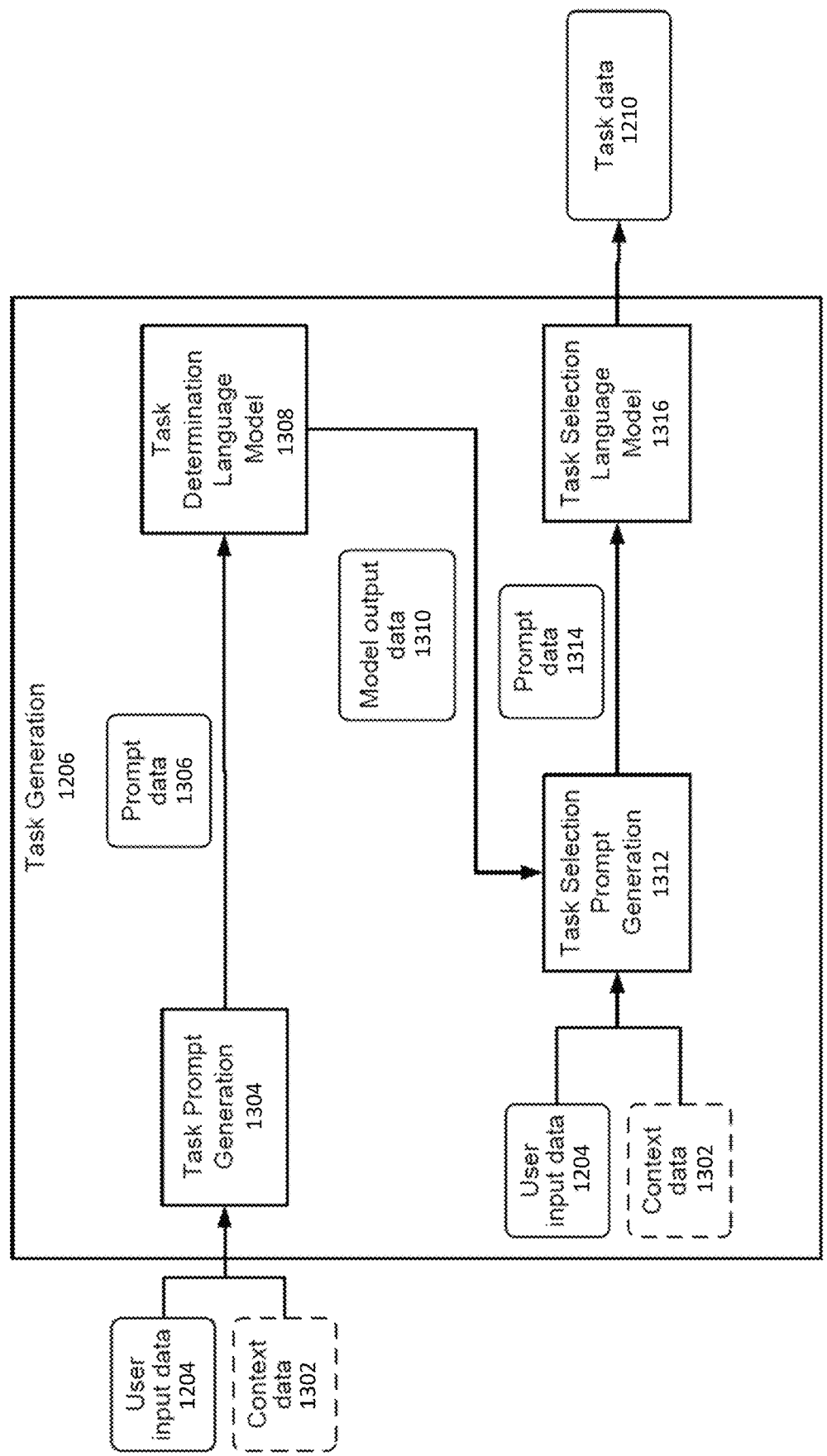
FIG. 13 is a conceptual diagram illustrating example components and processing of a plan generation component, according to embodiments of the present disclosure.

FIG. 13 illustrates example processing of the task generation component 1206. As shown in FIG. 13, the task generation component 1206 may include a task prompt generation component 1304, a task determination language model 520, a task selection prompt generation component 530, and a task selection language model 540.

As further shown in FIG. 13, the user input data 1204 is received at the task prompt generation component 1304, which is configured to generate a list (e.g., one or more) of tasks (e.g., steps/actions) that are to be completed in order to perform an action responsive to the user input and select a task of the list of the tasks that is to be completed first (e.g., in a current iteration of processing by the system 1200). As discussed herein above, in some embodiments, the prompt generation component 110 may correspond to the task prompt generation component 1304, and vice versa.

The task prompt generation component 1304 processes the user input data 1204 to generate prompt data 1306 representing a prompt for input to the task determination language model 1308. In some embodiments, the task prompt generation component 1304 may further receive an indication of one or more remaining tasks to be completed with respect to the user input data 1204. A task to be completed may correspond to a task for which the system 1200 has yet to generate potential responses for (e.g., for which a responding component, such as the API provider component 1218, the LLM agent component 1220, the skill component 1222, the TTS component 1224, and/or the context handler component 1226 have yet to generate action response data for). Similarly, a completed task may correspond to a task for which the system 1200 has generated potential responses for (e.g., for which a responding component, such as the API provider component 1218, the LLM agent component 1220, the skill component 1222, the TTS component 1224, and/or the context handler component 1226 have generated action response data). For example, if the current iteration of processing with respect to the user input data 1204 is a subsequent iteration of processing (e.g., the system previously determined that more than one task is to be completed in order to perform an action responsive to the user input data 1204 and has previously generated potential responses for at least a first task of the more than one tasks), then the task prompt generation component 1304 may further receive an indication of the remaining tasks to be completed. In such embodiments, the task prompt generation component 1304 may further receive an indication of the task(s) to complete processing for and/or the potential response(s) of the processing. The task prompt generation component 1304 may further receive the context data 1302 representing various contextual signals associated with/relevant to the user input data 1204, such as user profile information (e.g., user ID, user behavioral information, user preferences, age, gender, devices associated with the user profile, etc.), weather information, time of day, device information associated with the device that sent the user input data 1204 (e.g., device ID, device states, historical device interaction data, etc.). In some embodiments, the context data 1302 may correspond to the context data retrieved by the context handler component 1226. For example, the context data 1302 may be retrieved during a previous iteration of processing by the LLM orchestrator component 1212, where the context data 1302 was caused to be retrieved by the LLM shortlister component 1208 (e.g., in response to the task generation component 1206 determining that the context data is to be retrieved) and sent to the task generation component 1206 thereafter (e.g., as potential response data). In other embodiments, the context data 1302 may correspond to the context data stored in the memory storage, as discussed herein. Such prompt data 1306 may be generated based on combining the user input data 1204 and the context data 1302 (and, in some embodiments, the indication of the remaining task(s), completed task(s), and/or the potential responses).

In some embodiments, the prompt data 1306 may be an instruction for the task determination language model 1308 to determine one or more tasks (e.g., steps/actions) that are to be completed in order to perform an action responsive to the user input given the other information (e.g., the context data 1302, the indication of the remaining task(s), the indication of the completed task(s), and/or the corresponding potential responses) included in the prompt data 1306.

For example for a user input of "turn on all of the lights except the garage," the task prompt generation component 1304 may generate example prompt data 1306:
{Create a new task if necessary to help complete a request to turn on all of the lights except the garage.
Here are the completed tasks, their potential responses, user inputs, and context so far:
[ ]
These are the remaining tasks to be completed:
[ ]
Based on the result, create new tasks to be completed, if necessary.
}

In some embodiments, the task prompt generation component 1304 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data 1306 may include "Please generate a polite, respectful, and safe response and one that does not violate protected class policy."

The task determination language model 1308 processes the prompt data 1306 to generate model output data 1310 representing one or more predicted tasks to be completed in order to perform the action responsive to the user input. For example, based on processing the first example prompt data provided above, the task determination language model 1308 may output model output data 1310: {"turn on all of the lights except the garage light,"} or the like.

In some embodiments, the threshold for determining the one or more tasks may be such that the task determination language model 1308 is encouraged to generate multiple predicted tasks for a given user input, where the system 1200 may parse and filter the list of tasks during downstream processing (e.g., during the processing of the task selection language model 1316). For example, based on processing the first example prompt data provided above, the task determination language model 1308 may output model output data 1310: {"turn on all of the lights except the garage light," "turn on all lights," "identify which garage light," "turn on all lights then turn off garage light," "turn on all lights where user is located," "turn on kitchen lights, living room lights, dining room lights, hallways lights" "turn on all lights on first floor,"} or the like. As discussed herein above, in some embodiments the LLM may correspond to the task determination language model 1308. As such, in such embodiments, the task determination language model 1308 may process, in addition to the processing described herein below, similarly to LLM discussed herein above (e.g., the task determination language model 1308 may determine that context data is needed to generate a response to a user input, such as by generating a context-retrieval task).

As an example of a user input that is associated with more than one task, the LLM orchestrator component 1212 may receive a user input of "please order some pizza for dinner" and the task prompt generation component 1304 may generate example prompt data 1306:
{
Create a new task if necessary to help complete a request to order some pizza for dinner.

Here are the completed tasks, their potential responses, user inputs, and context so far:
[ ]
These are the remaining tasks to be completed:
[ ]
Based on the result, create new tasks to be completed, if necessary.
}

The task determination language model 1308 processes the prompt data 1306 to generate model output data 1310 representing one or more predicted tasks to be completed in order to perform the action responsive to the user input. For example, based on processing the example prompt data provided above, the task determination language model 1308 may output model output data 1310: {"identify user pizza preference;" (or some other request for context, such as "determine context to order pizza for dinner") "find application that enables ordering of pizza,"} or the like.

As an example of a subsequent round of processing with respect to a user input (e.g., processing performed with respect to a user input that is associated with more than one task), and for the abovementioned user input of "please order some pizza for dinner", the system 1200 may process as described herein below to select and complete the task of "identify user pizza preference" (or some other request for context). The task prompt generation component 1304 may process the user input, corresponding context data, the remaining task list, and the potential responses (e.g., the users pizza preference, determined, for example, using the context data 1302 retrieved using the context handler component 1226) to generate example prompt data 1306:
{
Create a new task if necessary to help complete a request to order some pizza for dinner.
Here are the completed tasks, their potential responses, user inputs, and context so far:
Completed tasks:
  Identify user pizza preference: user ordered Brooklyn style pizza from [Pizza Company Name 1]
These are the remaining tasks to be completed:
Find application to order pizza
Based on the result, create new tasks to be completed, if necessary.
}

The task determination language model 1308 processes the prompt data 1306 to generate model output data 1310 representing one or more predicted tasks to be completed in order to perform the action responsive to the user input. For example, based on processing the example prompt data provided above, including the context data retrieved using the context handler component 1226 during the previous round of processing, the task determination language model 1308 may further output model output data 1310: {"find an application to order pizza" "find API to order [Pizza Company Name 1] pizza,"} or the like.

In some embodiments, the one or more predicted tasks may include a task of storing context data. For example, the model output data 1310 may include a task of storing relevant context data used during the processing performed with respect to the user input data 1204. For further example, the model output data 1310 may include a task of storing context data that was used during the processing performed with respect to previous user input data.

The model output data 1310 is sent to the task selection prompt generation component 1312, which processes the model output data 1310 to generate prompt data 1314 representing a prompt for input to the task selection language model 1316. In some embodiments, such prompt data 1314 may be generated based on combining the user input data 1204, the context data 1302, the prompt data 1306, and/or the model output data 1310. In some embodiments, the task generation component 1206 may include another component that parses the model output data 1310 to determine the one or more tasks and may send a representation of the one or more tasks to the task selection prompt generation component 1312.

In some embodiments, the prompt data 1314 may be an instruction for the task selection language model 1316 to select a task of the one or more tasks that is to be completed first (e.g., completed during the current iteration of processing) given the information (e.g., user input data 1204, the context data 1302, and the one or more tasks) included in the prompt data 1314. In some embodiments, the prompt data 1314 may further include an instruction for the task selection language model 1316 to determine a priority of the one or more tasks (e.g., an ordered list representing the order in which the one or more tasks are to be completed).

For example, for the example user input provided above of "please order some pizza for dinner," the task selection prompt generation component 1312 may generate example prompt data 1314:
{
Select the top prioritized task given the ultimate goal of order some pizza for dinner
Here are the completed tasks, their potential responses, user inputs, and context so far:
[ ]
Here are the task candidates:
Identify user pizza preference (or some other context retrieval task)
Find an application that sells pizza
Return your selected task, return None if the goal is achieved or indicate existing ambiguities.
}

For further example, for the second round of processing performed with respect to the example user input of "please order some pizza for dinner," the task selection prompt generation component 1312 may generate example prompt data 1314:
{
Select the top prioritized task given the ultimate goal of please order some pizza for dinner
Here are the completed tasks, their potential responses, user inputs and context so far:
Completed tasks:
  Identify user pizza preference: user ordered Brooklyn style pizza from [Pizza Company 1 Name]
Here are the task candidates:
find an application that sells pizza
find API that sells [Pizza Company 1 Name] pizza
Return your selected task, return None if the goal is achieved or indicate existing ambiguities.
}

In some embodiments, the task selection prompt generation component 1312 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data may include "Please generate a polite, respectful, and safe response and one that does not violate protected class policy."

The task selection language model 1316 processes the prompt data 1314 to generate model output data representing the task to be completed first and/or a prioritization of the one or more tasks. For example, based on processing the first example prompt data 1314 provided above, the task selection language model 1316 may output model output data: {"1. Identify user pizza preference,"} or the like. For further example, based on processing the second example prompt data 1314 provided above, the task selection language model 1316 may output model output data: {"1. Find an API that sells [Pizza Company Name 1] pizza,"} or the like. In some embodiments, during processing of the task selection language model 1316 to select and/or prioritize the one or more tasks, the task selection language model 1316 may update the task list to remove any redundant and/or conflicting tasks. For example, for the example prompt data 1314, the task selection language model 1316 may determine that the remaining tasks of "find an application that sells pizza" and "find an API that sells [Pizza Company Name 1] pizza" are redundant, and that "find an API that sells [Pizza Company Name 1] pizza has a higher priority. Therefore, the task selection language model 1316 may remove the task of "find an application that sells pizza" from the remaining task list. Thereafter, the task generation component 1206 (or another component of the task generation component 1206) may process the model output data of the task selection language model 1316 to determine task data 1210 representing the user input data 1204 and/or the task selected by the task selection language model 1316 to be completed first. In some embodiments, the task data 1210 may include the remaining one or more tasks and/or may indicate the prioritization of the one or more tasks, as determined by the task selection language model 1316. The task data 1210 may be sent to the LLM shortlister component 1208, which is described in detail herein below with respect to FIG. 14.

Figure 14:
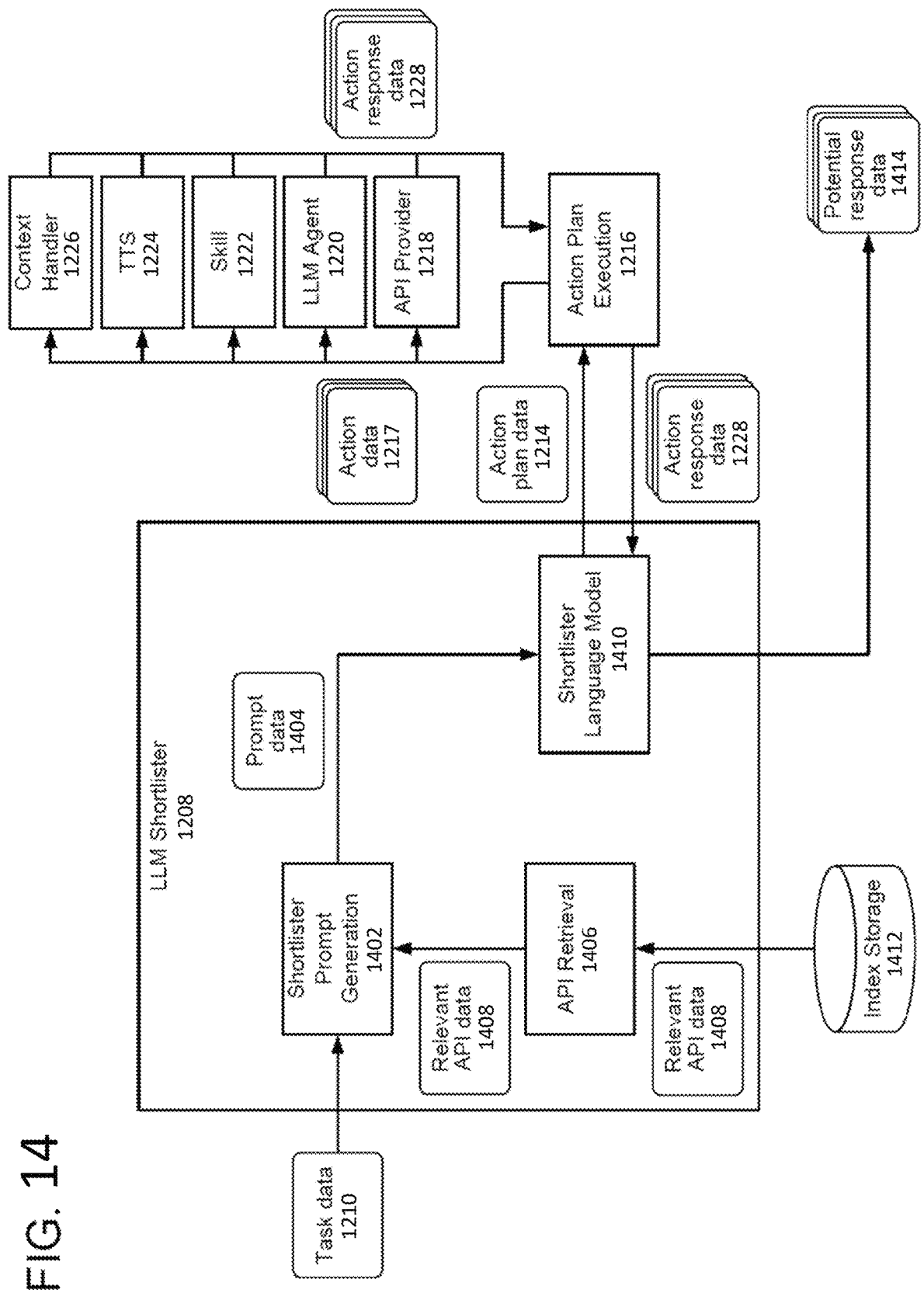
FIG. 14 is a conceptual diagram illustrating example components and processing of an large language model (LLM) shortlister component, according to embodiments of the present disclosure.

FIG. 14 illustrates example processing of the LLM shortlister component 1208. As shown in FIG. 14, the LLM shortlister component 1208 may include an index storage 1412, an API retrieval component 1406, a shortlister prompt generation component 1402, and a shortlister language model 1410.

The LLM shortlister component 1208 is configured to determine one or more components (e.g., APIs via the API provider component 1218, skill component(s) 1222, LLM agent component(s) 1220, TTS component 1224, context handler component 1226, etc.) configured to perform an action related to the user input or the current task. The LLM shortlister component 1208 is further configured to generate and cause the execution of a request(s) (e.g., an API call(s), an incomplete API call/API call format, an indication of an action to be performed by a component, etc.) for the one or more components to provide a potential responses(s) to the user input or current task (e.g., a response to a user-provided question, a paragraph from a website, etc.), which may further include a potential action (e.g., a description of a potential action, such as turning on a light, booking a flight ticket, ordering a pizza, etc.) the components are configured to/will perform with respect to the user input or the current task).

As further shown in FIG. 14, the task data 1210 is received at the shortlister prompt generation component 1402. The shortlister prompt generation component 1402 processes the task data 1210 to generate prompt data 1404 representing a prompt for input to the shortlister language model 1410. In some embodiments, such prompt data 1404 may be generated based on combining the task data 1210 (e.g., the user input data 1204, the context data 1302, the selected task, remaining tasks, potential responses associated with one or more previous tasks, etc.) and relevant API data 1408 representing one or more APIs associated with the user input data 1204 and/or the current task.

The relevant API data 1408 may be generated by the API retrieval component 1406, which may be configured to retrieve one or more (e.g., top-k) relevant APIs associated with the user input data 1204 or the current task. In some embodiments, the APIs may correspond to various components. For example, the components may correspond to rule-based components, ML-based components, LLM-based components, or the like, such as the orchestrator component 1612, the API provider component 1218, the LLM agent component 1220, the skill component 1222, the TTS component 1224, the context handler component 1226, etc.) In some embodiments, the APIs may correspond to the components.

The API retrieval component 1406 may use retrieval-based approaches to retrieve the one or more relevant APIs from the index storage 1412, which may store various information associated with multiple APIs (and/or components) such as component descriptions, API arguments (e.g., parameter inputs/outputs), identifiers for components (e.g., such as the API provider component 1218, the LLM agent component 1220, the skill component 1222, the TTS component 1224, the context handler component 1226, etc.) that provides the API, etc. For example, the API retrieval component 1406 may compare one or more APIs (and/or components) included in the index storage 1412 to the user input or the current task to determine one or more APIs (or components) (top-k) that corresponds to the user input or the current task (e.g., APIs (and/or components) that are semantically similar to the user input or the current task, APIs (and/or components) that are capable of performing the current task, etc.). In some embodiments, the API retrieval component 1406 (or another component of the API retrieval component 1406) may determine an encoded representation of the user input or the current task and compare (e.g., using cosine similarity) the encoded representation(s) to an encoded representation of a component description for the API (and/or component) to determine whether the API (and/or component) is semantically similar to the user input or the current task. A component description may correspond to a description of the one or more function that the API (and/or component) is configured to perform and/or other information associated with the API (and/or component) (e.g., an API call formatting structure (e.g., including input parameters), historical accuracy/defect rate, historical latency value, etc.). In some embodiments, the component description may further include one or more exemplars associated with use of the API (and/or component) (e.g., an example user input, corresponding API call, and example API output). If the value of semantic similarity meets or exceeds a threshold, the API (and/or component) (and, optionally, the component description) may be included in the relevant API data 1408. In some embodiments, the API retrieval component 1406 may determine the relevant API data 1408 further using contextual information, including the context data 1302, an accuracy/defect rate value associated with the APIs (and/or components), and/or a historical latency value associated with the APIs (and/or components) (e.g., which may be included in the description of the API). In some embodiments, the index storage 1412 may be included in the API retrieval component 1406. Similar processing may be performed to determine one or more components that are semantically similar to the user input or the current task, which may be included in the relevant API data 1408. The API retrieval may send the relevant API data 1408 to the shortlister prompt generation component 1402.

In some embodiments, the prompt data 1404 may be an instruction for the shortlister language model 1410 to determine one or more APIs (and/or components) that are to process with respect to the user input or the current task (e.g., determine one or more API calls to cause the APIs (and/or components) to process) given the information (e.g., the user input data 1204, the context data 1302, the current task, and the relevant API data 1408). As discussed herein above, in some embodiments the prompt generation component 1304 may corresponding to the shortlister prompt generation component 1402. As such, in some embodiments, the shortlister prompt generation component 1402 may, in addition to the processing discussed herein below, process similar to the prompt generation component 1304 (e.g., to generate prompt data for input to an LLM configured to generate a request for context data).

For example, for the selected task of "turn on all of the lights except the garage light" and corresponding relevant API data, the shortlister prompt generation component 1402 may generate example prompt data 1404:
{
Find an execute an API to complete the task of turn on all of the lights except the garage light
Here is a list of relevant API available:
Let's chat API
Classic NLU API
Smart Home skill
If no appropriate API is found, summarize as nothing is found.
}

For further example, for the selected task of "Identify user pizza preference" (or some other related context retrieval task) and corresponding relevant API data, the shortlister prompt generation component 1402 may generate example prompt data 1404:
{
Find an execute an API to complete the task of identifying the user's pizza preference
Here is a list of relevant API available:
Context Handler API
If no appropriate API is found, summarize as nothing is found.
}

As another example, for the subsequently selected task of "find application to order pizza" and corresponding relevant API data, the shortlister prompt generation component 1402 may generate example prompt data 1404:
{
Find and execute an API to complete the task of find application to order pizza
Here is a list of relevant API available:
Let's chat API
[Food Ordering Application 1] API
[Food Ordering Application 2] API
If no appropriate API is found, summarize as nothing is found.
}

In some embodiments, the shortlister prompt generation component 1402 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data may include "Please generate a polite, respectful, and safe response and one that does not violate protected class policy."

The shortlister language model 1410 processes the prompt data 1404 to generate one or more API calls corresponding to request(s) that the corresponding APIs (and/or components) return a potential response to the user input/current task and/or a potential action(s) that the APIs (and/or components) are configured to/will perform with respect to the user input and/or the current task (e.g., a natural language description of the potential action(s)). In some embodiments, the shortlister language model 1410 may generate API calls for a subset of the APIs represented in the prompt data 1404. For example, based on processing the first example prompt data provided above, the shortlister language model 1410 may output model output data: {"Use Let's chat API to turn on all of the lights except the garage light, Use Smart Home skill to turn on all of the lights except the garage light"}, {"Letschat ("turn on all of the lights except the garage light"), or the like. For further example, based on processing the second example prompt data provided above, the shortlister language model 1410 may output model output data: {" retrieve context to identify user's pizza preference, "} or the like. As another example, based on processing the third example prompt data provided above, the shortlister language model 1410 may output model output data: {÷ Use [Food Ordering Application 1] to order pizza, Use [Food Ordering Application 2] to order pizza,"} or the like.

As discussed herein above, in some embodiments, the LLM may correspond to the shortlister language model 1410. In such embodiments, the shortlister language model 1410 may, in addition to the processing discussed herein with respect to FIG. 14, process similar to the LLM. For example, the shortlister language model 1410 may be configured to generate a request for the context handler component 1226 to retrieve context data relevant to the user input data 1204 and/or one or more of the tasks. For further example, the shortlister language model 1410 may be configured to generate a request for the context handler component 1226 to store context data, such as in response to a corresponding task and/or in response to a request from the response arbitration component 1234.

The shortlister language model 1410 may generate the one or more APIs calls (including the required input parameters) by applying in-context learning for cold-starting API calls (e.g., one-shot/few-shot learning). For example, in embodiments where the relevant API data 1408 includes the component descriptions, the shortlister language model 1410 may use the one or more exemplars included in the component descriptions (included in the prompt data 1404) to determine the one or more input parameters for the API call. In some embodiments, the shortlister language model 1410 may be finetuned on such exemplars (e.g., during offline or runtime processing), such that the shortlister language model 1410 is capable of determining the one or more input parameters for the given API call.

During processing of the shortlister language model 1410 and after generating the one or more requests, the shortlister language model 1410 may cause the one or more requests to be executed. For example, as shown in FIG. 14, the shortlister language model 1410 may send action plan data 1214 representing the one or more requests to the action plan execution component 1216, which causes execution of the one or more requests included in the action plan data 1214. For example, the action plan execution component 1216 may process the action plan data 1214 to generate action data 1217. Action data 1217 may represent, for example, an instruction (e.g., an executable API call determined from/ generated based on the action plan data 1214) for a particular API to process with respect to the user input and/or the current task. In embodiments where the action plan data 1214 includes requests corresponding to incomplete API calls, API call formats, indications of actions to be performed by one or more components, the action plan execution component 1216 may be configured to generate executable API calls corresponding to the action plan data 1214. In some embodiments, the action plan execution component 1216 may generate the action data 1217 to represent an instruction to provide the responses including the potential response(s)/potential action(s) with respect to the user input and/or the current task.

In some embodiments, the shortlister language model 1410 may send model output data including the one or more requests to another component of the LLM orchestrator component 1212, which may be configured to parse the model output data to identify the one or more requests. Thereafter, the component may generate the action plan data 1214 representing the one or more requests and send the action plan data 1214 to the action plan execution component 1216.

The action plan execution component 1216 may send the action data 1217 to the API provider component 1218, the LLM agent component 1220, the skill component 1222, the TTS component 1224, and/or the context handler component 1226. The API provider component may include one or more components (e.g., rule-based components, ML-based components, LLM-based components, or the like) that may be caused to process using the action data 1217 (e.g., using the API calls generated by the LLM shortlister component 1208).

The TTS component 1224 may be configured to process textual or tokenized input to generate audio data representing synthesized speech corresponding to the textual or tokenized input spoken by a synthetic voice. The processing of the TTS component 1224 is discussed in detail below with respect to FIG. 16.

The skill component 1222 may be software running on the system component(s) 104 that is akin to a software application. That is, a skill component 1222 may enable the system component(s) 104 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 104 may be configured with more than one skill component 1222. For example, a weather service skill component may enable the system component(s) 104 to provide weather information, a car service skill component may enable the system component(s) 104 to book a trip with respect to a taxi or ride sharing service, a restaurant skill component may enable the system component(s) 104 to order a pizza with respect to the restaurant's online ordering system, etc. A skill component 1222 may operate in conjunction between the system component(s) 104 and other devices, such as the user device 102, in order to complete certain functions. A skill component 1222 may include hardware, software, firmware, or the like that may be dedicated to a particular skill component 1222 or shared among different skill components 1222.

The LLM agent component 1220 may correspond to one or more LLM agents. An LLM agent component 1220 may correspond to a custom instantiation of an LLM (and other components) that is configured to handle user inputs relating to a particular domain/functionality. In some embodiments, the LLM agent component 1220 may be configured to handle specific use cases via particular prompt generation, fine-tuning of the LLM, etc. For example, the LLM agent component 1220 may be configured to handle user inputs/tasks related to information query, the LLM agent component 1220 may be configured handle user inputs/tasks related to shopping, the LLM agent component 1220 may be configured to handle user inputs/tasks related to ordering food from various restaurants, the LLM agent component 1220 may be configured to handle user inputs/tasks related to ordering food from a particular restaurant (e.g., a particular pizza restaurant), the LLM agent component 1220 may be configured to handle user inputs/tasks related to booking a hotel, the LLM agent component 1220ƒmay be configured to handle user inputs/tasks related to booking a flight, etc.

The API provider component 1218 may include various components that may be caused to execute using the action data 1217. For example, the API provider component 1218 may include an entity recognition (ER) component, which may be configured to process textual or tokenized input to link one or more entity references included in the textual or tokenized input to a specific corresponding entity known to the system 1200. For example, based on the textual or tokenized input (e.g., a context of the textual or tokenized input), the ER component may determine that a reference to "Neil Armstrong" is directed to the American astronaut. In some embodiments, the action data 1217 may include an indication(s) (e.g., slots) of one or more entities included in the user input, as determined by one or more of the language models described with respect to FIG. 13, in which case the ER component may process to link the one or more entities to the specific, referenced, entity known to the system 1200.

In other embodiments, the ER component may be configured to process the action data 1217 to determine the one or more entities included in the user input and link the one or more determined entities to the specific, referenced, entity (entities) known to the system 1200. For example, the ER component may include one or more recognizers. Each recognizer may include a named entity recognition (NER) component. The NER component applies grammar information and lexical information (received from a storage) associated with a domain (associated with the recognizer implementing the NER component) to determine a mention of one or more entities in text data. In this manner, the NER component identifies "slots" (each corresponding to one or more particular words in text data) that may be useful for later processing. The NER component may also label each slot with a type (e.g., noun, place, city, artist name, song name, etc.). Thereafter, the ER component links a slot of text data to a specific entity known to the system. To perform entity resolution, the ER component may utilize gazetteer information stored in an entity library storage. The gazetteer information may be used to match text data (representing a portion of the user input) with text data representing known entities, such as song titles, contact names, etc. Gazetteers may be linked to users (e.g., a particular gazetteer may be associated with a specific user's music collection), may be linked to certain domains (e.g., a shopping domain, a music domain, a video domain, etc.), or may be organized in a variety of other ways.

For further example, the API provider component 1218 may include a search component, which may be configured to query a storage (e.g., a database, repository, knowledge base, etc.) for information usable for generating a response to a user input. For example, if the action data 1217 represents a request for information of "Who won the game between [Team 1 Name] and [Team 2 Name]," then the search component may query the storage (or other sources, such as the Internet), to retrieve the information "[Team 1 Name] won the game between [Team 1 Name] and [Team 2 Name]."

As an even further example, the API provider component 1218 may include the device controller component discussed herein above, which may be further configured to cause a device to perform an action corresponding to the action data 1217.

In some embodiments, the API provider component 1218 may include a domain service component, which may be configured for interacting with one or more services defined by particular users, such as developers, specialists, or the like (e.g., to receive information, such as responses or annotations, to cause an action.

One or more of abovementioned components may send action response data 1228 representing one or more potential responses generated by the one or more APIs corresponding to the action data 1217 (e.g., the potential response(s) and/or potential action(s)) to the action plan execution component 1216. For example, in response to an API call to the skill component 1222 associated with a user input for turning on a light, the action response data 1228 may correspond to a potential action of "turn on the light," or the like. For further example, in response to an API call to the context handler component 1226 associated with retrieving context for a user input for ordering pizza, the action response data 1228 may correspond to context data representing the user has previously indicated that they prefer Brooklyn style pizza. For further example, in response to an API call to the skill component 1222 associated with a user input for ordering a pizza from a particular restaurant, the action response data 1228 may correspond to a potential action of "order medium pizza from [restaurant name]", or the like. The action plan execution component 1216 may send the action response data 1228 to the shortlister language model 1410.

In some embodiments, the action plan execution component 1216 may send the action response data 1228 to the shortlister prompt generation component 1402, which may generate further prompt data including the action response data 1228 and be sent to the shortlister language model 1410. For example, the further prompt data may be generated based on combining the prompt data 1404 and the action response data 1228.

In some embodiments, the shortlister language model 1410 may process the action response data 1228 (or the further prompt data including action response data 1228) to generate a natural language summary of the action response data (e.g., the potential response data 1230). In some embodiments, the potential response data 1230 may include an association between action response data 1228 (or a summarized representation of the action response data 1228) and an indication of the API/component that generated the action response data 1228 (e.g., a component identifier, component description, etc.). In some embodiments, the shortlister language model 1410 may be configured to filter and/or rank the action response data 1228 based on how relevant the action response data 1228 is to the current task. In some embodiments, the shortlister language model 1410 may be configured to filter and/or rank the action response data 1228 based on a confidence level of the component that provided the action response data, where the confidence level may indicate a likelihood of the component being able to respond (e.g., within a period of time), the component being able to perform a potential action that corresponds to the current task, etc. In some embodiments, the action response data 1228 may indicate whether or not the corresponding component is able to respond (e.g., the action response data 1228 may include a Boolean value such as "yes" or "no" or other similar indications). In some embodiments, the shortlister language model 1410 may filter and/or rank the action response data 1228 based on information included in the prompt data 1404 (e.g., the user input data 1204, the relevant API data 1408, the context data 1302, the prompt data 1306, etc.). For example, the potential response data 1230 may include a subset of the action response data 1228 (or the summarized representations of the action response data 1228) and may further include a representation of a confidence associated with the action response data 1228 (or a summarized representation of the action response data 1228). As such, the potential response data 1230 may further include data representing a confidence of how relevant the action response data 1228 is to the current task. In some embodiments, the shortlister language model 1410 may consider a rating associated with the component that provided the action response data 1228, where the rating may be a user satisfaction rating provided by multiple different users of the system 1200, a user satisfaction rating provided by the user 1202 associated with the user input data 1204, a system generated rating based on the number of past tasks handled by the component, an accuracy rating based on the number of past tasks the component had handled correctly/provided a desired response for, etc.

The LLM shortlister component 1208 may send the potential response data 1230 for further processing. In instances where the task generation component 1206 determined that more than one task is to be completed, the LLM shortlister component 1208 may send the potential response data 1230 to the task generation component 1206, which may process as described herein above to maintain and prioritize the task list based on the potential response data 1230 and select a new task to be completed. For example, in the instance where the selected task was "identify user's pizza preference," or some other context retrieval task, the shortlister language model 1410 may send potential response data 1228 corresponding to the context data retrieved by the context handler component 1226 to the task generation component 1206, to process as described herein above with respect to FIG. 13.

In instances where the task generation component 1206 determined that only one task is to be completed, or in instances where the LLM shortlister component 1208 determines that there are no remaining tasks to be completed, the LLM shortlister may send the potential response data 1230, and the potential responses associated with previously completed tasks (e.g., previous action response data) to the response arbitration component 1234 to process as discussed herein above. The LLM shortlister component 1208 may further send the user input data 1204, the context data 1302, etc., to the task generation component 1206 and/or the response arbitration component 1234.

As discussed herein above, in some embodiments, the LLM orchestrator component 1212 may further include a memory storage which may store various information associated with the processing performed. In addition, or alternative, the memory storage may store any of the additional information discussed herein above that was determined/generated during one or more previous iterations of processing by the LLM orchestrator component 1212 for the user input data 1204 (e.g., the user input data 1204, the prompt data 1306, the context data 1302, the model output data 1310, prompt data 1314, the task data 1210, the relevant API data 1408, the prompt data 1404, the action plan data 1214, the action response data 1228, the potential response data 1230, etc.). As such, after the LLM shortlister component 1208 generates the potential response data 1230, the LLM orchestrator component 1212 may send the abovementioned data to the memory storage. In some embodiments, the above-mentioned data may be sent to the memory storage as it is generated by the system 1200.

In such embodiments, one or more of the prompt generation components discussed herein may be configured to include (e.g., append) one or more portions of the data included in the memory storage in the data (e.g., the generated prompts) to the corresponding language models. For example, during a subsequent iteration of processing, the task prompt generation component 1304 may receive one or more portions of the data included in the memory storage (which were generated during one or more previous iterations of processing performed with respect to the user input data 1204) and include the one or more portions of data in the prompt data 1306.

Figure 15:
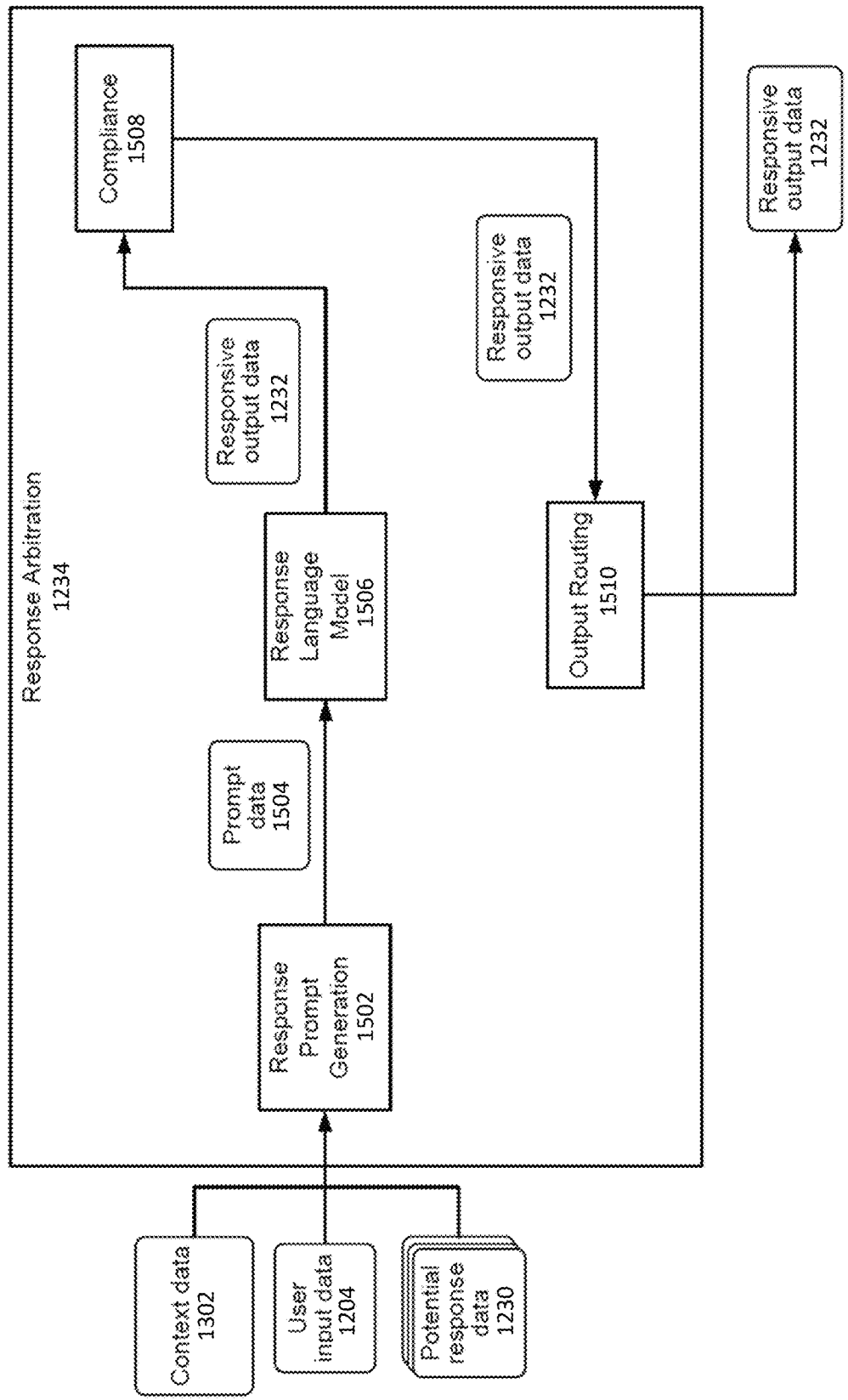
FIG. 15 is a conceptual diagram illustrating example component and processing of a response arbitration component, according to embodiments of the present disclosure.

FIG. 15 illustrates example components and processing of the response arbitration component 1234. As shown in FIG. 15, the response arbitration component 1234 may include a response prompt generation component 1502, a response language model 1506, a compliance component 1508, and an output routing component 1510. As discussed herein above, the response arbitration component 1234 processes the potential response data 1230 (representing the potential responses generated by the one or more components determined to be associated with the user input) to determine whether one or more of the potential responses generated by the system 1200 are responsive to the user input. The response arbitration component 1234 may then generate the natural language response to the user input.

As shown in FIG. 15, the response arbitration component 1234 receives the user input data 1204, the context data 1302, and/or the potential response data 1230 (output by the LLM shortlister component 1208) at the response prompt generation component 1502. As discussed herein above, in some embodiments, the prompt generation component 1304 may correspond to the response prompt generation component 1502. In such embodiments, the response prompt generation component 1502 may, in addition to the processing described herein below, process similarly to the prompt generation component 1304 (e.g., to generate prompt data to be processed to generate a response to a user input).

The response prompt generation component 1502 may process the user input data 1204, the context data 1302, and the potential response data 1230 (and, optionally, the further information received from the LLM shortlister component 1208) to generate prompt data 1504 representing a prompt for input to the response language model 1506. In some embodiments, the prompt data 1504 may be an instruction for the response language model 1506 to determine whether one or more of the potential responses represented in the potential response data 1230 are responsive to the user input given the other information (e.g., the context data 1302, the potential responses associated with the previous tasks (e.g., previous action response data) associated with the user input, and the user input data 1204) included in the prompt data 1504. The prompt data 1504 may further be an instruction for the response language model 1506 to, if the response language model 1506 determines that one or more of the potential responses are responsive to the user input, cause performance of the one or more corresponding actions (e.g., the one or more potential actions included in the selected responses) and/or cause the system 1200 to inform the user 1202 of the one or more selected responses. For example, in some embodiments, prompt data 1504 may further instruct the response language model 1506 to generate a natural language summary of the one or more selected responses determined to be responsive to the user input. The prompt data 1504 may instruct the response language model 1506 to cause the system 1200 to output the natural language summary to the user 1202.

In some embodiments, the prompt data 1504 may further be an instruction for the response language model 1506 to, if the response language model 1506 determines that none of the potential responses are responsive to the user input, generate a request for additional information (e.g., further context data) from a component (e.g., the context handler component 1226) of the system 1200 and/or the user 1202. The additional information may be any information usable to determine and/or perform an action responsive to the user input (e.g., to resolve an ambiguity associated with the user input and/or a task(s) associated with the user input), such as further context data relevant to the user input data 1204 and/or the potential response data 1230. In some embodiments, the response language model 1506 may perform certain steps/intermediate steps such as "Think," "Act," and/or "Response," as discussed herein above.

For example, for the example user input of "What is the weather for today" and corresponding potential responses output by the LLM shortlister component 1208, the response prompt generation component 1502 may generate example prompt data 1504:

{
"If applicable, summarize the responses that satisfy the user's request. If applicable, call the corresponding API's to perform the potential actions that satisfy the user's request. If no response is needed, indicate that."
Here is the user's request:
What is the weather for today
Here are the potential responses and potential actions:
Skill component A: It is currently 70 degrees, with a high of 75 and a low of 68
Skill component B: The weather for today is expected to be mostly sunny, but with a chance of rain in the late afternoon
}

For further example, for the example user input of "please order some pizza for dinner" and corresponding potential responses output by the LLM shortlister component 1208, the response prompt generation component 1502 may generate example prompt data 1504:

{
Here is the user's request:
Please order some pizza for dinner
Here is the context:
Component A: User ordered Brooklyn style pizza from [Pizza Company 1 Name]
Here are the potential responses and potential actions:
[Food Ordering Application 1] API: Use [Food Ordering Application 1] to order pizza from [Pizza Company 1 Name]
[Food Ordering Application 2] API: Use [Food Ordering Application 2] to order pizza from [Pizza Company 2 Name]
}

In some embodiments, the response prompt generation component 1502 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data 1504 may include "Please generate a polite, respectful, and safe response and one that does not violate protected class policy."

The response language model 1506 processes the prompt data 1504 to generate the responsive output data 1232 representing the one or more selected responses determined to be responsive to the user input, the natural language summary of the one or more selected responses, and/or the request for additional information.

If the response language model 1506 determines that one or more of the potential responses are responsive to the user input, the response language model 1506 may generate the responsive output data 1232 to represent the one or more selected responses or a natural language summary of the one or more selected responses to be output to the user. For example, based on processing the first example prompt data above, the response language model 1506 may select one of the potential responses (e.g., the potential responses from skill component A (e.g., a weather skill component)) determined to be responsive to the user input to generate responsive output data 1232: {"It is currently 70 degrees, with a high of 75 and a low of 68,"} or the like. For further example, based on processing the first example prompt data provided above, the response language model 1506 may select more than one of the potential responses (e.g., the potential responses from both the skill component A and skill component B) determined to be responsive to the user input and generate a summary of the selected responses to generate responsive output data 1232: {"It is expected to be mostly sunny today, with a high of 75 and a low of 68, but with a chance of rain in the late afternoon,"} or the like.

As another example, based on processing the second example prompt data provided above, the response language model 1506 may select one of the potential responses (e.g., the potential response from Component A (e.g., the context data received from the context handler component 1226) representing that the user ordered Brooklyn style pizza from [Pizza Company 1 Name]) determined to be responsive to the user input to generate responsive output data 1232: {"Ok, I will place an order for Brooklyn style pizza from [Pizza Company 1 Name],"} or the like. As a further example, based on processing the second example prompt data provided above, the response language model 1506 may select more than one of the potential responses (e.g., the potential responses from both component A and API A) determined to be responsive to the user input and generate a summary of the selected responses to generate the responsive output data 1232: {"Ok, I will place an order for Brooklyn style pizza from [Pizza Company 1 Name] using [Food Ordering Application 1] API,"} or the like.

As such, the response language model 1506 may select between the one or more potential responses from one or more different components (e.g., for the first example prompt data, the potential responses from the skill component A and the skill component B and, for the second example prompt data, the potential responses from Component A, API A, and API B) to determine that a subset of the potential responses are responsive to the user input. Thereafter, the response language model 1506 may cause output of the selected responses (e.g., the subset of potential responses) or a natural language summary of the selected responses to the user.

In some embodiments, the response arbitration component 1234 may also generate and send an instruction to the components, (e.g., API(s), components, agents, etc.) configured to perform the potential actions included in the selected responses to cause performance of the potential actions (or another component of the system 1200 configured to cause the components to perform the potential actions, such as the action plan execution component 1216, which is discussed in more detail herein below). For example, in instances where the selected responses include a potential action to be performed, the response language model 1506 may further cause the corresponding components to perform the potential action (e.g., cause [Food Ordering Application 1] API to order the Brooklyn style pizza from [Pizza Company 1 Name] using [Food Ordering Application 1]). In other embodiments, the system 1200 may not generate and/or send the instruction until approval to perform the action(s) is received from the user 1202.

In some embodiments, the response arbitration component 1234 may also generate and send an instruction to the context handler component 1226 (or the LLM shortlister component 1208) to store (or cause the context handler component 1226 to store) context data (e.g., the context data 1302) associated with the processing performed to generate the responsive output data 1232.

If the response language model 1506 determines that none of the potential responses are responsive to the user input and/or that an ambiguity exists with respect to the user input and/or one or more of the determined tasks, the response language model 1506 may generate the responsive output data 1232 to represent a request to be output to the user and/or the context handler component 1226. For example, based on processing the first example prompt data provided above, the response language model 1506 may determine an ambiguity exists with respect to the size of the pizza to be ordered and may generate the responsive output data 1232: {"What size pizza should I order?",} {"What size pizza does the user usually order?",} or the like to be output to the user and/or sent to the context handler component 1226.

The response language model 1506 may send the responsive output data 1232 to the compliance component 1508, which is configured to determine whether model output data generated by the response language model 1506 is appropriate for output to the user 1202. In other words, the compliance component 1508 processes the responsive output data 1232 to determine whether the responsive output data 1232 includes any inappropriate/sensitive information that should not be output to the user 1202 (e.g., confidential information, offensive language, etc.). In some embodiments, the compliance component 1508 may be configured to compare the responsive output data 1232 to one or more words determined to be inappropriate/sensitive and should not be output to the user 1202. In some embodiments, the compliance component 1508 may include/implement an ML model. For example, the ML model may process the responsive output data 1232 to determine whether the responsive output data 1232 includes any inappropriate/sensitive information. During training, the ML model may take as input a plurality of training natural language inputs, where the ML model is tasked with classifying a natural language input as including inappropriate/sensitive information or not. The output of the ML model (e.g., 0, 1, a value between 0 and 1, or the like) resulting from processing with respect to a training natural language input may be compared to a corresponding label representing whether the natural language input includes inappropriate/sensitive information or not. Based on the comparison, one or more parameters of the ML may be configured. In some embodiments, the ML model may be a classifier.

If the output of the compliance component 1508 indicates that the responsive output data 1232 includes information that is not appropriate for output to the user 1202, the compliance component 1508 may cause further processing of the responsive output data 1232 by downstream components to halt. In some embodiments, the response arbitration component 1234 may cause the response language model 1506 to generate new responsive output data to be evaluated by the compliance component 1508. For example, the response arbitration component 1234 may cause the response prompt generation component 1502 to generate new prompt data, which may include the prompt data 1504, the responsive output data 1232, and an indication that the responsive output data 1232 is not appropriate for output to the user 1202. The new prompt data may be an instruction to generate new model output data that is appropriate for output to the user 1202.

If the output of the compliance component 1508 indicates that the responsive output data 1232 are appropriate for output to the user, the compliance component 1508 may send the responsive output data 1232 to the output routing component 1510. The output routing component 1510 processes the responsive output data 1232 to determine one or more components that are to be caused to process in response to the responsive output data 1232. In other words, the output routing component 1510 parses the responsive output data 1232 to determine one or more components that the responsive output data 1232 is to be routed to (or that are to be caused to process based on the responsive output data 1232).

For example, in an instance where the response language model 1506 determines that one or more of the potential responses are responsive to the user input and generates the responsive output data 1232 including the one or more selected responses (or a natural language summary of the one or more selected responses)/the request for additional information, the output routing component 1510 may parse the responsive output data 1232 to determine the selected responses/the natural language summary and send the responsive output data 1232 to a component configured to generate corresponding data to be output to the user 1202. For example, the output routing component 1510 may send the responsive output data 1232 to the TTS component 1224, which may process as described herein above to generate output audio data including synthesized speech corresponding to the responsive output data 1232, which the system 1200 may send to the user device 102 for output to the user 1202. In some embodiments, the system 1200 may further include a component configured to generate visual output data (e.g., output image and/or video data) corresponding to the responsive output data 1232, which may be sent to the user device 102 to be output to the user.

For further example, in embodiments where the responsive output data 1232 includes selected responses (e.g., the responsive output data 1232) that include one or more potential actions to be performed, the output routing component 1510 may process as described herein above to determine the one or more selected responses/the natural language summary and send the responsive output data 1232 to the one or more components associated with the selected responses. In such embodiments, the responsive output data 1232 may further include an instruction for the one or more components to perform the potential actions corresponding to the selected responses. For example, in some embodiments, the components corresponding to the potential responses included in the potential response data 1230 may, after generating the potential responses, suspend processing required to perform the potential action included in the potential responses and await an instruction from the system 1200 to perform the potential action. As such, the output routing component 1510 may include the instruction in the responsive output data 1232 to cause the component to perform the potential action. In some embodiments, the output routing component 1510 may generate an API call configured to cause the component to perform the action.

In some embodiments, where the responsive output data 1232 includes selected responses that include one or more potential actions to be performed, the responsive output data 1232 may further request authorization from the user 1202 to perform the one or more potential actions responsive to the user input. After receiving the request authorization (e.g., via a subsequent user input) the response arbitration component 1234 may generate and send the corresponding instruction (or API call) to perform the one or more potential actions responsive to the user input. In some embodiments, the system 1200 may store data indicating prior authorization to perform the one or more potential actions responsive to the user input (or one or more actions similar to the one or more potential actions), in which case the response arbitration component 1234 may use such data as authorization to perform the one or more potential actions. For example, the user 1202 may have previously provided authorization for a set of actions (e.g., turning on outside lights). Thereafter, the system 1200 may determine the one or more potential actions to be performed in response to the user input data 1204. If the system 1200 determines that the one or more actions are included in the set of actions previously authorized by the user 1202, the system 1200 may not ask for further authorization prior to causing the one or more potential actions to be performed.

For further example, in an instance where the response language model 1506 generates the responsive output data 1232 including a request for additional information (in response to the response language model 1506 determining that none of the potential responses are responsive to the user input and/or further context data relevant to the user input, one or more of the tasks, and/or the potential responses is needed), which may be determined by the output routing component 1510 based on, for example, the responsive output data 1232 including a question, the output routing component 1510 may parse the responsive output data 1232 to determine whether the request for additional information is to be sent to the context handler component 1226 and/or output to the user 1202. In some embodiments, the response language model 1506 may include in the responsive output data 1232 an indication of whether the request for additional information should be sent to the context handler component 1226 and/or output to the user 1202. In some embodiments, unless otherwise indicated in the responsive output data 1232, the output routing component 1510 may determine to send the request for additional information to the context handler component 1226 prior to outputting the request for additional information to the user 1202. In the instance where the context handler component 1226 is unable to determine relevant context data (or a component of the system 1200 is unable to resolve the ambiguity using the context data received from the context handler component 1226), the output routing component 1510 may determine the request for additional information is to be output to the user 1202.

In some embodiments, the response arbitration component 1234 may be configured to further process data representing a potential response to the user input that is generated by one or more other components of the system 1200 not included in the LLM orchestrator component 1212. For example, the response arbitration component 1234 may further receive data from an orchestrator component 1612 (discussed in detail herein below with respect to FIG. 16) representing a potential response to the user input (e.g., the output of the skill component 1222), where the orchestration of the processing performed to generate the potential response was performed by the orchestrator component 1612, rather than the LLM orchestrator component 1212. In such embodiments, the response arbitration component 1234 may be further configured to arbitrate between first potential responses received as a result of the processing of the LLM orchestrator component 1212 and second potential responses received as a result of the processing of the orchestrator component 1612. As discussed above, the response arbitration component 1234 may select one or more portions (e.g., potential actions, potential responses, etc.) of the first potential responses and/or the second potential responses that are determined to be responsive to the user input and cause output of the one or more portions (or a summarized representation of the one or more portions) and/or performance of the potential actions corresponding to the selected responses.

In some embodiments, the data received from the orchestrator component 1612 may be included in the potential response data 1230. For example, the orchestrator component 1612 may be determined to be configured to perform a function (e.g., cause another component(s) to perform a function) potentially relevant to the user input such that the LLM shortlister component 1208 may cause the orchestrator component 1612 to generate potential responses potentially responsive to the user input, which may be included in the potential response data 1230 sent to the response arbitration component 1234.

In some embodiments, the language models of FIGS. 13, 14, and/or 15 may be fine-tuned to perform a particular task(s). Fine-tuning of the language models may be performed using one or more techniques. One example fine-tuning technique is transfer learning that involves reusing a pre-trained model's weights and architecture for a new task. The pre-trained model may be trained on a large, general dataset, and the transfer learning approach allows for efficient and effective adaptation to specific tasks. Another example fine-tuning technique is sequential fine-tuning where a pre-trained model is fine-tuned on multiple related tasks sequentially. This allows the model to learn more nuanced and complex language patterns across different tasks, leading to better generalization and performance. Yet another fine-tuning technique is task-specific fine-tuning where the pre-trained model is fine-tuned on a specific task using a task-specific dataset. Yet another fine-tuning technique is multi-task learning where the pre-trained model is fine-tuned on multiple tasks simultaneously. This approach enables the model to learn and leverage the shared representations across different tasks, leading to better generalization and performance. Yet another fine-tuning technique is adapter training that involves training lightweight modules that are plugged into the pre-trained model, allowing for fine-tuning on a specific task without affecting the original model's performance on other tasks.

In some embodiments, as discussed above, one or more components of the system 1200 discussed herein above may be configured to begin processing with respect to data as soon as the data or a portion of the data is available to the one or more components. Some components of the system 1200 are generative components/models that can begin processing with respect to portions of data as they are available, instead of waiting to initiate processing after the entirety of data is available. In other words, the system 1200 may be configured to stream portions of data associated with processing with respect to a user input to the one or more components such that the one or more components may begin performing their configured processing with respect to that data as soon as it is available to the one or more components. For example, if the output of the task determination language model 1308, the task selection language model 1316, and/or the shortlister language model 1410 indicates that additional information is needed to complete a first task associated with a user input, a request for the additional information may be sent to the context handler component 1226. Thereafter, the task determination language model 1308, the task selection language model 1316, and/or the shortlister language model 1410 may continue to process to complete their configured operations. For example, while the context handler component 1226 is processing to determine the context data, the system 1200 may begin processing with respect to a second task associated with the user input. Thereafter, the output of the context handler component 1226 may be sent to the response arbitration component 1234 such that once the response arbitration component 1234 receives the output of the LLM shortlister component 1208, the response arbitration component 1234 may resolve the ambiguity that resulted in the request for the context data in order to generate the responsive output data 1232. For further example, if the user input data 1204 is generated to include the natural language representation of the user input, but the processing required to determine the corresponding contextual signals (e.g., weather data, time of data, dialog history, device information, etc.) is yet to be completed, the task generation component 1206 may begin processing with respect to the natural language representation of the user input. Once the corresponding contextual signals have been generated, the task generation component 1206 may begin processing with respect to the contextual signals and may update downstream components with the result of the processing with respect to the contextual signals.

As another example, if the task generation component 1206 determines that more than one task is to be completed to perform an action responsive to a user input, and the LLM shortlister component 1208 processes as described herein above to cause one or more components to generate potential responses with respect to a first task of the more than one tasks, the LLM shortlister component 1208 may send the potential responses (and a representation of the user input and the current task) to the response arbitration component 1234 to process as described herein above with respect to those potential responses while the system 1200 (e.g., the task generation component 1206 and/or the LLM shortlister component 1208) completes processing with respect to the remaining tasks of the one or more tasks. Therefore, the response arbitration component 1234 may process as described herein to select between the potential responses associated with the first task while the potential responses associated with one or more of the remaining tasks is completed. As such, the response arbitration component 1234 may only need to arbitrate between the potential responses associated with the first task that were previously selected by the response arbitration component 1234 as being responsive to the first task when the response arbitration component 1234 later processes with respect to further potential responses associated with further tasks.

As a further example, if the API retrieval component 1406 determines (e.g., with a confidence value that meets or exceeds a particular threshold) that a particular API or component description should be included in the relevant API data, the API retrieval component 1406 may provide the corresponding relevant API data to the shortlister prompt generation component 1402 so that the shortlister prompt generation component 1402 may begin processing with respect to the relevant API data while the API retrieval component 1406 continues to determine one or more further relevant API data. In general, the system 1200 is capable of performing such streaming and processing of portions of data discussed herein (e.g., for processing with respect to a user input) and updating downstream components with the results of processing of newly available portions of data as the data becomes available for processing.

Figure 16:
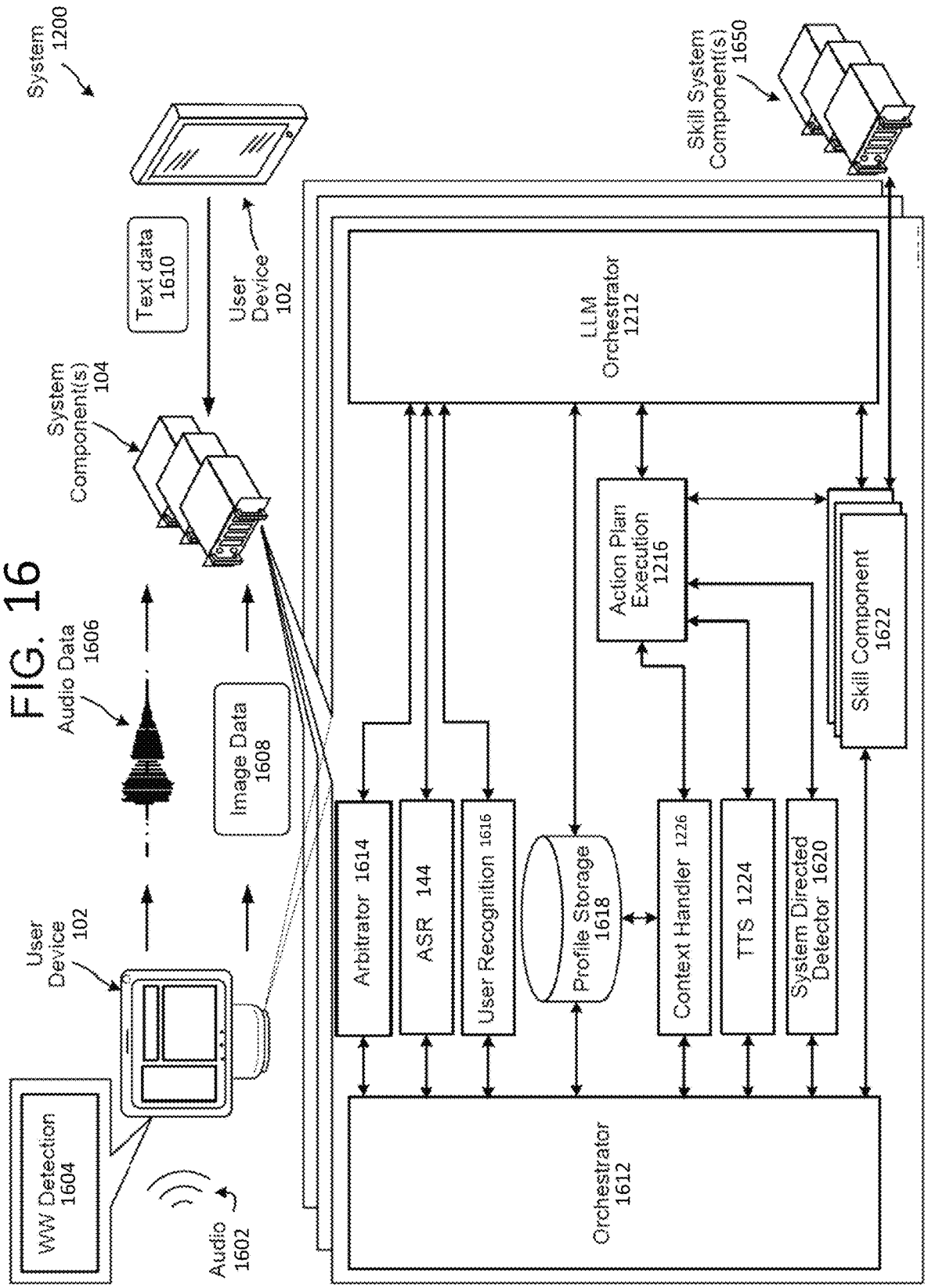
FIG. 16 is a conceptual diagram of components of the system, according to embodiments of the present disclosure.

The system 1200 may operate using various components as described in FIG. 16. The various components may be located on same or different physical devices. Communication between various components may occur directly or across a networks(s) 106. The user device 102 may include audio capture component(s), such as a microphone or array of microphones of a user device 102, captures audio 1602 and creates corresponding audio data. Once speech is detected in audio data representing the audio 1602, the user device 102 may determine if the speech is directed at the user device 102/system component(s). In at least some embodiments, such determination may be made using a wakeword detection component 1604. The wakeword detection component 1604 may be configured to detect various wakewords. In at least some examples, each wakeword may correspond to a name of a different digital assistant. An example wakeword/digital assistant name is "Alexa." In another example, input to the system may be in form of text data 1610, for example as a result of a user typing an input into a user interface of user device 102. Other input forms may include indication that the user has pressed a physical or virtual button on user device 102, the user has made a gesture, etc. The user device 102 may also capture images using camera(s) of the user device 102 and may send image data 1608 representing those image(s) to the system component(s). The image data 1608 may include raw image data or image data processed by the user device 102 before sending to the system component(s). The image data 1608 may be used in various manners by different components of the system to perform operations such as determining whether a user is directing an utterance to the system, interpreting a user command, responding to a user command, etc.

The wakeword detection component 1604 of the user device 102 may process the audio data, representing the audio 1602, to determine whether speech is represented therein. The user device 102 may use various techniques to determine whether the audio data includes speech. In some examples, the user device 102 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 102 may implement a classifier configured to distinguish speech from background noise. The classifier may be implemented by techniques such as linear classifiers, support vector machines, and decision trees. In still other examples, the user device 102 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 1602, is analyzed to determine if specific characteristics of the audio data match preconfigured acoustic waveforms, audio signatures, or other data corresponding to a wakeword.

Thus, the wakeword detection component 1604 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 1604 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 1604 and/or input is detected by an input detector, the user device 102 may "wake" and begin transmitting audio data 1606, representing the audio 1602, to the system component(s) 104. The audio data 1606 may include data corresponding to the wakeword; in other embodiments, the portion of the audio corresponding to the wakeword is removed by the user device 102 prior to sending the audio data 1606 to the system component(s) 104. In the case of touch input detection or gesture-based input detection, the audio data may not include a wakeword.

In some implementations, the system 1200 may include more than one system component(s). The system component(s) 104 may respond to different wakewords and/or perform different categories of tasks. Each system component(s) may be associated with its own wakeword such that speaking a certain wakeword results in audio data be sent to and processed by a particular system. For example, detection of the wakeword "Alexa" by the wakeword detection component 1604 may result in sending audio data to system component(s) for processing while detection of the wakeword "Computer" by the wakeword detector may result in sending audio data to system component(s) b for processing. The system may have a separate wakeword and system for different skills/systems (e.g., "Dungeon Master" for a game play skill/system component(s) c) and/or such skills/systems may be coordinated by one or more skill component(s) 1622 of one or more system component(s) 104.

The user device 102/system component(s) may also include a system directed input detector 1620. The system directed input detector 1620 may be configured to determine whether an input to the system (for example speech, a gesture, etc.) is directed to the system or not directed to the system (for example directed to another user, etc.). The system directed input detector 1620 may work in conjunction with the wakeword detection component 1604. If the system directed input detector 1620 determines an input is directed to the system, the user device 102 may "wake" and begin sending captured data for further processing. If data is being processed the user device 102 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 1620 determines an input is not directed to the system (such as a speech or gesture directed to another user) the user device 102 may discard the data and take no further action for processing purposes. In this way the system 1200 may prevent processing of data not directed to the system, thus protecting user privacy. As an indicator to the user, however, the system may output an audio, visual, or other indicator when the system directed input detector 1620 is determining whether an input is potentially device directed. For example, the system may output an orange indicator while considering an input, and may output a green indicator if a system directed input is detected. Other such configurations are possible.

Upon receipt by the system component(s) 104, the audio data 1606 may be sent to an orchestrator component 1612 and/or the LLM orchestrator component 1212. The orchestrator component 1612 may include memory and logic that enables the orchestrator component 1612 to transmit various pieces and forms of data to various components of the system, as well as perform other operations as described herein. In some embodiments, the orchestrator component 1612 may optionally be included in the system component(s) 104. In embodiments where the orchestrator component 1612 is not included in the system component(s) 104, the audio data 1606 may be sent directly to the LLM orchestrator component 1212. Further, in such embodiments, each of the components of the system component(s) 104 may be configured to interact with the LLM orchestrator component 1212, the action plan execution component 1216, and/or the API provider component.

In some embodiments, the system component(s) 104 may include an arbitrator component 1614, which may be configured to determine whether the orchestrator component 1612 and/or the LLM orchestrator component 1212 are to process with respect to the audio data 1606. In some embodiments, the LLM orchestrator component 1212 may be selected to process with respect to the audio data 1606 only if the user 1202 associated with the audio data 1606 (or the user device 102 that captured the audio 1602) has previously indicated that the LLM orchestrator component 1212 may be selected to process with respect to user inputs received from the user 1202.

In some embodiments, the arbitrator component 1614 may determine the orchestrator component 1612 and/or the LLM orchestrator component 1212 are to process with respect to the audio data 1606 based on metadata associated with the audio data 1606. For example, the arbitrator component 1614 may be a classifier configured to process a natural language representation of the audio data 1606 (e.g., output by the ASR component 144) and classify the corresponding user input as to be processed by the orchestrator component 1612 and/or the LLM orchestrator component 1212. For further example, the arbitrator component 1614 may determine whether the device from which the audio data 1606 is received is associated with an indicator representing the audio data 1606 is to be processed by the orchestrator component 1612 and/or the LLM orchestrator component 1212. As an even further example, the arbitrator component 1614 may determine whether the user (e.g., determined using data output from the user recognition component 1616) from which the audio data 1606 is received is associated with a user profile including an indicator representing the audio data 1606 is to be processed by the orchestrator component 1612 and/or the LLM orchestrator component 1212. As another example, the arbitrator component 1614 may determine whether the audio data 1606 (or the output of the ASR component 144) corresponds to a request representing that the audio data 1606 is to be processed by the orchestrator component 1612 and/or the LLM orchestrator component 1212 (e.g., a request including "let's chat" may represent that the audio data 1606 is to be processed by the LLM orchestrator component 1212).

In some embodiments, if the arbitrator component 1614 is unsure (e.g., a confidence score corresponding to whether the orchestrator component 1612 and/or the LLM orchestrator component 1212 is to process is below a threshold), then the arbitrator component 1614 may send the audio data 1606 to both of the orchestrator component 1612 and the LLM orchestrator component 1212. In such embodiments, the orchestrator component 1612 and/or the LLM orchestrator component 1212 may include further logic for determining further confidence scores during processing representing whether the orchestrator component 1612 and/or the LLM orchestrator component 1212 should continue processing, as is discussed further herein below.

The arbitrator component 1614 may send the audio data 1606 to an ASR component 144. In some embodiments, the component selected to process the audio data 1606 (e.g., the orchestrator component 1612 and/or the LLM orchestrator component 1212) may send the audio data 1606 to the ASR component 144. The ASR component 144 may transcribe the audio data 1606 into text data. The text data output by the ASR component 144 represents one or more than one (e.g., in the form of an N-best list) ASR hypotheses representing speech represented in the audio data 1606. The ASR component 144 interprets the speech in the audio data 1606 based on a similarity between the audio data 1606 and pre-established language models. For example, the ASR component 144 may compare the audio data 1606 with models for sounds (e.g., acoustic units such as phonemes, senons, phones, etc.) and sequences of sounds to identify words that match the sequence of sounds of the speech represented in the audio data 1606. The ASR component 144 sends the text data generated thereby to the arbitrator component 1614, the orchestrator component 1612, and/or the LLM orchestrator component 1212. In instances where the text data is sent to the arbitrator component 1614, the arbitrator component 1614 may send the text data to the component selected to process the audio data 1606 (e.g., the orchestrator component 1612 and/or the LLM orchestrator component 1212). The text data sent from the ASR component 144 to the arbitrator component 1614, the orchestrator component 1612, and/or the LLM orchestrator component 1212 may include a single top-scoring ASR hypothesis or may include an N-best list including multiple top-scoring ASR hypotheses. An N-best list may additionally include a respective score associated with each ASR hypothesis represented therein.

A skill system component(s) 1650 may communicate with a skill component(s) 1622 within the system component(s) 104 directly with the orchestrator component 1612 and/or the action plan execution component 1216, or with other components. A skill system component(s) 1650 may be configured to perform one or more actions. An ability to perform such action(s) may sometimes be referred to as a "skill." That is, a skill may enable a skill system component(s) 1650 to execute specific functionality in order to provide data or perform some other action requested by a user. For example, a weather service skill may enable a skill system component(s) 1650 to provide weather information to the system component(s) 104, a car service skill may enable a skill system component(s) 1650 to book a trip with respect to a taxi or ride sharing service, an order pizza skill may enable a skill system component(s) 1650 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 104 may be configured with a skill component 1622 dedicated to interacting with the skill system component(s) 1650. Unless expressly stated otherwise, reference to a skill, skill device, or skill component may include a skill component 1622 operated by the system component(s) 104 and/or skill operated by the skill system component(s) 1650. Moreover, the functionality described herein as a skill or skill may be referred to using many different terms, such as an action, bot, app, or the like. The skill component 1622 and or skill system component(s) 1650 may return output data to the orchestrator component 1612.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system component(s) includes a TTS component 1224. The TTS component 1224 may generate audio data (e.g., synthesized speech) from text data using one or more different methods. Text data input to the TTS component 1224 may come from a skill component 1622, the orchestrator component 1612, or another component of the system. In one method of synthesis called unit selection, the TTS component 1224 matches text data against a database of recorded speech. The TTS component 1224 selects matching units of recorded speech and concatenates the units together to form audio data. In another method of synthesis called parametric synthesis, the TTS component 1224 varies parameters such as frequency, volume, and noise to create audio data including an artificial speech waveform. Parametric synthesis uses a computerized voice generator, sometimes called a vocoder.

The user device 102 may include still image and/or video capture components such as a camera or cameras to capture one or more images. The user device 102 may include circuitry for digitizing the images and/or video for transmission to the system component(s) 104 as image data. The user device 102 may further include circuitry for voice command-based control of the camera, allowing a user 1202 to request capture of image or video data. The user device 102 may process the commands locally or send audio data 1606 representing the commands to the system component(s) 104 for processing, after which the system component(s) 104 may return output data that can cause the user device 102 to engage its camera.

The system component(s) 104/the user device 102 may include a user recognition component 1616 that recognizes one or more users using a variety of data. However, the disclosure is not limited thereto, and the user device 102 may include the user recognition component 1616 instead of and/or in addition to the system component(s) 104 without departing from the disclosure.

The user recognition component 1616 may take as input the audio data 1606 and/or text data output by the ASR component 144. The user recognition component 1616 may perform user recognition by comparing audio characteristics in the audio data 1606 to stored audio characteristics of users. The user recognition component 1616 may also perform user recognition by comparing biometric data (e.g., fingerprint data, iris data, etc.), received by the system in correlation with the present user input, to stored biometric data of users assuming user permission and previous authorization. The user recognition component 1616 may further perform user recognition by comparing image data (e.g., including a representation of at least a feature of a user), received by the system in correlation with the present user input, with stored image data including representations of features of different users. The user recognition component 1616 may perform additional user recognition processes, including those known in the art.

The user recognition component 1616 determines scores indicating whether user input originated from a particular user. For example, a first score may indicate a likelihood that the user input originated from a first user, a second score may indicate a likelihood that the user input originated from a second user, etc. The user recognition component 1616 also determines an overall confidence regarding the accuracy of user recognition operations.

Output of the user recognition component 1616 may include a single user identifier corresponding to the most likely user that originated the user input. Alternatively, output of the user recognition component 1616 may include an N-best list of user identifiers with respective scores indicating likelihoods of respective users originating the user input. The output of the user recognition component 1616 may be used to inform processing of the arbitrator component 1614, the orchestrator component 1612, and/or the LLM orchestrator component 1212 as well as processing performed by other components of the system.

The system component(s) 104/user device 102 may include a presence detection component that determines the presence and/or location of one or more users using a variety of data.

The system 1200 (either on user device 102, system component(s), or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 1618 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a user device 102, the user profile (associated with the presented login information) may be updated to include information about the user device 102, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs.

The profile storage 1618 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 1618 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Although the components of FIG. 16 may be illustrated as part of system component(s) 104, user device 102, or otherwise, the components may be arranged in other device(s) (such as in user device 102 if illustrated in system component(s) 104 or vice-versa, or in other device(s) altogether) without departing from the disclosure.

In at least some embodiments, the system component(s) may receive the audio data 1606 from the user device 102, to recognize speech corresponding to a spoken input in the received audio data 1606, and to perform functions in response to the recognized speech. In at least some embodiments, these functions involve sending directives (e.g., commands), from the system component(s) to the user device 102 (and/or other devices) to cause the user device 102 to perform an action, such as output an audible response to the spoken input via a loudspeaker(s), and/or control secondary devices in the environment by sending a control command to the secondary devices.

Thus, when the user device 102 is able to communicate with the system component(s) over the networks(s) 106, some or all of the functions capable of being performed by the system component(s) may be performed by sending one or more directives over the networks(s) 106 to the user device 102, which, in turn, may process the directive(s) and perform one or more corresponding actions. For example, the system component(s), using a remote directive that is included in response data (e.g., a remote response), may instruct the user device 102 to output an audible response (e.g., using TTS processing performed by an on-device TTS component) to a user's question via a loudspeaker(s) of (or otherwise associated with) the user device 102, to output content (e.g., music) via the loudspeaker(s) of (or otherwise associated with) the user device 102, to display content on a display of (or otherwise associated with) the user device 102, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user 1202 as part of a shopping function, establishing a communication session (e.g., a video call) between the user 1202 and another user, and so on.

In at least some embodiments, a hybrid selector, of the user device 102, may send the audio data 1606 to the wakeword detection component 1604. If the wakeword detection component 1604 detects a wakeword in the audio data 1606, the wakeword detection component 1604 may send an indication of such detection to the hybrid selector. In response to receiving the indication, the hybrid selector may send the audio data 1606 to the system component(s) and/or the ASR component of the user device 102. The wakeword detection component 1604 may also send an indication, to the hybrid selector, representing a wakeword was not detected. In response to receiving such an indication, the hybrid selector may refrain from sending the audio data 1606 to the system component(s), and may prevent the ASR component of the user device 102 from further processing the audio data 1606. In this situation, the audio data 1606 can be discarded.

The user device 102 may conduct its own speech processing using on-device language processing components, such as an ASR component, similar to the manner discussed herein with respect to the ASR component 144 of the system component(s). The user device 102 may also internally include, or otherwise have access to, other components such as one or more skill components capable of executing commands based on the output of an orchestrator component, an LLM orchestrator, or other results determined by the user device 102/system component(s) (which may operate similarly to skill components 1622), an arbitrator component (configured to process in a similar manner to that discussed herein above with respect to the arbitrator component 1614), an action plan execution component (configured to process in a similar manner to that discussed herein with respect to the action plan execution component 1216), a context handler component (configured to process in a similar manner to that discussed herein with respect to the context handler component 1226), a user recognition component (configured to process in a similar manner to that discussed herein with respect to the user recognition component 1616 of the system component(s)), profile storage (configured to store similar profile data to that discussed herein with respect to the profile storage 1618 of the system component(s)), or other components. In at least some embodiments, the profile storage may only store profile data for a user or group of users specifically associated with the user device 102. Similar to as described above with respect to skill component 1622, a skill component of the user device 102 may communicate with a skill system component(s) 1650. The user device 102 may also have its own TTS component, which may operate similarly to TTS component 1224.

In at least some embodiments, the on-device language processing components may not have the same capabilities as the language processing components of the system component(s). For example, the on-device language processing components may be configured to handle only a subset of the natural language user inputs that may be handled by the system component(s). For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s). If the user device 102 attempts to process a natural language user input for which the on-device language processing components are not necessarily best suited, the language processing results determined by the user device 102 may indicate a low confidence or other metric indicating that the processing by the user device 102 may not be as accurate as the processing done by the system component(s).

The hybrid selector, of the user device 102, may include a hybrid proxy (HP) configured to proxy traffic to/from the system component(s). For example, the HP may be configured to send messages to/from a hybrid execution controller (HEC) of the hybrid selector. For example, command/directive data received from the system component(s) can be sent to the HEC using the HP. The HP may also be configured to allow the audio data 1606 to pass to the system component(s) while also receiving (e.g., intercepting) this audio data 1606 and sending the audio data 1606 to the HEC.

In at least some embodiments, the hybrid selector may further include a local request orchestrator (LRO) configured to notify the ASR component of the user device 102 about the availability of new audio data 1606 that represents user speech, and to otherwise initiate the operations of local language processing when new audio data 1606 becomes available. In general, the hybrid selector may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the user device 102 receives directive data from the system component(s) and chooses to use that remotely-determined directive data.

Thus, when the audio data 1606 is received, the HP may allow the audio data 1606 to pass through to the system component(s) and the HP may also input the audio data 1606 to the on-device ASR component by routing the audio data 1606 through the HEC of the hybrid selector, whereby the LRO notifies the on-device ASR component of the audio data 1606. At this point, the hybrid selector may wait for response data from either or both of the system component(s) or the local language processing components. However, the disclosure is not limited thereto, and in some examples the hybrid selector may send the audio data 1606 only to the local ASR component without departing from the disclosure. For example, the user device 102 may process the audio data 1606 locally without sending the audio data 1606 to the system component(s).

The local ASR component is configured to receive the audio data 1606 from the hybrid selector, and to recognize speech in the audio data 1606. The user device 102 and/or the system component(s) may associate a unique identifier with each natural language user input. The user device 102 may include the unique identifier when sending the audio data 1606 to the system component(s), and the response data from the system component(s) may include the unique identifier to identify which natural language user input the response data corresponds.

In at least some embodiments, the user device 102 may include, or be configured to use, one or more skill components that may work similarly to the skill component(s) 1622 implemented by the system component(s). The skill component(s) may correspond to one or more domains that are used in order to determine how to act on a spoken input in a particular way, such as by outputting a directive that corresponds to the determined intent, and which can be processed to implement the desired operation. The skill component(s) installed on the user device 102 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the user device 102 may be in communication with one or more skill system component(s) 1650. For example, a skill system component(s) 1650 may be located in a remote environment (e.g., separate location) such that the user device 102 may only communicate with the skill system component(s) 1650 via the networks(s) 106. However, the disclosure is not limited thereto. For example, in at least some embodiments, a skill system component(s) 1650 may be configured in a local environment (e.g., home server and/or the like) such that the user device 102 may communicate with the skill system component(s) 1650 via a private network, such as a local area network (LAN).

A skill system component(s) 1650 may communicate with a skill component(s) 1222 within the system component(s) 104 directly with the orchestrator component 1612 and/or the action plan execution component 1216, or with other components. A skill system component(s) 1650 may be configured to perform one or more actions. An ability to perform such action(s) may sometimes be referred to as a "skill." That is, a skill may enable a skill system component(s) 1650 to execute specific functionality in order to provide data or perform some other action requested by a user. For example, a weather service skill may enable a skill system component(s) 1650 to provide weather information to the system component(s) 104, a car service skill may enable a skill system component(s) 1650 to book a trip with respect to a taxi or ride sharing service, an order pizza skill may enable a skill system component(s) 1650 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 104 may be configured with a skill component 1222 dedicated to interacting with the skill system component(s) 1650. Unless expressly stated otherwise, reference to a skill, skill device, or skill component may include a skill component 1222 operated by the system component(s) 104 and/or skill operated by the skill system component(s) 1650. Moreover, the functionality described herein as a skill or skill may be referred to using many different terms, such as an action, bot, app, or the like. The skill component 1222 and or skill system component(s) 1650 may return output data to the orchestrator component 1612.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system component(s) includes a TTS component 1224. The TTS component 1224 may generate audio data (e.g., synthesized speech) from text data using one or more different methods. Text data input to the TTS component 1224 may come from a skill component 1222, the orchestrator component 1612, or another component of the system. In one method of synthesis called unit selection, the TTS component 1224 matches text data against a database of recorded speech. The TTS component 1224 selects matching units of recorded speech and concatenates the units together to form audio data. In another method of synthesis called parametric synthesis, the TTS component 1224 varies parameters such as frequency, volume, and noise to create audio data including an artificial speech waveform. Parametric synthesis uses a computerized voice generator, sometimes called a vocoder.

The user device 102 may include still image and/or video capture components such as a camera or cameras to capture one or more images. The user device 102 may include circuitry for digitizing the images and/or video for transmission to the system component(s) 104 as image data. The user device 102 may further include circuitry for voice command-based control of the camera, allowing a user 1202 to request capture of image or video data. The user device 102 may process the commands locally or send audio data 1606 representing the commands to the system component(s) 104 for processing, after which the system component(s) 104 may return output data that can cause the user device 102 to engage its camera.

The system component(s) 104 may include a user recognition component 1616 that recognizes one or more users using a variety of data. The user recognition component 1616 may take as input the audio data 1606 and/or text data output by the ASR component 144. The user recognition component 1616 may perform user recognition by comparing audio characteristics in the audio data 1606 to stored audio characteristics of users. The user recognition component 1616 may also perform user recognition by comparing biometric data (e.g., fingerprint data, iris data, etc.), received by the system in correlation with the present user input, to stored biometric data of users assuming user permission and previous authorization. The user recognition component 1616 may further perform user recognition by comparing image data (e.g., including a representation of at least a feature of a user), received by the system in correlation with the present user input, with stored image data including representations of features of different users. The user recognition component 1616 may perform additional user recognition processes, including those known in the art.

The user recognition component 1616 determines scores indicating whether user input originated from a particular user. For example, a first score may indicate a likelihood that the user input originated from a first user, a second score may indicate a likelihood that the user input originated from a second user, etc. The user recognition component 1616 also determines an overall confidence regarding the accuracy of user recognition operations.

Output of the user recognition component 1616 may include a single user identifier corresponding to the most likely user that originated the user input. Alternatively, output of the user recognition component 1616 may include an N-best list of user identifiers with respective scores indicating likelihoods of respective users originating the user input. The output of the user recognition component 1616 may be used to inform processing of the arbitrator component 1614, the orchestrator component 1612, and/or the LLM orchestrator component 1212 as well as processing performed by other components of the system.

The system component(s) 104/user device 102 may include a presence detection component that determines the presence and/or location of one or more users using a variety of data.

The system 1200 (either on user device 102, system component(s), or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 1618 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a user device 102, the user profile (associated with the presented login information) may be updated to include information about the user device 102, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs.

The profile storage 1618 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 1618 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Although the components of FIG. 16 may be illustrated as part of system component(s) 104, user device 102, or otherwise, the components may be arranged in other device(s) (such as in user device 102 if illustrated in system component(s) 104 or vice-versa, or in other device(s) altogether) without departing from the disclosure.

In at least some embodiments, the system component(s) may receive the audio data 1606 from the user device 102, to recognize speech corresponding to a spoken input in the received audio data 1606, and to perform functions in response to the recognized speech. In at least some embodiments, these functions involve sending directives (e.g., commands), from the system component(s) to the user device 102 (and/or other user devices) to cause the user device 102 to perform an action, such as output an audible response to the spoken input via a loudspeaker(s), and/or control secondary devices in the environment by sending a control command to the secondary devices.

Thus, when the user device 102 is able to communicate with the system component(s) over the networks(s) 106, some or all of the functions capable of being performed by the system component(s) may be performed by sending one or more directives over the networks(s) 106 to the user device 102, which, in turn, may process the directive(s) and perform one or more corresponding actions. For example, the system component(s), using a remote directive that is included in response data (e.g., a remote response), may instruct the user device 102 to output an audible response (e.g., using TTS processing performed by an on-device TTS component) to a user's question via a loudspeaker(s) of (or otherwise associated with) the user device 102, to output content (e.g., music) via the loudspeaker(s) of (or otherwise associated with) the user device 102, to display content on a display of (or otherwise associated with) the user device 102, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user 1202 as part of a shopping function, establishing a communication session (e.g., a video call) between the user 1202 and another user, and so on.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A device, comprising:
one or more processors; and
non-transitory computer-readable media storing computer-executable instructions that, when executed by the one or more processors, cause the one or more processors to perform operations comprising:
receiving first audio data representing a first voice command;
sending the first audio data to off-device components of a speech processing system;
receiving, from the speech processing system, first data including a first textual representation of the first audio data generated by the speech processing system and intent data indicating an intent of the first voice command as determined by the speech processing system;
generating a first embedding of the first data;
storing the first embedding on the device;
receiving second audio data representing a second voice command;
generating a second embedding of the second audio data;
determining that the first embedding corresponds at least to a threshold degree of similarity to the second embedding;
in response to the first embedding corresponding at least to the threshold degree of similarity to the second embedding, determining that the intent is associated with the second voice command; and
sending, to an application on the device, at least the intent and a request for the application to determine an action to be performed responsive to the second voice command.

2. The device of claim 1, the operations further comprising:
determining first context data associated with the first voice command, the first context data including at least an interaction history associated with the device indicating prior voice commands provided to the device, wherein the first embedding is generated from the first context data and the first data;
determining second context data associated with receiving the second audio data, wherein the second embedding is generated from the second context data and the second audio data; and
wherein determining that the first embedding corresponds at least to the threshold degree of similarity to the second embedding is from the first context data corresponding to the second context data.

3. The device of claim 1, the operations further comprising:
generating second data representing an embedding space configured to associate embeddings;
determining a first vector value associated with the first embedding as stored in association with the embedding space;
determining a second vector value associated with the second embedding;
determining a distance, utilizing a cosine similarity calculation, between the first vector value and the second vector value in the embedding space;
determining that the distance satisfies a threshold distance predefined to indicate correspondence between voice commands represented by embeddings; and
wherein determining that the first embedding corresponds at least to the threshold degree of similarity to the second embedding is in response to the distance satisfying the threshold distance.

4. The device of claim 1, the operations further comprising:
receiving third audio data from an audio-input device;
determining that the device is to perform speech processing on the third audio data in response to a predefined association between the device and the audio-input device; and
in response to determining that the device is to perform the speech processing on the second audio data, generating a third embedding of the third audio data, and wherein performing the speech processing on the third audio data comprises determining that the third embedding corresponds at least to the threshold degree of similarity to the second embedding.

5. A method, comprising:
receiving first data representing words spoken in first audio data and an intended meaning of a first voice command spoken in the first audio data;
generating a first embedding of the first data;
storing the first embedding on a device;
receiving second audio data representing a second voice command;
generating a second embedding of the second audio data;
determining that the first embedding has at least a threshold similarity to the second embedding;
determining, based at least in part on the first embedding having at least the threshold similarity to the second embedding, that the second voice command has the intended meaning; and
causing an action to be performed in response to the second audio data based on the intended meaning.

6. The method of claim 5, further comprising:
determining first context data associated with the first voice command, wherein the first embedding is generated based at least in part on the first context data and the first data;
determining second context data associated with receiving the second audio data, wherein the second embedding is generated based at least in part on the second context data and the second audio data; and
wherein determining that the first embedding has at least the threshold similarity to the second embedding comprises determining that the first embedding has at least the threshold similarity to the second embedding based at least in part on the first context data corresponding to the second context data.

7. The method of claim 5, further comprising:
generating second data representing an embedding space configured to associate embeddings;
determining a first vector value associated with the first embedding;
determining a second vector value associated with the second embedding; and
wherein determining that the first embedding has at least the threshold similarity to the second embedding comprises determining that the first embedding has at least the threshold similarity to the second embedding based at least in part on the first vector value having the threshold similarity to the second vector value in the embedding space.

8. The method of claim 5, further comprising:
receiving third audio data from an audio-input device;
determining that the device is to perform speech processing on the third audio data based at least in part on a predefined association between the device and the audio-input device; and
based at least in part on determining that the device is to perform the speech processing on the second audio data, generating a third embedding of the third audio data, and wherein performing the speech processing on the third audio data comprises determining that the third embedding corresponds at least to a threshold degree of similarity to the second embedding.

9. The method of claim 5, further comprising:
identifying, utilizing an audio encoder, first features of the first audio data;
identifying, utilizing a text encoder, second features associated with the words spoken in the first audio data; and
wherein generating the first embedding of the first data comprises generating the first embedding based at least in part on the first features and the second features.

10. The method of claim 5, further comprising:
determining account data associated with the device that stores the first embedding;
determining other devices associated with the account data;
determining, based at least in part on historical usage data of the other devices, a subset of the other devices that have been associated with the intended meaning; and
sending the first embedding to the subset of the other devices such that the first embedding is stored on the subset of the other devices.

11. The method of claim 5, further comprising:
generating a third embedding from second data representing words spoken in third audio data and indicating an additional intended meaning associated with a third voice command;
determining that the words spoken in the third audio data correspond to the words spoken in the first audio data;
removing, based at least in part on the words spoken in the third audio data corresponding to the words spoken in the first audio data, the first embedding from the device; and
storing the third embedding on the device instead of the first embedding.

12. The method of claim 5, further comprising:
associating a domain with the first embedding;
determining that account data associated with the device indicates an aspect of the domain has changed from when the first embedding was generated; and
causing the first embedding to be invalidated based at least in part on the aspect of the domain changing.

13. A system, comprising:
one or more processors; and
non-transitory computer-readable media storing computer-executable instructions that, when executed by the one or more processors, cause the one or more processors to perform operations comprising:
receiving first data including a first textual representation of first audio data and intent data indicating an intent of a first voice command represented by the first audio data;
generating a first embedding of the first data;
storing the first embedding;
receiving second audio data representing a second voice command;
generating a second embedding of the second audio data;
determining that the first embedding has at least a threshold similarity to the second embedding;
determining, based at least in part on the first embedding having at least the threshold similarity to the second embedding, that the intent is associated with the second voice command; and
causing an action to be performed utilizing the intent.

14. The system of claim 13, the operations further comprising determining first context data associated with the first voice command, wherein the first embedding is generated based at least in part on the first context data and the first data;
determining second context data associated with receiving the second audio data, wherein the second embedding is generated based at least in part on the second context data and the second audio data; and
wherein determining that the first embedding has at least the threshold similarity to the second embedding comprises determining that the first embedding has at least the threshold similarity to the second embedding based at least in part on the first context data corresponding to the second context data.

15. The system of claim 13, the operations further comprising:
generating second data representing an embedding space configured to associate embeddings;
determining a first vector value associated with the first embedding;
determining a second vector value associated with the second embedding; and
wherein determining that the first embedding has at least the threshold similarity to the second embedding comprises determining that the first embedding has at least the threshold similarity to the second embedding based at least in part on the first vector value being within a threshold distance of the second vector value in the embedding space.

16. The system of claim 13, the operations further comprising:
receiving third audio data from an audio-input device;
determining that a device is to perform speech processing on the third audio data based at least in part on a predefined association between the device and the audio-input device; and
based at least in part on determining that the device is to perform the speech processing on the second audio data, generating a third embedding of the third audio data, and wherein performing the speech processing on the third audio data comprises determining that the third embedding corresponds at least to a threshold degree of similarity to the second embedding.

17. The system of claim 13, the operations further comprising:
identifying, utilizing an audio encoder, audio features of the first audio data;
identifying, utilizing a text encoder, text features associated with the first textual representation of the first audio data; and
wherein generating the first embedding of the first data comprises generating the first embedding based at least in part on the audio features and the text features.

18. The system of claim 13, the operations further comprising:
determining account data associated with a device that stores the first embedding;

determining other devices associated with the account data;

determining, based at least in part on historical usage data of the other devices, a subset of the other devices that have been associated with an intended meaning; and sending the first embedding to the subset of the other devices such that the first embedding is stored on the subset of the other devices.

19. The system of claim 13, the operations further comprising:

generating a third embedding from second data including a second textual representation of third audio data and an additional intended meaning associated with a third voice command;

determining that the second textual representation corresponds to the first textual representation;

removing, based at least in part on the second textual representation corresponding to the first textual representation, the first embedding; and storing the third embedding instead of the first embedding.

20. The system of claim 13, the operations further comprising:

associating a domain with the first embedding;

determining that account data associated with a device indicates that an aspect of the domain has changed from when the first embedding was generated; and causing the first embedding to be invalidated based at least in part on the aspect of the domain changing.

* * * * *